United States Patent
Kemeny

(10) Patent No.: US 12,251,964 B2
(45) Date of Patent: Mar. 18, 2025

(54) WHEEL ASSEMBLY INCLUDING GAS SPRING PISTON BIASING MEMBER AND RELATED METHODS

(71) Applicant: GACW Incorporated, Chandler, AZ (US)

(72) Inventor: Zoltan Kemeny, Chandler, AZ (US)

(73) Assignee: GACW INCORPORATED, Chandler, AZ (US)

( * ) Notice: Subject to any disclaimer, the term of this patent is extended or adjusted under 35 U.S.C. 154(b) by 339 days.

(21) Appl. No.: 17/693,380

(22) Filed: Mar. 13, 2022

(65) Prior Publication Data
US 2023/0286315 A1 Sep. 14, 2023

(51) Int. Cl.
| | | |
|---|---|---|
| *B60B 9/24* | (2006.01) | |
| *B25B 27/12* | (2006.01) | |
| *B60B 25/00* | (2006.01) | |
| *F16F 9/02* | (2006.01) | |

(52) U.S. Cl.
CPC ............... *B60B 9/24* (2013.01); *B25B 27/12* (2013.01); *F16F 9/0218* (2013.01); *F16F 9/0227* (2013.01); *B60B 25/00* (2013.01); *B60B 2320/10* (2013.01); *B60B 2900/313* (2013.01)

(58) Field of Classification Search
CPC .. B60B 9/24; B60B 9/28; F16F 9/0218; F16F 9/0227; F16F 9/3271; F16F 7/09; F16F 9/368; B25B 27/12
USPC .................................................... 188/322.22
See application file for complete search history.

(56) References Cited

U.S. PATENT DOCUMENTS

| | | | |
|---|---|---|---|
| 911,975 A | 2/1909 | Gustafson | |
| 1,036,855 A | 8/1912 | Kanter | |
| 1,041,182 A | 10/1912 | Simpson | |
| 1,348,641 A * | 8/1920 | Hachmann | F16J 9/20 29/888.044 |
| 1,525,428 A * | 2/1925 | Pally | F16J 9/063 277/483 |
| 1,601,518 A | 9/1926 | Weston | |
| 1,650,609 A | 11/1927 | Cravens | |
| 1,808,886 A | 6/1931 | Lee | |
| 1,979,935 A | 11/1934 | Henap | |

(Continued)

FOREIGN PATENT DOCUMENTS

| | | | |
|---|---|---|---|
| DE | 102005003072 A1 * | 7/2006 | ............. B25B 27/12 |
| GB | 569519 A * | 12/1943 | |

(Continued)

*Primary Examiner* — Kip T Kotter
(74) *Attorney, Agent, or Firm* — ALLEN, DYER, DOPPELT, + GILCHRIST, P.A. Attorneys at Law

(57) ABSTRACT

A wheel assembly to be coupled to a hub of a vehicle may include an inner rim to be coupled to the hub of the vehicle, an outer rim surrounding the inner rim, and gas springs operatively coupled between the inner rim and the outer rim to provide a gas suspension permitting relative movement between the inner rim and the outer rim. Each of the gas springs may include a gas cylinder having an inner surface, and a piston movable within the gas cylinder. The piston may include a shaft, a piston head coupled to the shaft and having at least one recess therein, and at least one biasing member within the at least one recess. Each gas spring may also include at least one damping member adjacent the at least one biasing member and within the at least one recess to frictionally engage the inner surface of the gas cylinder.

17 Claims, 62 Drawing Sheets

(56) References Cited

U.S. PATENT DOCUMENTS

| | | | |
|---|---|---|---|
| 2,208,567 A | | 7/1940 | Bartho et al. |
| 2,466,428 A | * | 4/1949 | Hufferd ............... F16J 9/064 |
| | | | 123/188.6 |
| 3,348,835 A | * | 10/1967 | Casey ............... F16F 9/0218 |
| | | | 267/64.17 |
| 4,899,520 A | * | 2/1990 | Lerner ............... B65B 43/12 |
| | | | 493/239 |
| 5,579,874 A | | 12/1996 | Jeffries et al. |
| 6,041,838 A | | 3/2000 | Al-Sabah |
| 6,698,480 B1 | | 3/2004 | Cornellier |
| 2007/0227848 A1 | * | 10/2007 | Schoppet ............... F16F 7/09 |
| | | | 188/322.22 |
| 2008/0029969 A1 | * | 2/2008 | Torres ............... F04F 1/18 |
| | | | 29/888.3 |
| 2013/0340902 A1 | | 12/2013 | Kemeny |
| 2015/0090379 A1 | | 4/2015 | Kemeny |
| 2020/0023679 A1 | | 1/2020 | Kemeny |
| 2020/0023680 A1 | | 1/2020 | Kemeny |
| 2020/0023682 A1 | | 1/2020 | Kemeny |
| 2020/0324572 A1 | | 10/2020 | Kemeny |
| 2020/0353774 A1 | | 11/2020 | Kemeny |
| 2024/0068541 A1 | * | 2/2024 | Hansson ............... F16F 7/09 |

FOREIGN PATENT DOCUMENTS

| | | | | |
|---|---|---|---|---|
| KR | 20010059064 A | * | 7/2001 | |
| WO | 2020142188 | | 7/2020 | |
| WO | WO-2022152690 A1 | * | 7/2022 | ............... F16F 1/34 |

* cited by examiner

WHEEL ASSEMBLY INCLUDING GAS SPRING PISTON BIASING MEMBER AND RELATED METHODS

TECHNICAL FIELD

The present invention relates to the field of wheels, and more particularly, to wheel assemblies for a vehicle and related methods.

BACKGROUND

A typical wheel may include a rim and tire surrounding the rim. The tire transfers a load of a vehicle from the axle through the wheel to the ground. Tires, for example, those found on most vehicles are pneumatic tires. In other words, a typical tire is pneumatically inflated, for example, with air or other gas, such as nitrogen. More particularly, air is injected into the space between the rim and the inside of the tire to inflate it.

During operation, being pneumatically inflated, a tire absorbs the forces as the vehicle travels over the road surface. The tire and associated inflation pressure may be selected to absorb the above-noted forces while reducing any deformation. However, in many instances, excessive forces placed on the tire may cause the tire and/or rim to deform, puncture, or blowout. Typical forces also cause tread wear of the tire, while excessive forces may also cause rapid tread wear that may lead to a shortened lifespan of the tire and decreased structural integrity of the wheel.

To address the shortcomings of pneumatic-based wheels, non-pneumatic wheels have been developed. By non-pneumatic, it is meant that air or other gas is not injected to inflate an interior volume of a tire. One approach to a non-pneumatic wheel uses mechanical springs. For example, U.S. Pat. No. 911,975 to Gustafson discloses a spring wheel. Secondary spokes are arranged in pairs between pairs of main spokes and the members of each of the secondary spokes therefore pass upon opposite sides of a corresponding pair of intersecting braces. Each of the secondary spokes includes a pair of telescoping members that are pivotally connected at its outer end to ears formed on the hub and extends at its opposite end into a corresponding member.

U.S. Pat. No. 1,601,518 to Weston discloses a resilient wheel that includes radial arms. Connection between a hub and rim members may be provided by pivot pins in outer ends of these arms that have links journaled thereon. The links are pivotally articulated with bent levers, which are in turn pivoted on bracket arms that extend inwardly from the part-circular plates, which are mounted on an inner periphery of a tire holding rim.

Another approach includes a disc between a wheel hub and outer rim. For example, U.S. Pat. No. 1,808,886 to Courtney also discloses a disc or sidewall between a wheel hub and a rim. The disc is engaged by studs that project from the wheel hub and extends from an outer flange obliquely to the wheel hub. The disc assists the wheel tire and rim by resisting any tendency to become displayed laterally as a result of stresses occurring while the wheel is turning.

U.S. Pat. No. 1,979,935 to Henap discloses a hydraulic spoke wheel. Each of the hydraulic spokes include telescoping sections in the form of an outer section and an inner section. The outer section has the stud projecting from one end. The inner section extends from the outer section and is equipped at its extended end with the stem.

U.S. Pat. No. 6,041,838 to Al-Sabah discloses a wheel that includes spokes positioned in a spaced apart relation to each other. Each of the spokes has a first end connected to a rim and a second end connected to a plate member tip of a hub plate member in an offset position from the respective radial axis thereof. The offset position of each of the spokes is further defined by each of the spokes being connected to a respective one of the plate member tips at a predetermined angle (e.g., less than 90-degrees) from the radial axis thereof and defining an operative offset spoke axis, which intersects the radial axis of the plate member tips at the predetermined angle.

U.S. Pat. No. 6,698,480 to Cornellier discloses shock absorbing spokes each having a central cylindrical tube. Each tube has an interior cap having an aperture and an exterior cap having an aperture. Each spoke has an interior piston, a rod with an aperture and a pin. The pin pivotably couples one of the spokes to the hub. Each spoke has an exterior piston, a rod with an aperture and a pin. The pin pivotably couples one of the spokes to the rim assembly. The interior pistons and exterior pistons divide the space within each tube into an interior chamber, an exterior chamber, and a central chamber.

Despite advances in pneumatic tire wheels, and non-pneumatic tire wheels, there is still a need for improvements in wheel technology, particularly, for large construction vehicles, or mining vehicles, for example. The expense of wheel replacement, and the downtime experienced during wheel replacement may add significant expenses to the construction or mining projects.

SUMMARY

A wheel assembly to be coupled to a hub of a vehicle may include an inner rim to be coupled to the hub of the vehicle, an outer rim surrounding the inner rim, and a plurality of gas springs operatively coupled between the inner rim and the outer rim to provide a gas suspension permitting relative movement between the inner rim and the outer rim. Each of the plurality of gas springs may include a gas cylinder having an inner surface, and a piston movable within the gas cylinder. The piston may include a shaft, a piston head coupled to the shaft and having at least one recess therein, and at least one biasing member within the at least one recess. Each gas spring may also include at least one damping member adjacent the at least one biasing member and within the at least one recess to frictionally engage the inner surface of the gas cylinder.

The at least one biasing member may include an elastomeric material body surrounding the shaft, for example. The at least one damping member may include a plurality of rigid bodies.

The piston head may have a plurality of first pin-receiving passageways, for example. The at least one damping member may have a second plurality of pin-receiving passageways aligned with the plurality of first pin-receiving passageways to accommodate respective retaining pins during assembly.

The gas cylinder may include a first metal, and the at least one damping member may include a second metal softer than the first metal, for example. The recess may include a circumferential recess.

The wheel assembly may include a seal carried by the piston head. A tread may be carried by the outer rim.

A related method aspect is directed to a method of making a wheel assembly to be coupled to a hub of a vehicle. The method may include operatively coupling a plurality of gas springs between an inner rim to be coupled to the hub of the vehicle and an outer rim surrounding the inner rim to provide a gas suspension permitting relative movement between the inner rim and the outer rim. Each of the plurality of gas springs may include a gas cylinder having an inner surface, and a piston movable within the gas cylinder. The piston may include a shaft, a piston head coupled to the shaft and having at least one recess therein, at least one biasing member within the at least one recess, and at least one damping member adjacent the at least one biasing member and within the at least one recess to frictionally engage the inner surface of the gas cylinder.

DETAILED DESCRIPTION

Figure 1:
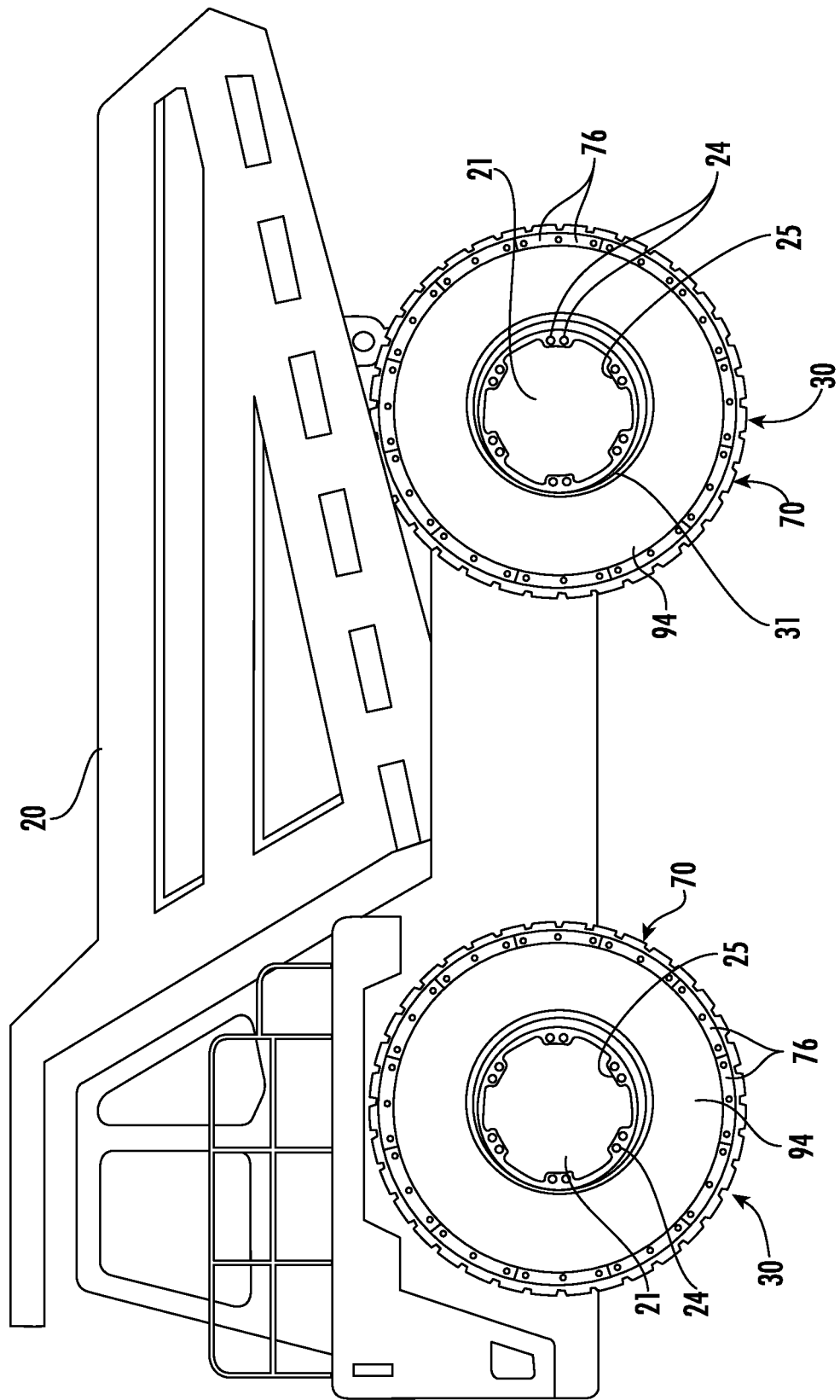
FIG. 1 is a side view of a vehicle having wheel assemblies according to an embodiment.
Figure 2:
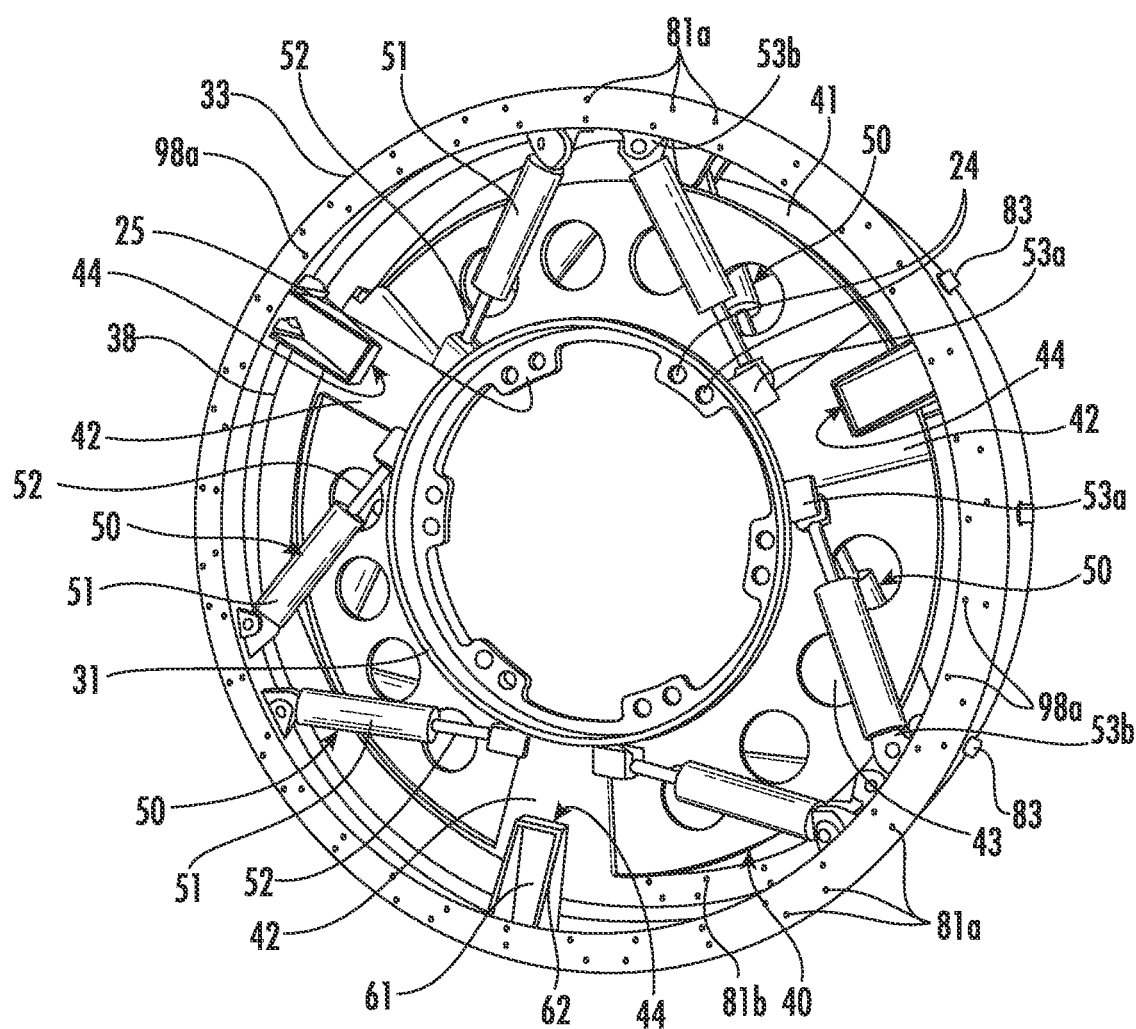
FIG. 2 is a perspective view of a wheel assembly according to an embodiment.
Figure 3:
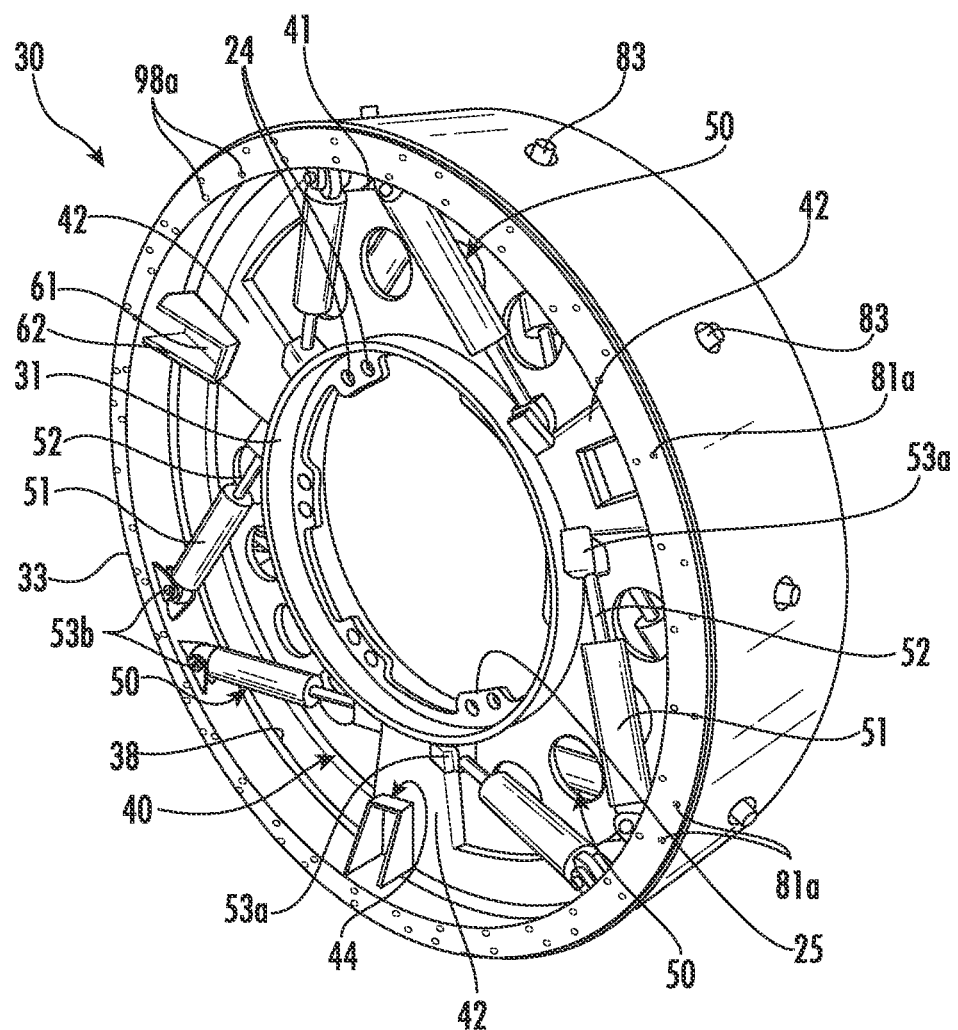
FIG. 3 is another perspective view of the wheel assembly of FIG. 2.
Figure 4:
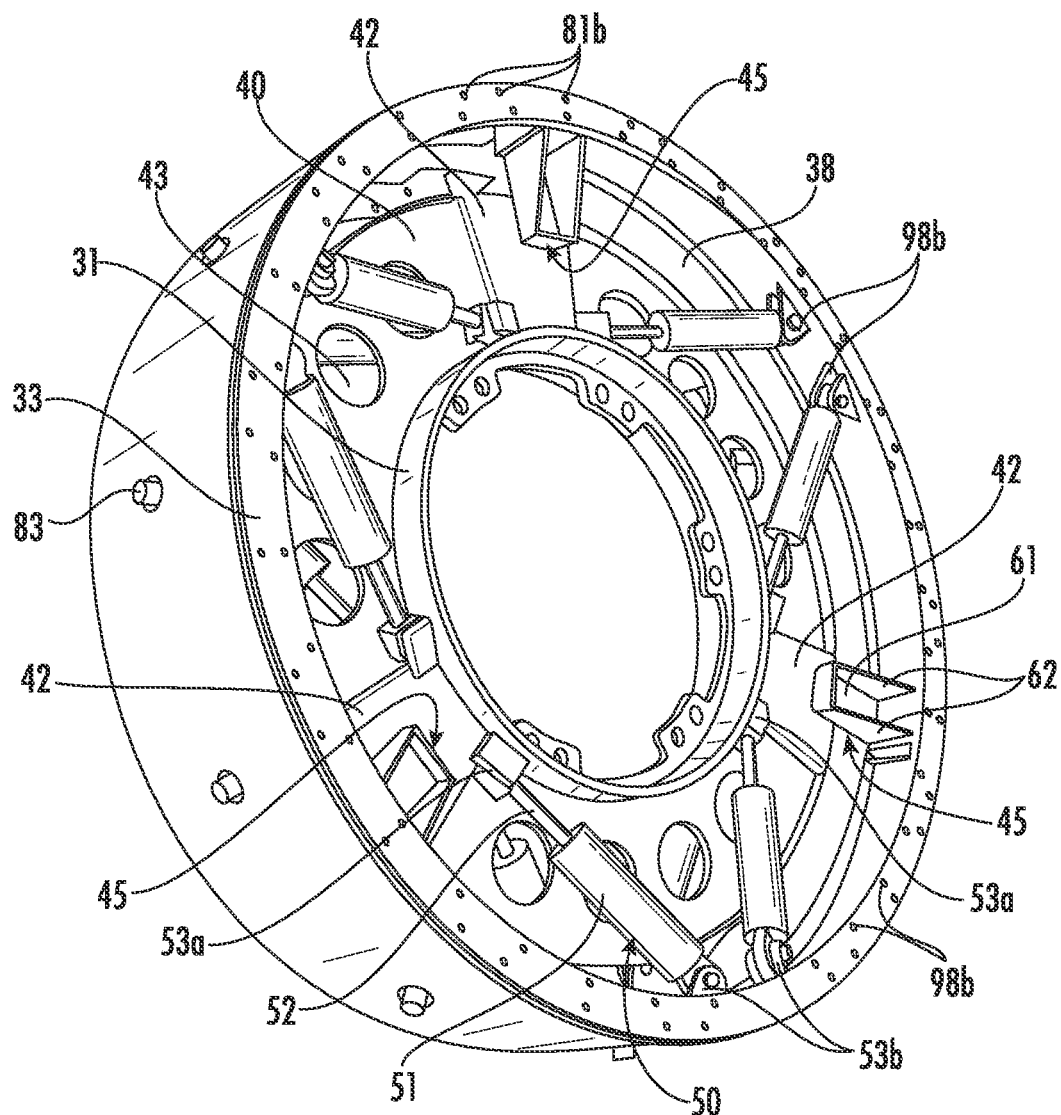
FIG. 4 is another perspective view of the wheel assembly of FIG. 2.
Figure 5:
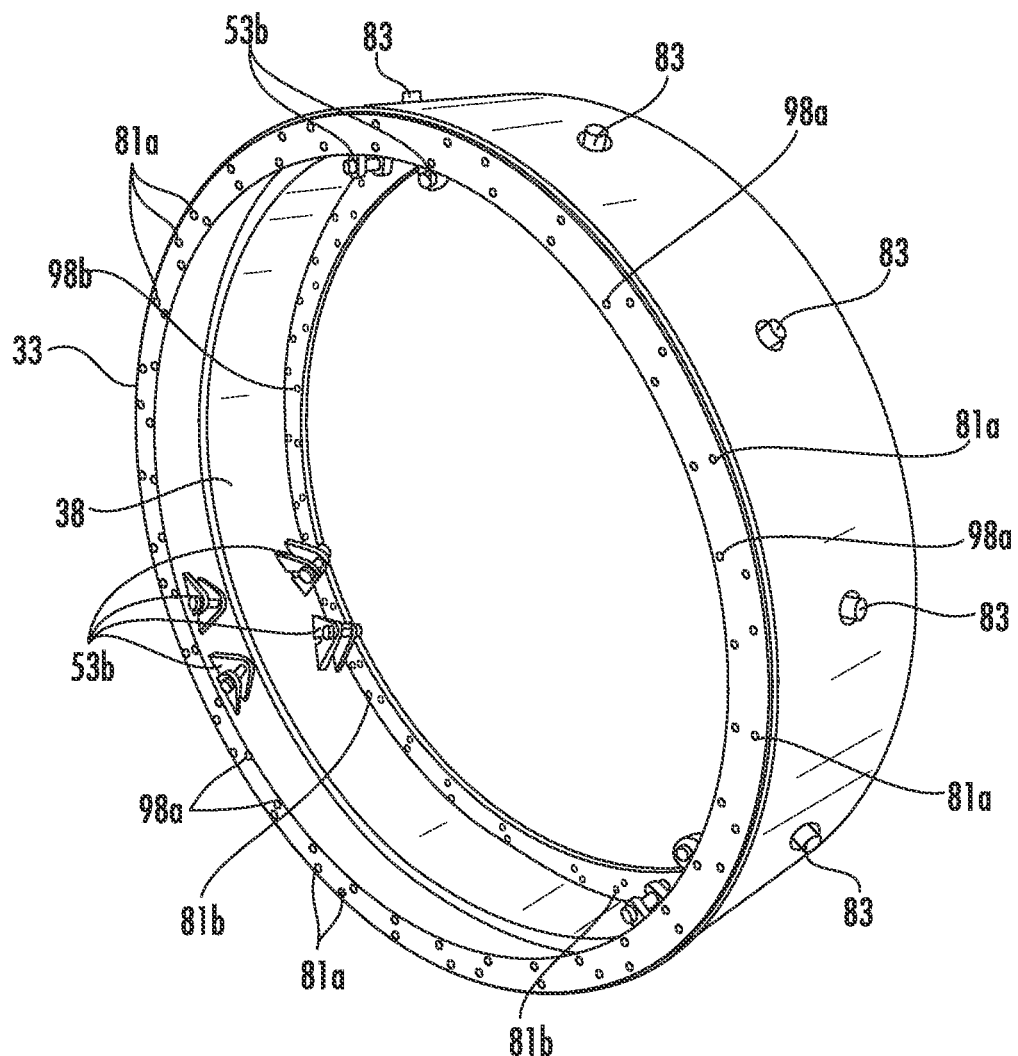
FIG. 5 is a perspective view of a portion of the wheel assembly of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-5, a wheel assembly 30 to be coupled to a hub 21 of a vehicle 20 includes an inner rim 31 to be coupled to the hub of the vehicle. The inner rim 31 may be coupled to the hub 21 of the vehicle 20 with fasteners through fastener receiving passageways 24 within an inwardly extending flange ring 25. Illustratively, the flange ring 25 is centered laterally within the inner rim 31, but may be positioned in another arrangement based upon a desired mounting arrangement with the hub 21. Other coupling arrangements may be used to couple the inner rim 31 to the hub 21.

The wheel assembly 30 also includes an outer rim 33 surrounding the inner rim 31. The outer rim 33 may have a diameter of at least 3.5 feet, and more particularly, at least 4 feet. Those skilled in the art will appreciate that with a diameter of at least 3.5 feet, the wheel assembly 30, and more particularly, the outer rim 33 may be particularly advantageous for relatively large or heavy machinery, such as, for example, earth excavation equipment and mining equipment. A typical overall outer diameter of such a wheel assembly may be 100 inches or greater. The outer rim 33 may have an increased thickness portion 38 along an inner circumference thereof. The increased thickness portion 38 may be provided by welding a separate reinforcing ring in position or it may be integrally formed with the outer rim 33, for example.

Figure 6:
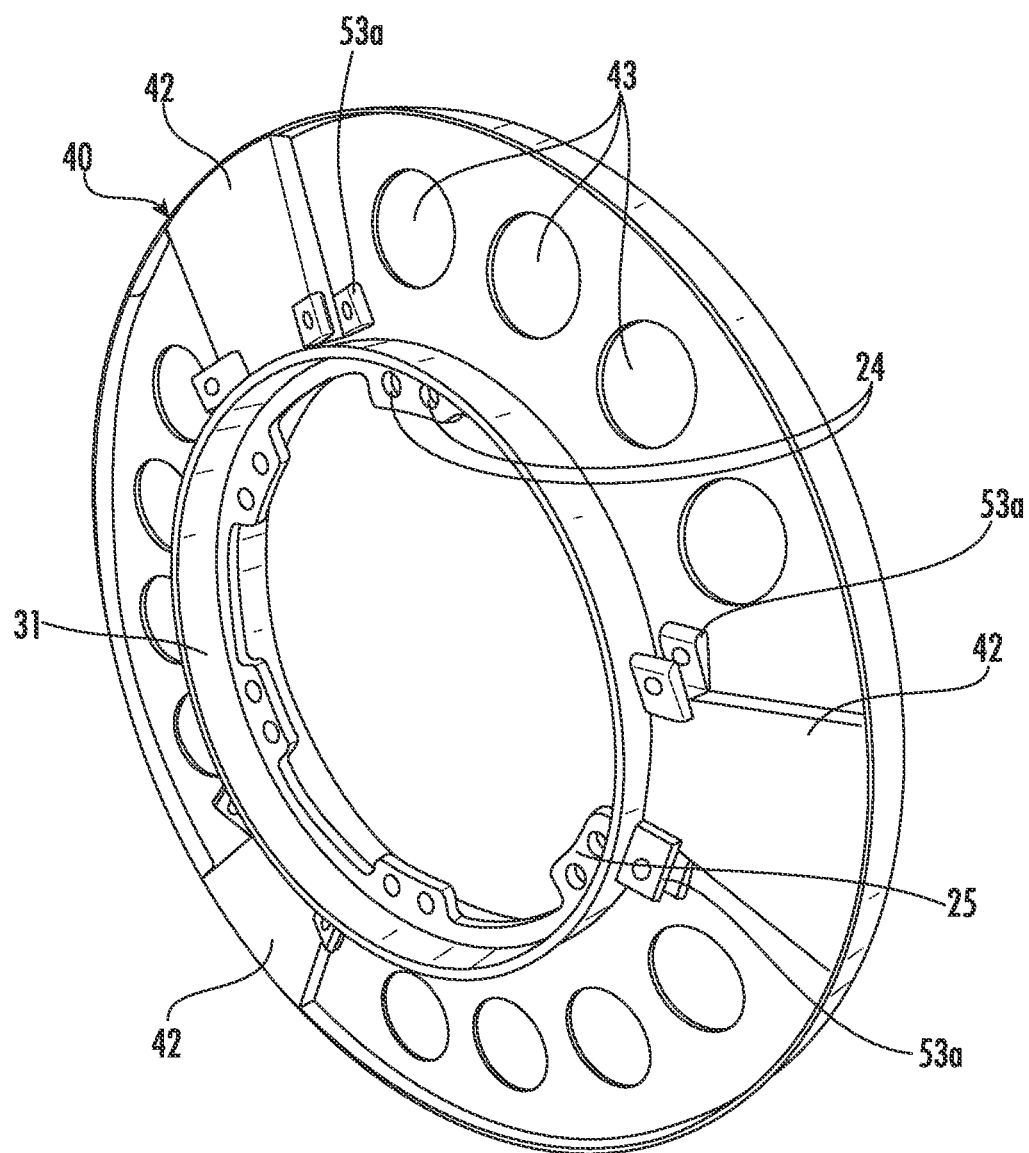
FIG. 6 is a perspective view of the inner rim, disk, and attachment brackets of the wheel assembly of FIG. 2.

Referring additionally to FIG. 6, a disk 40 is coupled to the inner rim 31 and defines a closeable gap 41 with adjacent interior portions of the outer rim 33. The disk 40 also includes weight-reduction openings 43 therein. The weight-reduction openings 43 each illustratively have a generally round or circular shape. The weight-reduction openings 43 may have another shape, such as oblong, hexagonal, and/or contoured for stress reduction, for example. Those skilled in the art will appreciate that having a reduced weight may increase the fuel efficiency of the vehicle 20 and/or may increase the lifespan of wheel assembly 30.

The disk 40 also includes spaced apart thickened wall portions 42. The spaced apart thickened wall portions 42 may be on both the inboard and outboard surfaces of the disk 40. Each thickened wall portion 42 may provide increased strength or support as a coupling or attachment point, and/or to accept increased stresses thereat as will be described in further detail below. The thickened wall portions 42 may be provided by welding an additional metal body in position, for example, or they may be integrally formed with the disk 40. Those skilled in the art will appreciate that the thickened wall portions 42 may be in the form of solid extensions (i.e., integrally formed with and/or a build-up of) of the disk 40, and/or discrete bodies, for example, that function as mechanical stiffeners.

The inner rim 31, outer rim 33, and disk 40 may be formed of a high strength and rugged material, such as steel. As will be appreciated by those skilled in the art other materials may also be used.

Gas springs 50 are operatively coupled between the inner rim 31 and the outer rim 33. Each gas spring 50 may be a double-acting gas spring, for example, and include a double-acting gas cylinder 51 and an associated piston 52. Of course, in some embodiments, each gas spring 50 may be a single-acting gas spring. More than one type of gas spring may be used. The gas springs 50 may be air springs and/or nitrogen springs, for example. The gas springs 50 may include other gasses as well.

Illustratively, the gas springs 50 are arranged in pairs on opposite sides of the disk 40. More particularly, the gas springs 50 diverge outwardly from the inner rim 31 to the outer rim 33. A respective attachment bracket 53a for each gas spring 50 is coupled to a respective thickened wall portion 42 of the disk 40, for example, adjacent the inner rim 31. Each attachment bracket 53a may include a generally U-shaped or V-shaped base bracket that receives an end of the piston 52 therein (e.g., between the arm of the U- or V-shaped bracket). A fastener fastens the end of the piston 52 of the gas spring 50 to the base bracket and thus, each gas spring is coupled adjacent the respective thickened wall portion 42 of the disk 40 and adjacent the inner rim 31. A similar attachment bracket 53b is coupled to the outer rim 33 adjacent inboard and outboard surfaces. Accordingly, the gas springs 50 are pivotally coupled between the inner and outer rims 31, 33.

As will be appreciated by those skilled in the art, the gas springs 50 provide a gas suspension for relative movement between the inner rim 31 and the outer rim 33. The gas springs 50 have an operating stroke the permits the disk 40 to define a mechanical stop. In other words, the gas springs 50 maintain the outer rim 33 spaced apart from the inner rim 31. However, if pressure on any gas spring 50 causes the gas spring to reach its limit under load or the gas spring fails, the disk 40 may act as a mechanical stop to limit relative movement between the inner and outer rims 31, 33. In other words, the disk 40 and gas springs 50 may considered as providing a run-flat capability.

Initial charge pressures of the gas springs 50, for example, when the gas springs are in the form of double-acting gas springs, will now be described, for example, with respect to initial pressures in the wheel assembly 30 when there are little or no external loads applied thereto (i.e., free-wheel).

In particular, the chamber associated with the piston-side of the cylinder 51 is typically smaller (e.g., by about 10%) than the chamber associated with the full-bore side of the cylinder. Thus, when the piston 52 is centered within the cylinder 51 so that there is a relatively equal stroke in tension and compression, the piston-side chamber pressure is higher (e.g., by about 10%) than the full-bore side chamber pressure.

Thus, while equal pressure charging of the double-acting gas cylinder 51 may be convenient, it results in an offset piston 52, which, in turn, results in an offset force to be applied to assemble the gas springs 50 within the wheel assembly 30. To accomplish this, the inner and outer rims 31, 33 may be temporarily fixed in a rigid jig. However, using a rigid jig may make replacement of the gas springs 50 in the field increasingly difficult. Thus, to address increased ease of in-field replacement of the gas springs 50, weld-on rings may be coupled to the inner and outer rims 31, 33 and to turn-buckles to temporarily lock the inner and outer rims in place. A similar arrangement may be used in-shop as well, as will be appreciated by those skilled in the art.

Accordingly, the result is a pre-stressed inner rim 31 suspension to the outer rim 33. The pre-stressing may ensure that the lateral stops 44, 45 (described below) are not active or under pressure. With different charge pressures, the suspension can be pre-compressed. While tension suspension and compression suspension may be considered equivalent, tension suspension may be particularly advantageous over compression suspension, as will be appreciated by those skilled in the art.

Another assembly technique may include applying a higher charge pressure (e.g., about 10% more) at the piston-side to center the piston 52 at about the half-stroke position. This results in there being no initial load on the gas spring 50 at the wheel assembly 30 and facilitates assembly without the temporary fixing within a jig. Thus, the wheel assembly 30 may be considered to be neither pre-stressed, nor pre-compressed, but neutral. For example, a higher full-bore side chamber pressure may be applied (e.g., about 10% higher) than the piston side chamber pressure. Gas may be released from the full-bore side chamber until the piston 52 becomes centered relative to full-stroke. Alternatively, a higher piston-side chamber pressure may be applied (e.g., about 10% higher) than the full-bore side chamber pressure. Releasing gas from the cylinder 51 may be considered easier than surcharging, however, this may use more gas (e.g., nitrogen) than other approaches resulting in an increased cost.

The wheel assembly 30 also includes inboard lateral stops 44 carried by an inboard surface of the outer rim 33. More particularly, the inboard lateral stops 44 are positioned adjacent the thickened wall portion 42. The wheel assembly 30 also includes outboard lateral stops 45 carried by an outboard surface of the outer rim 33. Similarly to the inboard lateral stops 44, the outboard lateral stops 45 are adjacent the thickened wall portion 42. Each thickened wall portion 42 is positioned between a pair of inboard and outboard lateral stops 44, 45. The inboard and outboard lateral stops 44, 45 together with the outer rim 33 may conceptually be considered to be in the form of an L-shaped bracket. Illustratively, the inboard and outboard lateral stops 44, 45 each has a support plate 61 (e.g., having a rectangular shape) that is transverse to the outer rim 33 and has triangular side members 62.

As will be appreciated by those skilled in the art, the inboard and outboard lateral stops 44, 45 cooperate to limit relative lateral movement of the disk 40 and the outer rim 33.

In other words, turning, for example, of the vehicle 20 may cause lateral movement of the disk 40 relative to the outer rim 33. The inboard and outboard lateral stops 44, 45 may limit the amount of lateral movement of the disk 40 relative to the outer rim 33 to thereby maintain structural integrity of the wheel assembly 30. Of course, the inboard and outboard lateral stops 44, 45 include other and/or additional components or elements that cooperate to limit relative lateral movement of the disk 40 and the outer rim 33.

Referring now additionally to FIGS. 7-16, the wheel assembly 30 illustratively includes tread assemblies 70 carried by the outer rim 33. Each tread assembly 70 includes a tread member support 71. Each tread member support 71 may be in the form of an arcuate metal plate with openings 69a, 69b therein (FIG. 10) and may couple to an outer circumference of the outer rim 33. One or more of the tread member supports 71 may be a flat plate in other embodiments. A center one of the openings 69b may receive a pin 83 therein as will be described in further detail below. In some embodiments, the tread member support 71 may not be metal, such as steel. Those skilled in the art will appreciate that given the arcuate shape of the tread member support 71, several tread assemblies 70 are coupled in end-to-end relation around the outer rim 33.

Figure 17:
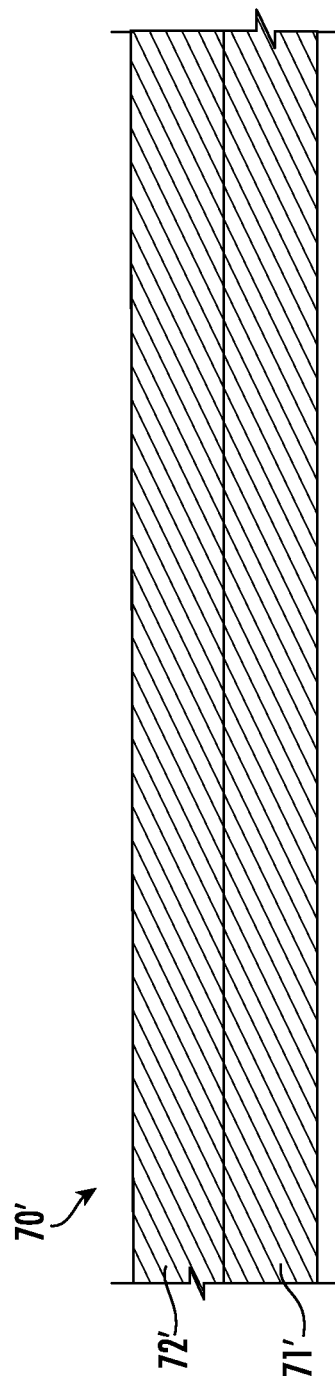
FIG. 17 is a cross-sectional view of a portion of a tread assembly in accordance with another embodiment.

A tread member 72 is coupled or bonded, for example, glued, fastened, etc., to the tread member support 71, and a clamping arrangement 73 removably securing the tread member support to the outer rim 33. There may be more than one tread member 72 bonded to the tread member support 71. The tread member 72 includes a resilient body 85 that has tread pattern 86 defined in an outer surface thereof. The resilient body 85 may include rubber or other material, which may be selected based upon desired friction, traction, or other characteristics, for example, based upon the use of the vehicle 20. The material of the tread member 72 may a metal such as steel, in other embodiments. The tread pattern 86 may similarly be selected based upon desired traction or other characteristics, for example, based upon the use of the vehicle 20. Moreover, referring briefly to FIG. 17, in another embodiment of a tread assembly 70', each tread member 72' and tread member support 71' may include a common material integrally formed as a monolithic unit, which may or may not be metal, such as steel. In other words, each tread member 72' and tread member support 71' define a single unit or body of the same material (e.g., an all-metal tread member support and tread member).

Further details of the clamping arrangement 73 will now be described. The clamping arrangement 73 illustratively includes inboard clamping members 74 coupled to the inboard side of the outer rim 33. The inboard clamping members 74 each have a first slotted recess 75 receiving adjacent portions of the tread member support 71. The inboard clamping members 74 are removably coupled to the inboard side of the outer rim 33. The inboard clamping members 74 are illustratively arranged in an end-to-end relation and each coupled to adjacent respective portions of the outer rim 33. In some embodiments, the inboard clamping members 74 may be fixed, for example, welded or fixedly coupled, to the inboard side of the outer rim 33 and/or a single inboard clamping member may be used.

The inboard clamping members 74 are coupled to the inboard side of the outer rim 33 by way of fasteners 79a, for example, threaded fasteners to facilitate removal and replacement, for example, when tread members 72 wear or it is desirable to replace the tread members. The threaded fasteners 79a may extend through openings 89 in the inboard clamping members 74 and engage corresponding threaded openings 81*a* in the outer rim 33.

The clamping arrangement 73 also illustratively includes outboard clamping members 76 coupled to the outboard side of the outer rim 33. Similar to the inboard clamping member 74, the outboard clamping members 76 each has a second slotted recess 77 therein receiving adjacent portions of the tread member support 71. The outboard clamping members 76 are removably coupled to the outboard side of the outer rim 33. The outboard clamping members 76 are illustratively arranged in an end-to-end relation and each coupled to adjacent respective portions of the outer rim 33. In some embodiments, a single outboard clamping member 76 may be coupled to the outboard side of the outer rim 33 and extend the circumference of the outer rim.

The outboard clamping members 76 are coupled to the outboard side of the outer rim 33 by way of fasteners, for example, threaded fasteners to facilitate removal and replacement, for example, when tread members 72 wear, or it is desirable to replace the tread members. The threaded fasteners may extend through openings 78 in the outboard clamping members 76 and engage corresponding threaded openings 81*b* in the outer rim 33.

The tread member support 71 and adjacent portions of the outer rim 33 (e.g., along the outer circumference) define a retaining feature therebetween. The retaining feature is illustratively in the form of or includes a pin 83 carried by the outer rim 33 and a pin-receiving opening 84 in the tread member support 71. The pin 83 and the pin-receiving opening 84 may advantageously prevent relative movement between the tread member support 71 and the outer rim 33, and also facilitate replacement (e.g., easy alignment) of the tread members 72, for example, thereby reducing downtime of the vehicle 20.

Figure 18:
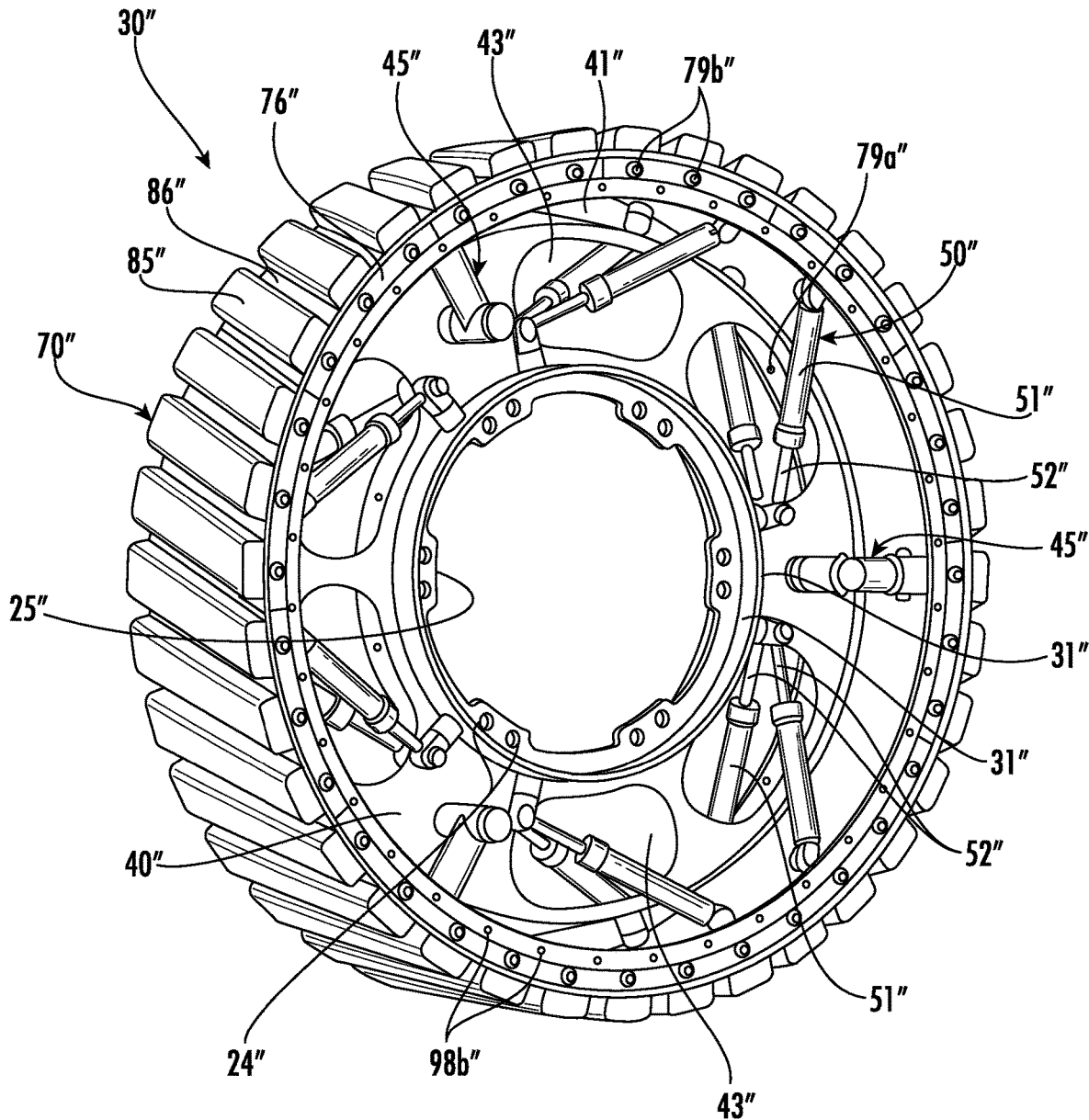
FIG. 18 is a perspective view of a wheel assembly in accordance with another embodiment.
Figure 19:
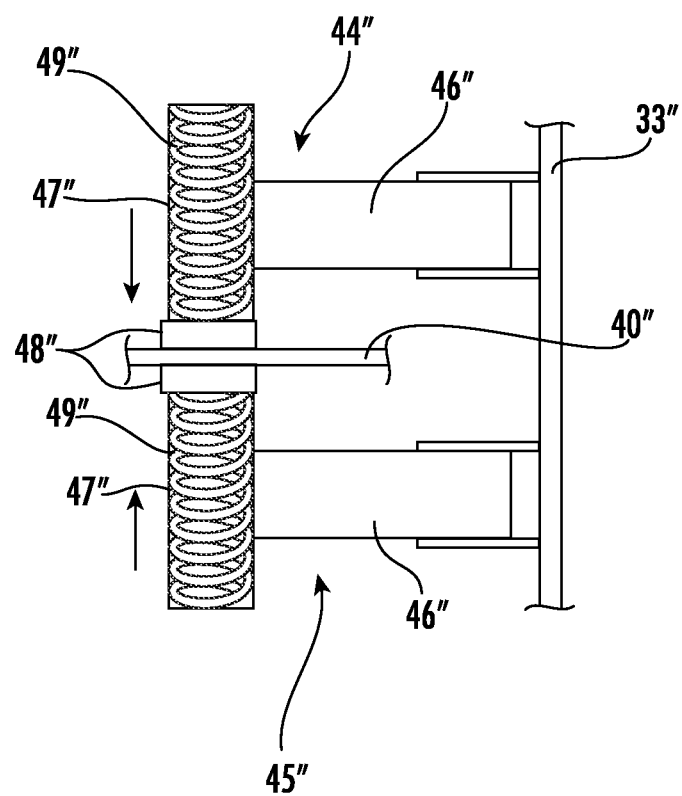
FIG. 19 is a schematic diagram of the lateral stops of FIG. 18.

Referring now briefly to FIGS. 18 and 19, in another embodiment, the inboard and outboard lateral stops 44", 45" are biased toward the disk 40". More particularly, the inboard and outboard lateral stops 44", 45" each includes an arm 46" extending radially inward from the inboard and outboard interior surfaces of the outer rim 33". A transverse arm 47" is coupled to an end of each arm 46". Each transverse arm 47" carries a plug 48" that is biased toward the disk 40" by a biasing member 49", for example, a spring, such as a coil spring. Other biasing arrangements may be used. Elements labeled 24", 25", 30", 31", 41", 43", 45", 50", 51", 52", 70", 76", 79*a*", 79*b*", 85", 86", and 98*b*" are similar to those respectively numbered elements described above without double prime notation.

Figure 20:
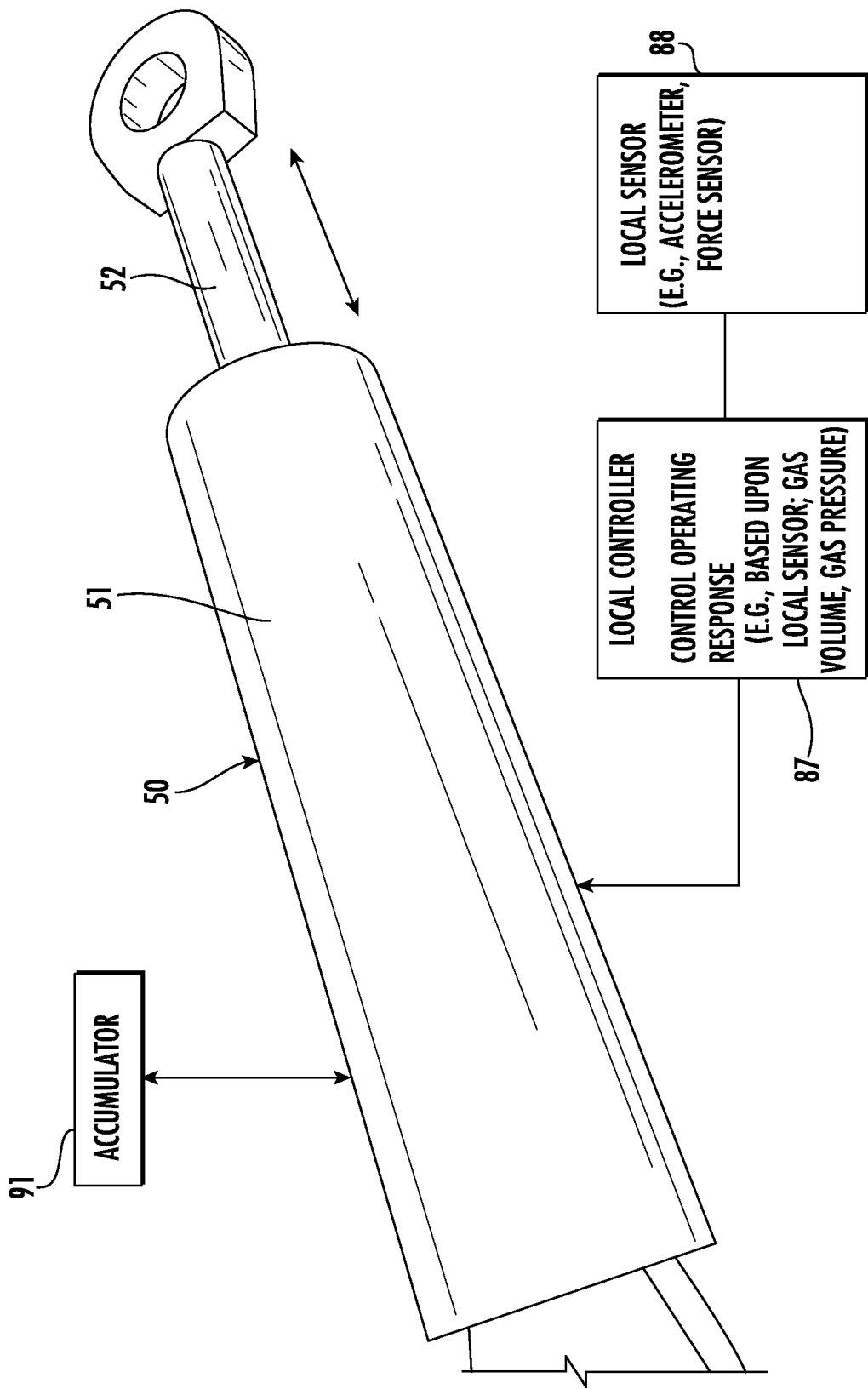
FIG. 20 is a schematic diagram of a portion of a wheel assembly including a local controller for controlling an operating response of a gas spring in accordance with an embodiment.

Referring now additionally to FIG. 20, one or more of the gas springs 50 may have a controllable response. For example, the gas springs 50 may have either or both of a controllable gas pressure and a controllable gas volume. Any number of the gas springs 50 may have a controllable response. By having a controllable response, each of the gas springs 50 may be operated or controlled as will be explained in further detail below, for example, with respect to certain operating conditions and/or environments. More particularly, the wheel assembly 30 may include a local controller 87 (e.g., including a processor and/or circuitry) that is coupled to the gas springs 50. The local controller 87 may be coupled to any number of gas springs 50. The local controller 87 may be carried within the outer rim 33, for example, inside the outer rim, or by the disk 40. The local controller 87 may be carried by other elements of the wheel assembly 30. The local controller 87 may also include respective actuators and/or valves to control the response of the gas springs 50 and cooperate with an accumulator 91 also coupled to the gas springs to act as a pressure and/or volume storage reservoir for gas springs.

The wheel assembly 30 may also include a local sensor 88 coupled to the local controller 87. The local controller 87 may control (e.g., monitor and/or adjust) the operating response of the gas springs 50 based upon the local sensor 88. For example, the local controller 87 may adjust the pressure or volume of the gas springs 50 without controlling the operation (e.g., extend/retract) of the gas springs. The local controller 87 may also adjust, for example, alternatively or additionally, the operation (e.g., extend/retract) of the gas springs 50.

The local sensor 88 may be an acceleration sensor, for example, and cooperate with the local controller 87 to control the controllable response of the gas springs 50 based upon a sensed acceleration (e.g., braking, turning, etc.). The local sensor 88 may be another type of sensor, for example, a force sensor. There may be more than one local sensor 88. In some embodiments, the local controller 87 may cooperate with the local sensor 88 to generate a notification, for example, when a sensed value exceeds a threshold. The notification may be communicate within the vehicle 20 (e.g., in the cab) or remotely from the vehicle. In other words, the local controller 87 may cooperate with the local sensor 88 independently from or without controlling the operating response of the gas springs 50.

Figure 21:
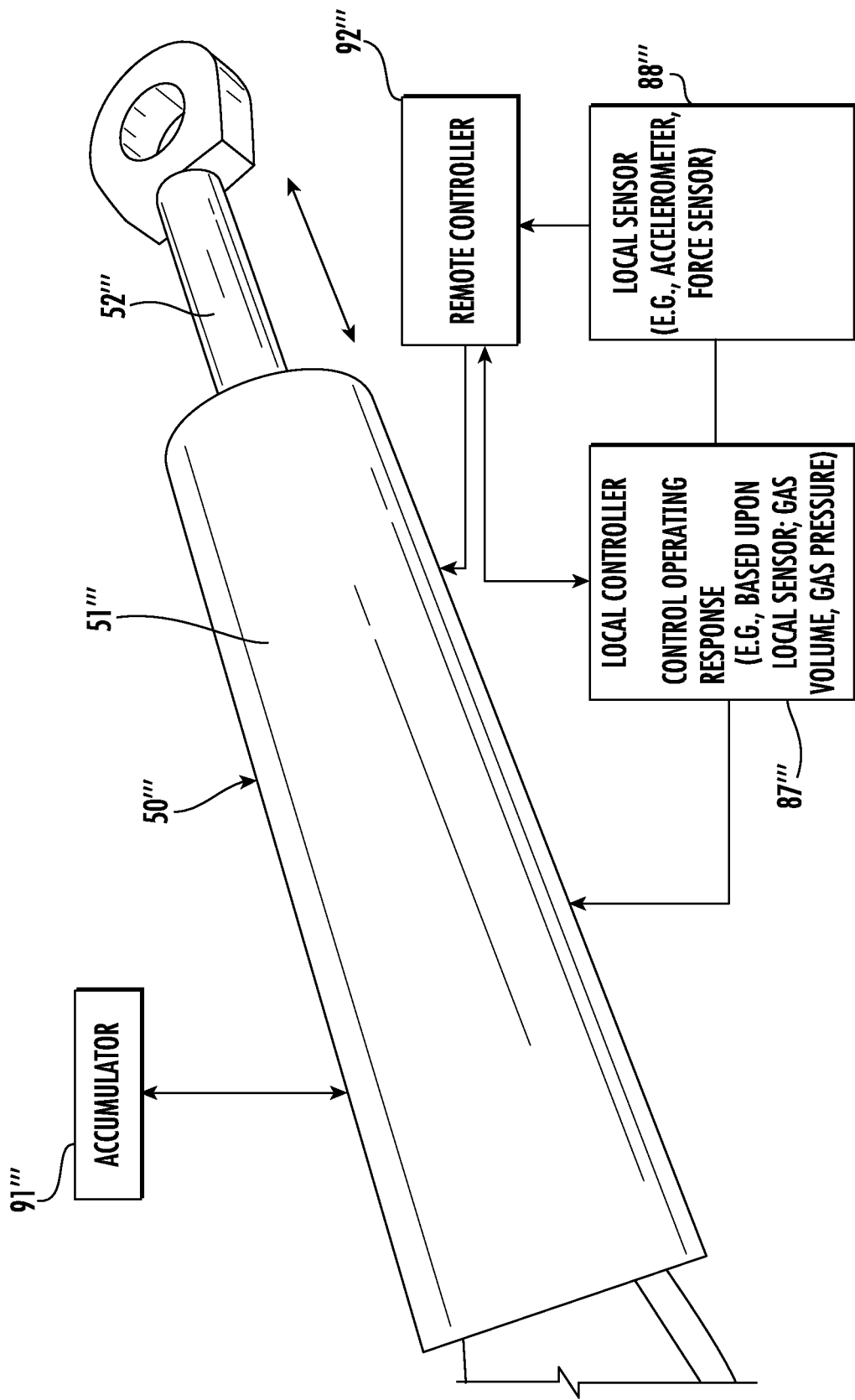
FIG. 21 is a schematic diagram of a portion of a wheel assembly including a local controller for controlling an operating response of a gas spring in accordance with another embodiment.

Referring now briefly to FIG. 21, in another embodiment, a remote controller 92''' may be carried remote from the wheel assembly 30, for example, within a wheel well of the vehicle 20 or within the truck cab. The remote controller 92''' may cooperate with the local sensor 88''' or other sensor, for example, remote from the wheel assembly 30. The remote controller 92''' may also cooperate with the local controller 87''' to effectuate a change in the operating response of the gas springs 50'''. Wiring from the remote controller 92''' may extend to the local controller 87''', and/or the remote controller may wirelessly communicate with the local controller. Elements labeled 51''', 52''', and 91''', are similar to those respectively numbered elements described above without triple prime notation.

Those skilled in the art will appreciate that the local controller 87 controls the operating response of the gas springs 50 while the wheel assembly 30 is rolling. For example, if the vehicle 20, during motion thereof, makes a relatively sharp turn or applies the brakes, the local controller 87 may independently control the operating response of each or selected ones of the gas springs 50 based upon the turn or braking (e.g., increase pressures in the gas springs of front wheel assemblies). Other motion of the vehicle 20 may cause changes in the operating response, such as, for example, failure of any of the gas springs 50, debris in the tread members 72, and/or contact of the disk 40 with the outer rim 33.

Figure 7:
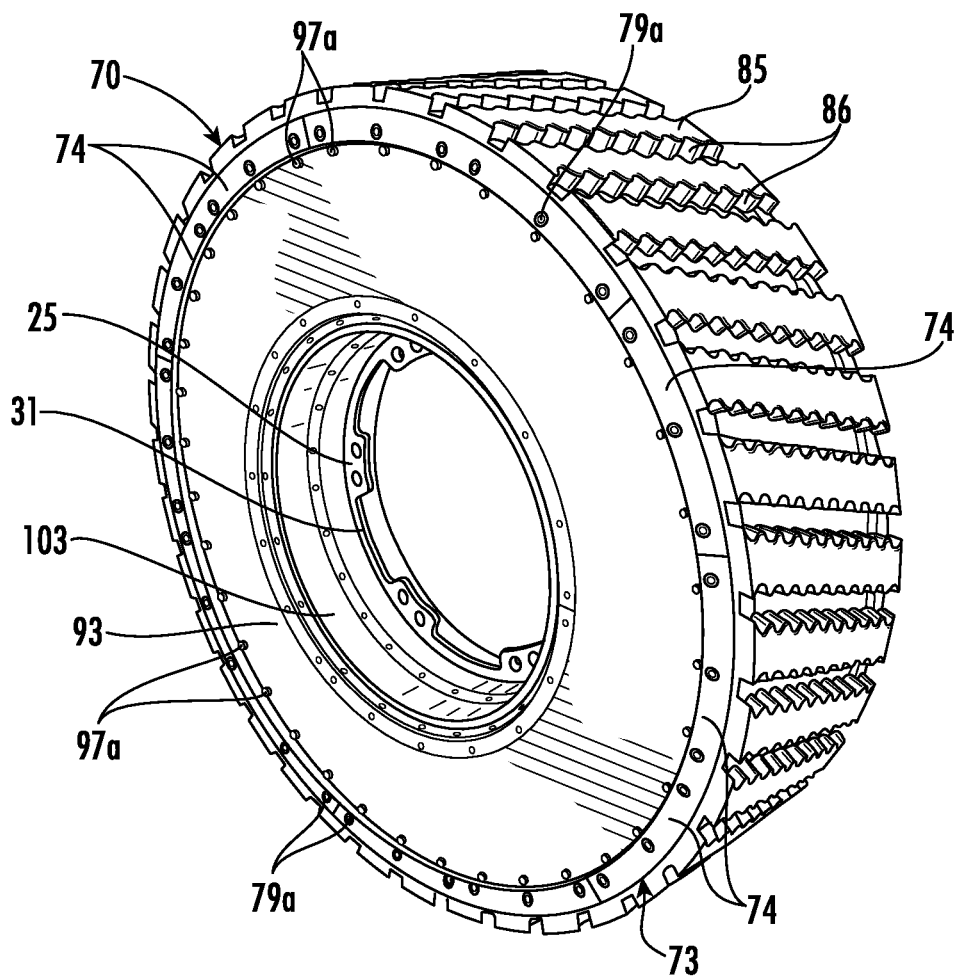
FIG. 7 is a perspective view of a portion of a wheel assembly including tread assemblies and a removable sidewall in accordance with an embodiment.
Figure 8:
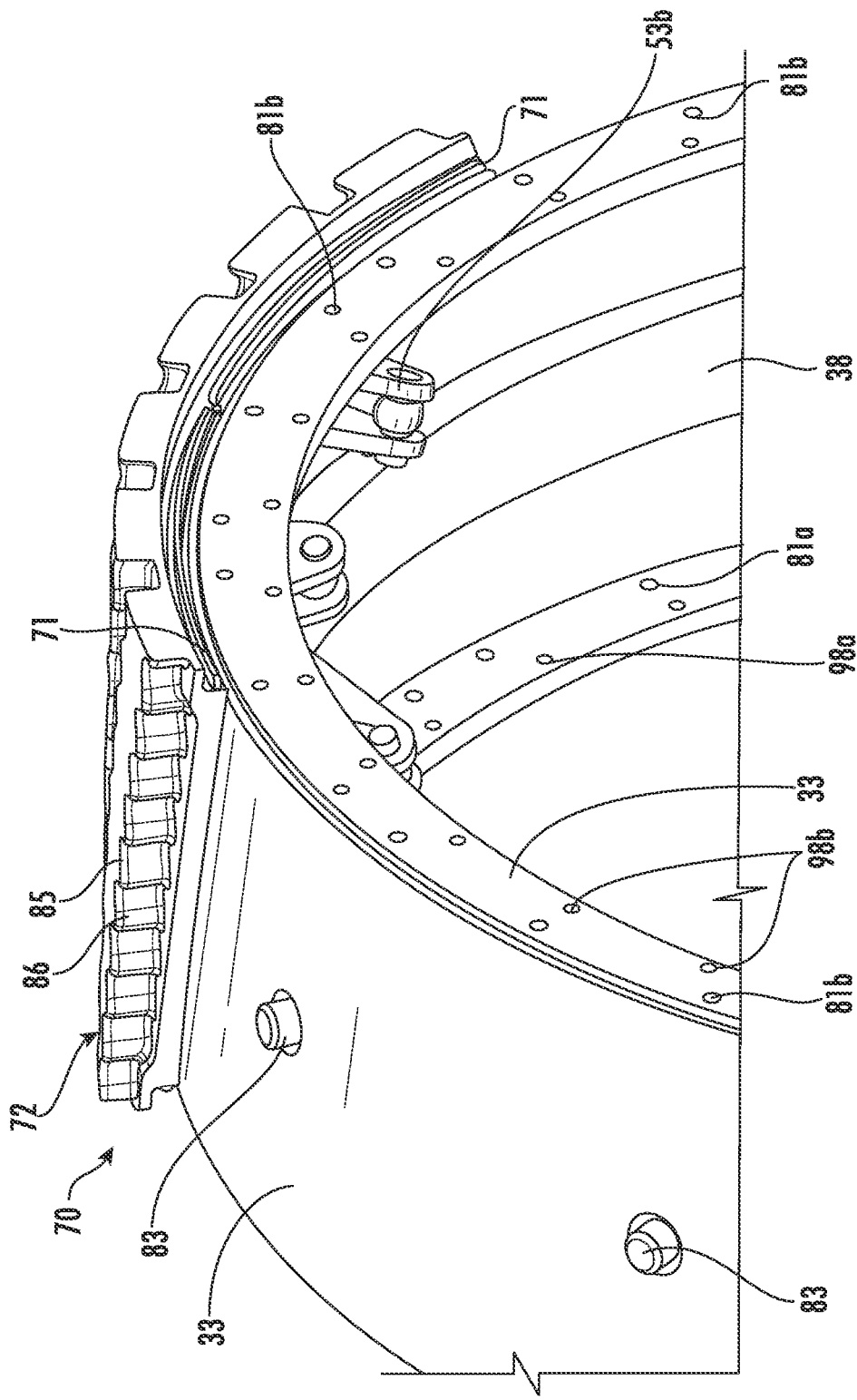
FIG. 8 is a perspective view of a portion of a wheel assembly in accordance with an embodiment.
Figure 9:
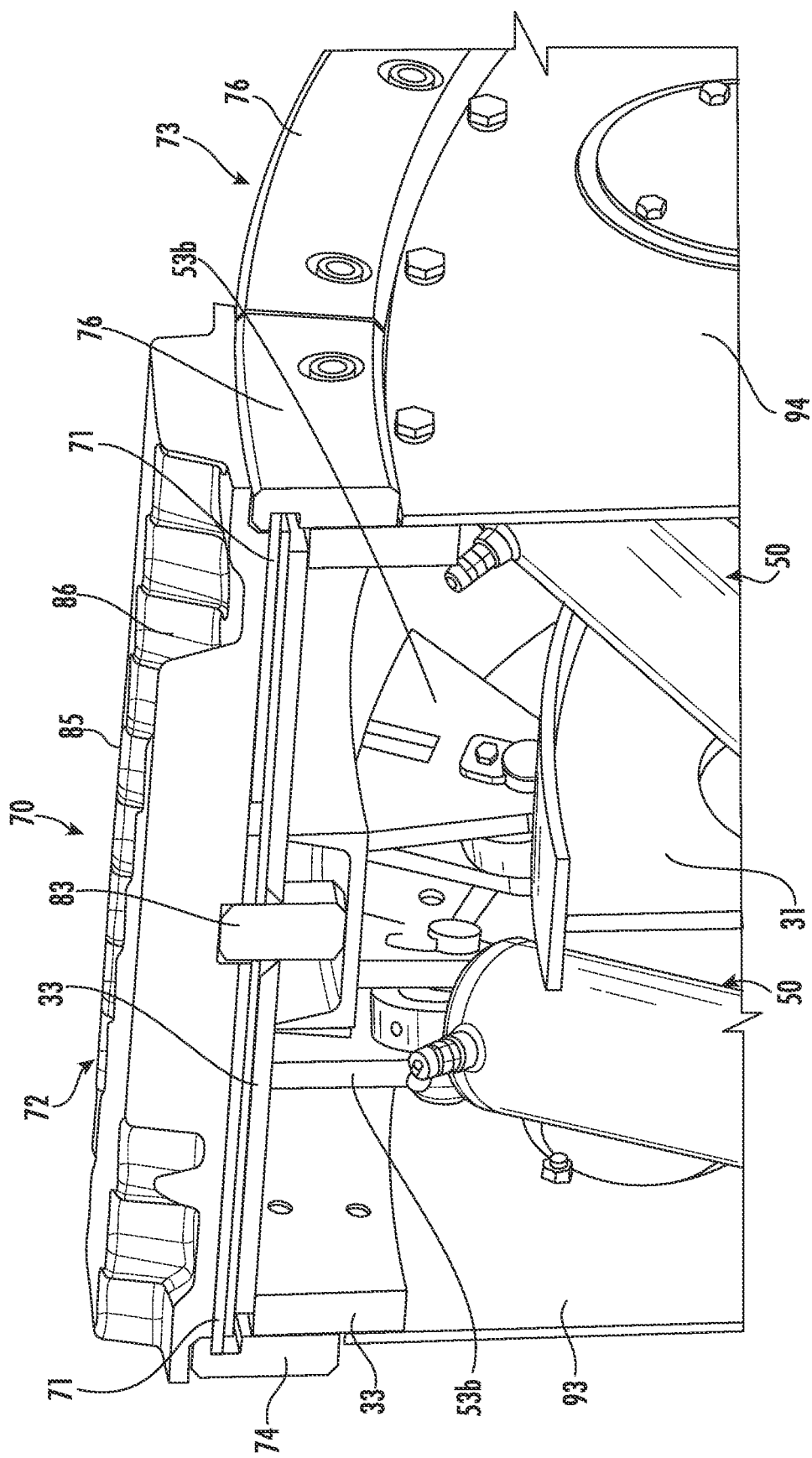
FIG. 9 is another perspective view of a portion of a wheel assembly in accordance with an embodiment.
Figure 10:
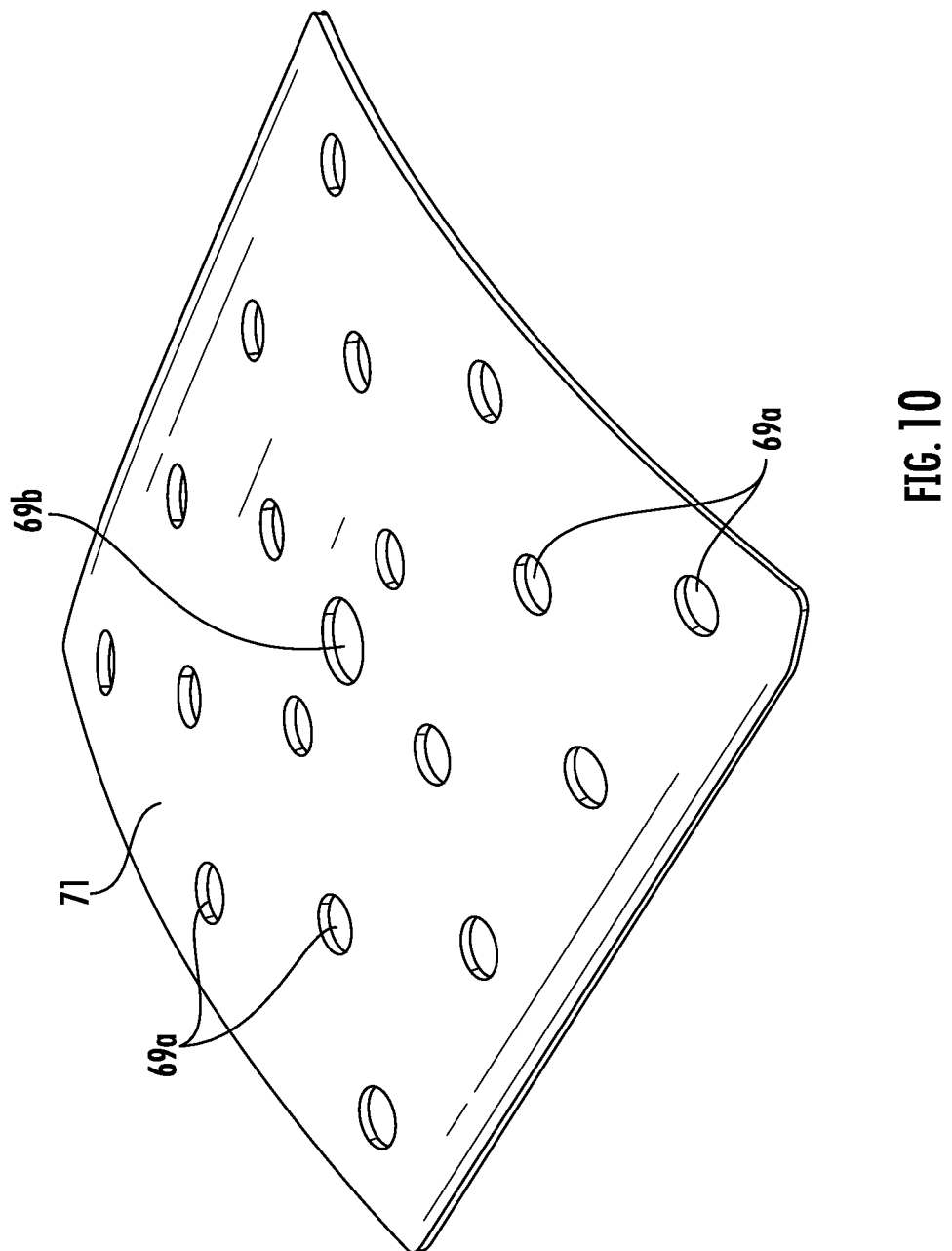
FIG. 10 is a perspective view of the tread member support of FIG. 9.
Figure 11:
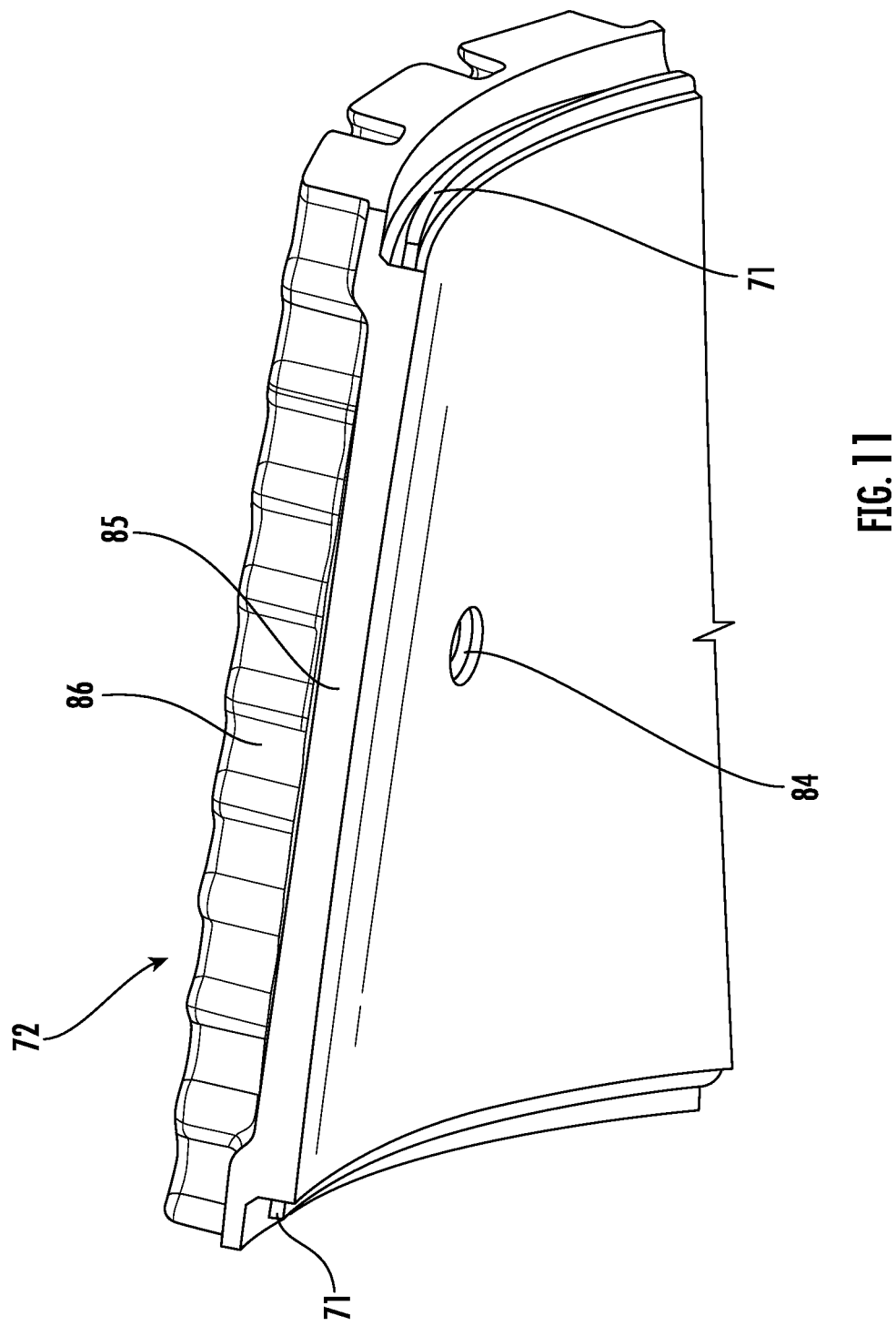
FIG. 11 is a perspective view of a portion of the tread assembly of FIG. 9.
Figure 12:
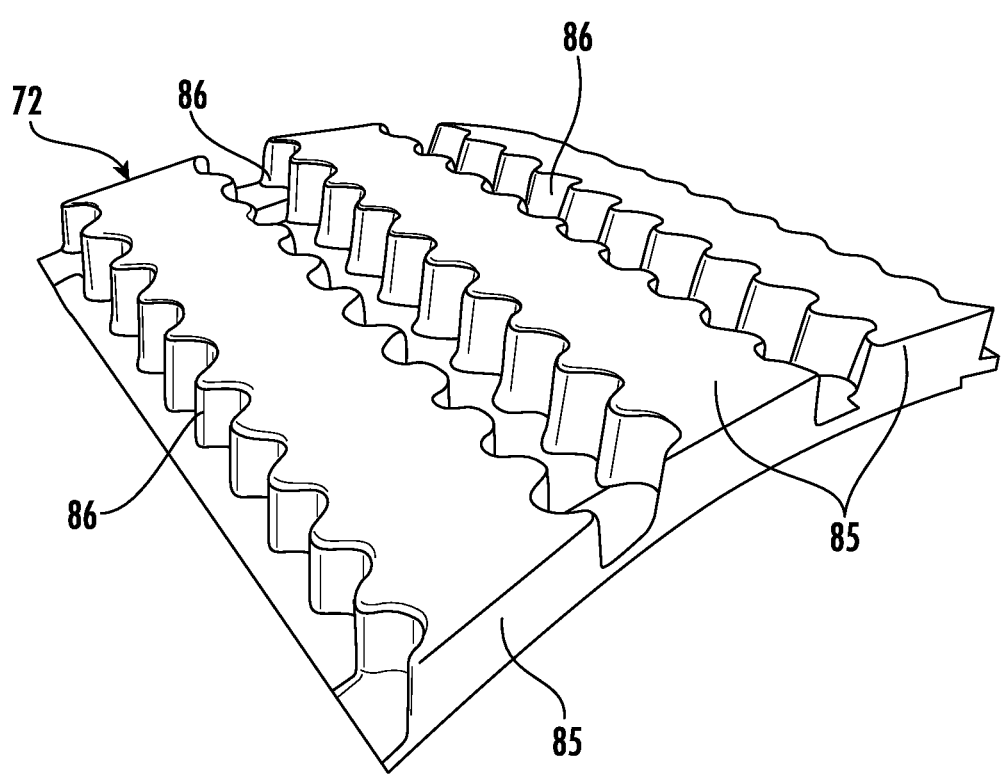
FIG. 12 is a perspective view of a tread member of the tread assembly of FIG. 9.
Figure 13:
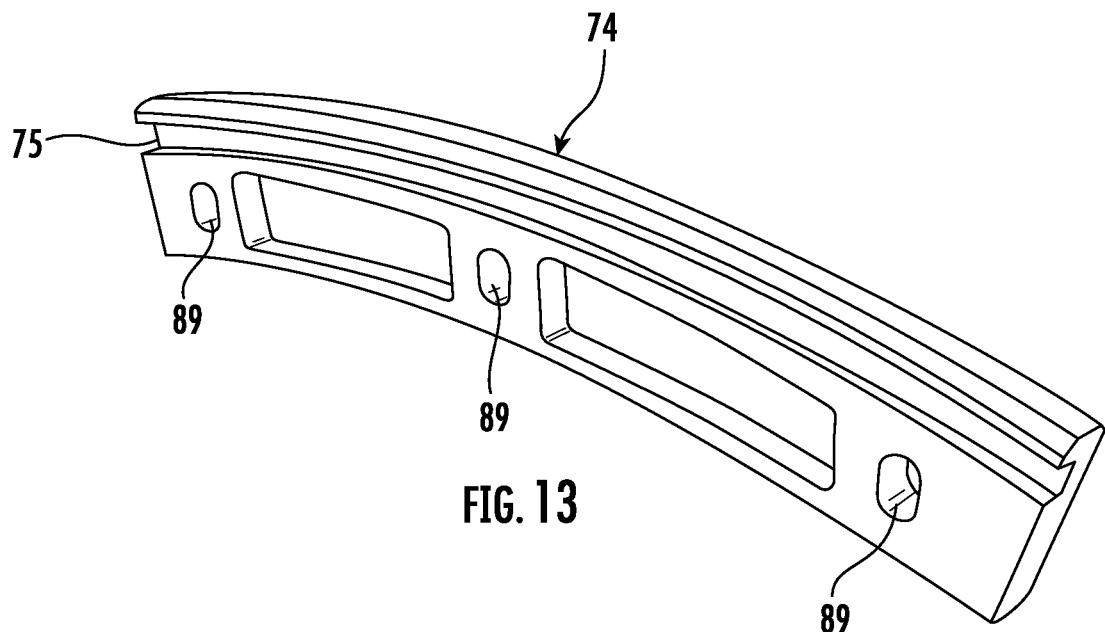
FIG. 13 is a perspective view of an inboard clamping member of a wheel assembly according to an embodiment.
Figure 14:
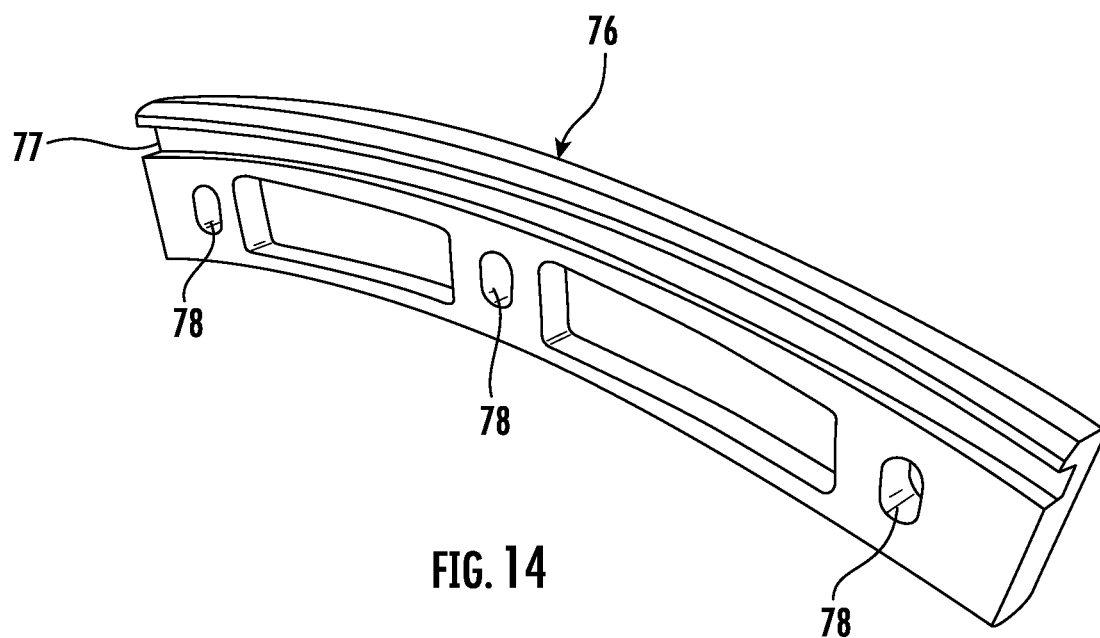
FIG. 14 is a perspective view of an outboard clamping member of a wheel assembly according to an embodiment.
Figure 15:
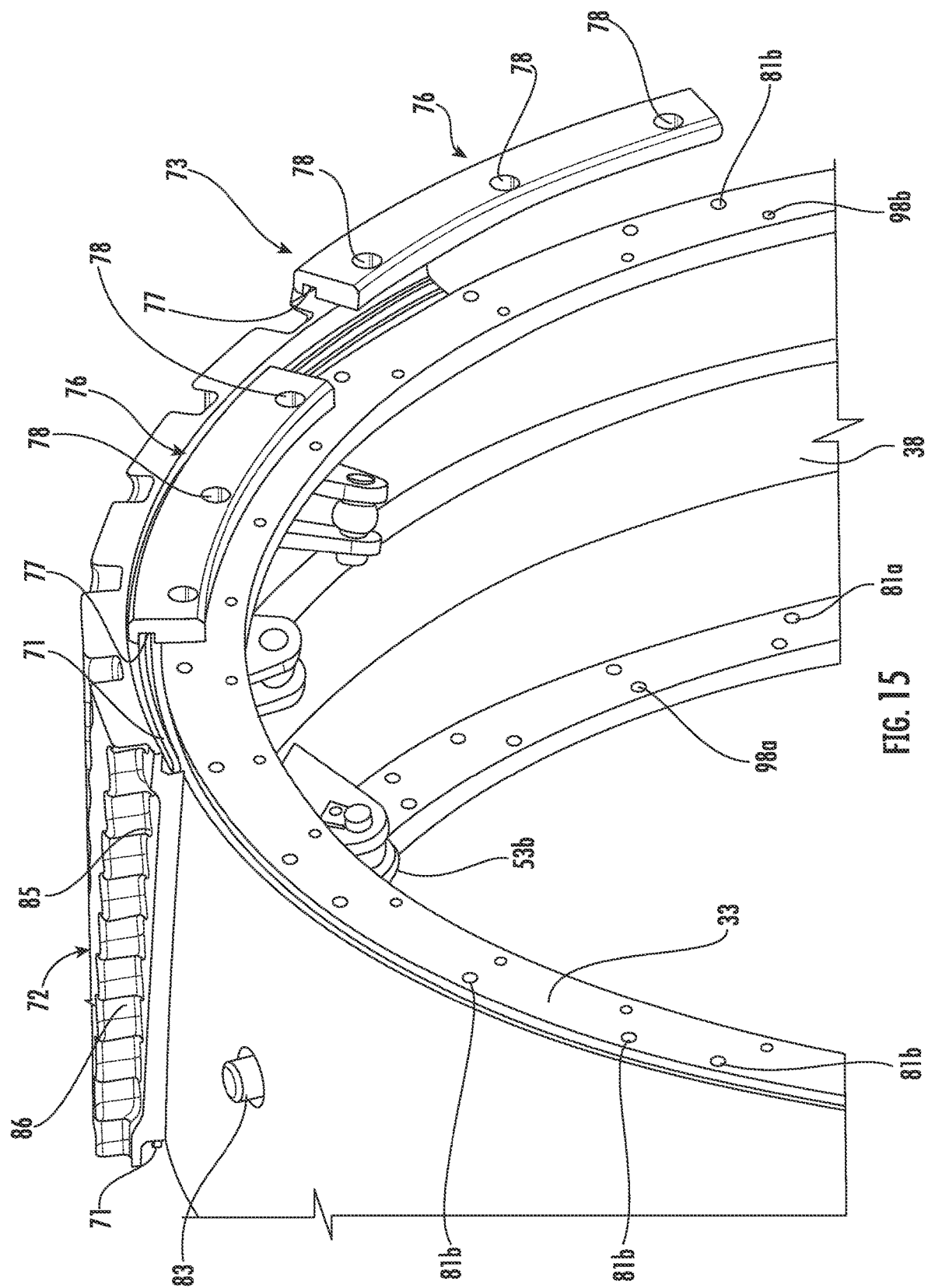
FIG. 15 is a perspective view of a portion of a wheel assembly including outboard clamping members in accordance with an embodiment.
Figure 16:
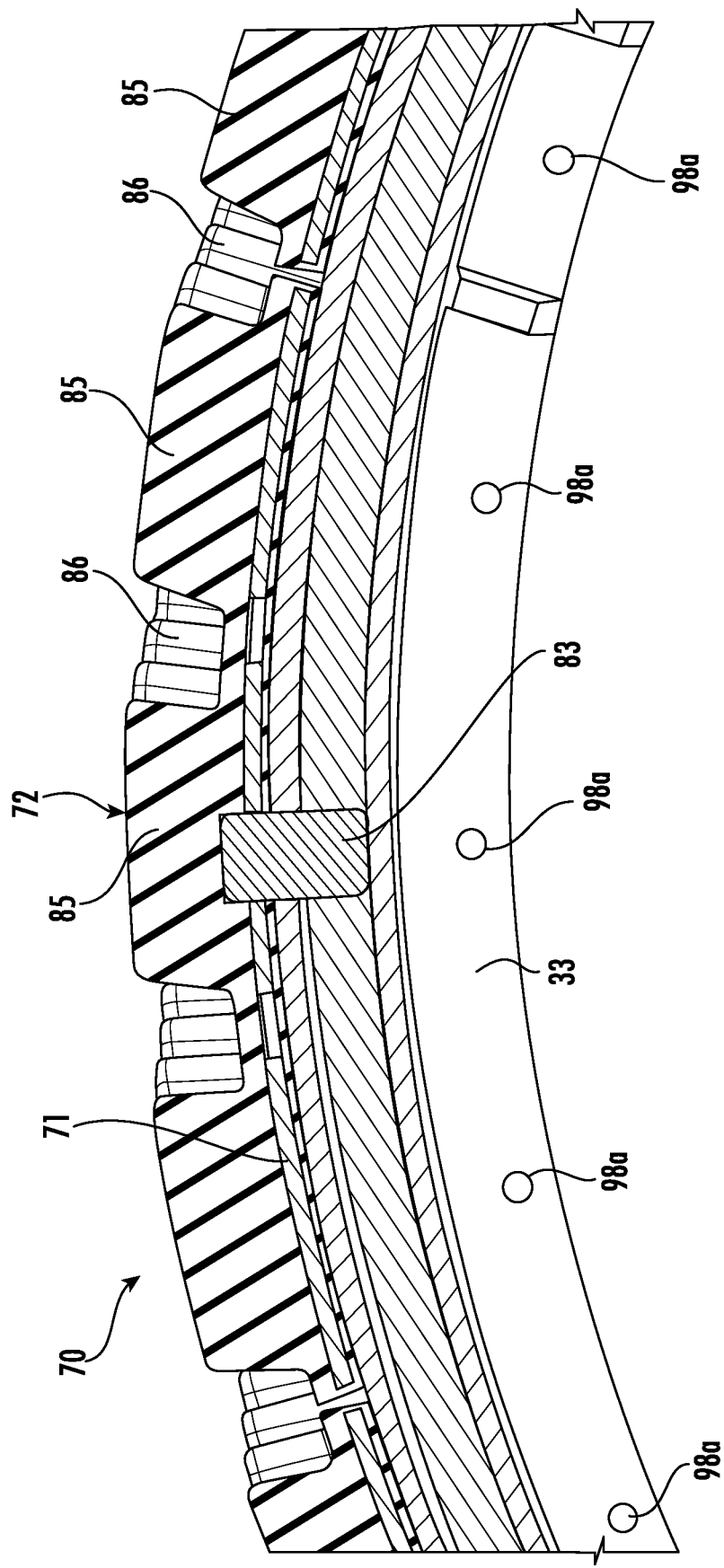
FIG. 16 is a cross-sectional view of a portion of an outer rim, retaining feature, and tread assembly in accordance with an embodiment.
Figure 22:
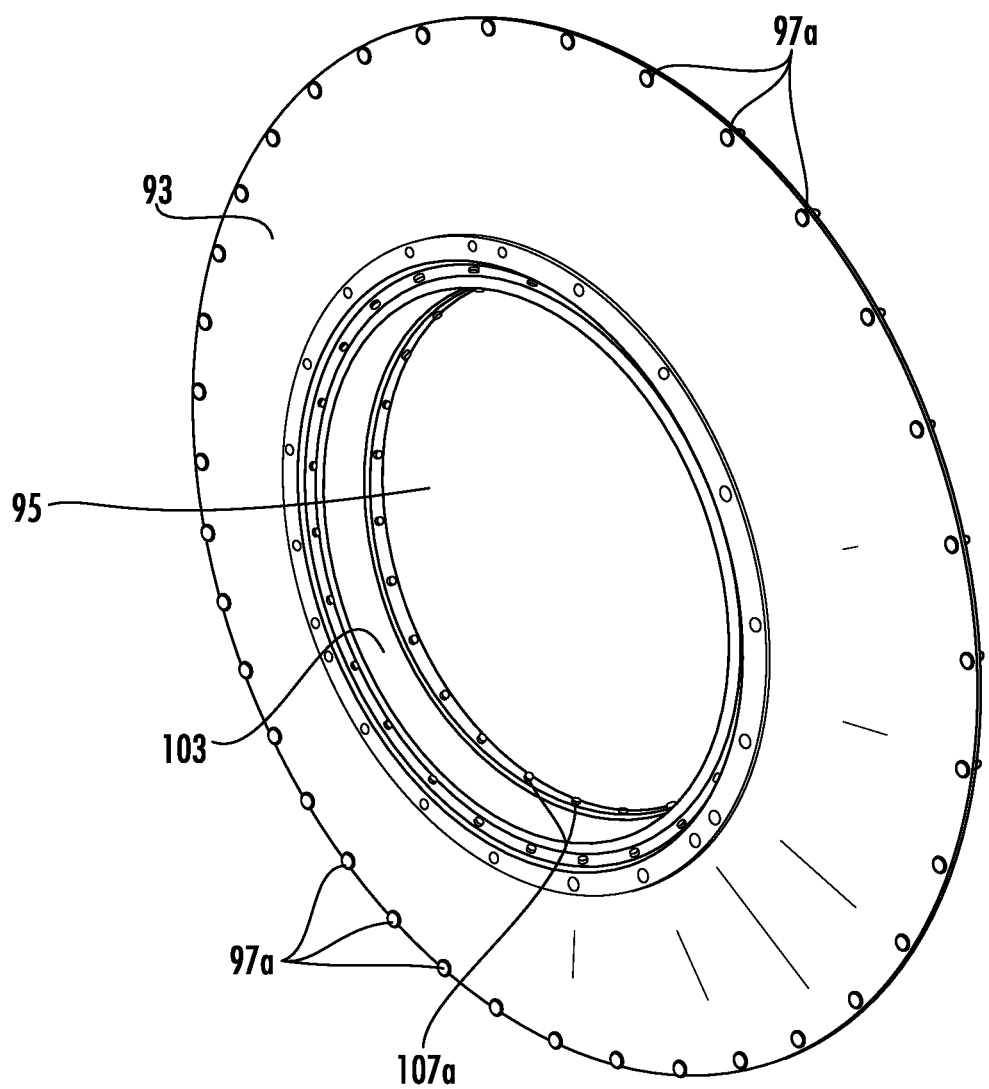
FIG. 22 is a perspective view of the inboard removable sidewall of the wheel assembly in accordance with an embodiment.
Figure 23:
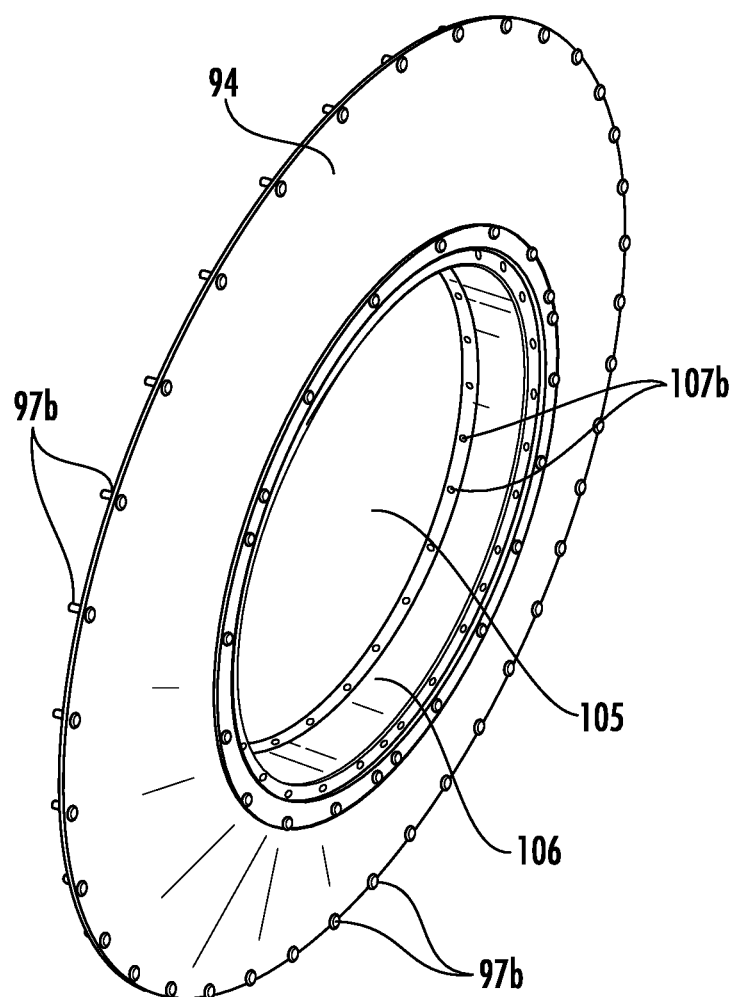
FIG. 23 is a perspective view of an outboard removable sidewall of a wheel assembly in accordance with an embodiment.

Referring now additionally to FIGS. 22 and 23, the wheel assembly 30 may include inboard and outboard removable sidewalls 93, 94. The inboard and outboard removable sidewalls 93, 94 are each illustratively in the form of a round or circular cover carried by the outer rim 33. More particularly, the inboard and outboard removable sidewalls 93, 94 each has an opening 95, 105 therein to permit, for example, coupling of the wheel assembly 30 to the hub 21. Respective flanges 103, 106 extend inwardly within the openings 95, 105. The inboard and outboard removable sidewalls 93, 94 may each be coupled to the inboard and outboard sides of the outer rim 33 by way of fasteners 97*a*, 97*b* and to the inner rim 31 also by way of fasteners 107*a*, 107*b*. The fasteners 97*a*, 97*b* may be received through fastener receiving passageways along the outer circumference of each of the inboard and outboard removable sidewalls 93, 94 and fasten to corresponding respective aligned threaded passageways 98a, 98b in the outer rim 33. The threaded passageways 98a, 98b in the outer rim 33 form a second, inner row of threaded passageways, with the outer row of threaded passageways 81a, 81b for securing the clamping arrangement 73 to the outer rim with fasteners 79a (FIG. 7).

Figure 24:
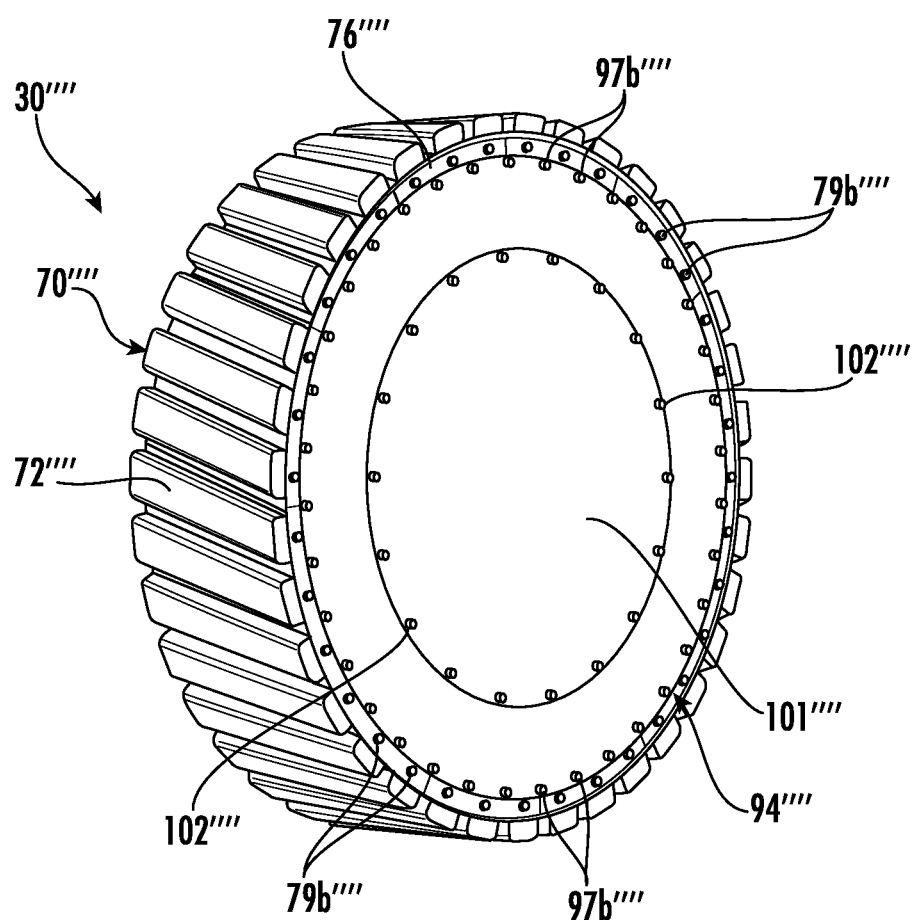
FIG. 24 is a perspective view of a wheel assembly in accordance with another embodiment.

Referring now to FIG. 24, in another embodiment, the outboard removable sidewall 94"" may have a removable inner panel 101"" that when removed, by way of respective fasteners 102"", permit access to inner interior of the wheel assembly 30"", for example, the inner rim. Similar to the outboard removable sidewall described above, the outboard sidewall 94"" couples by way of fasteners 97b"" to the outer rim inside of or adjacent the outboard clamping members 76"" (which are secured to the outer rim also by way of fasteners 79b""). Elements labeled 51"", 52"", 91"", 70"" and 72"" are similar to those respectively numbered elements described above without quadruple prime notation.

As will be appreciated by those skilled in the art, the inboard and outboard removable sidewalls 93, 94 may be particularly advantageous for reducing the amount of dust and/or debris within the interior of the wheel assembly 30, for example, between the inner and outer rims 31, 33. Accordingly, elements of the wheel assembly 30, for example, the disk 40 and gas springs 50, may have increased protection against damage, for example, from environmental elements (e.g., rocks, dust, dirt, water, etc.), and thus may have a longer service life. In some embodiments, the wheel assembly 30 may not include the inboard and outboard removable sidewalls 93, 94.

Figure 25:
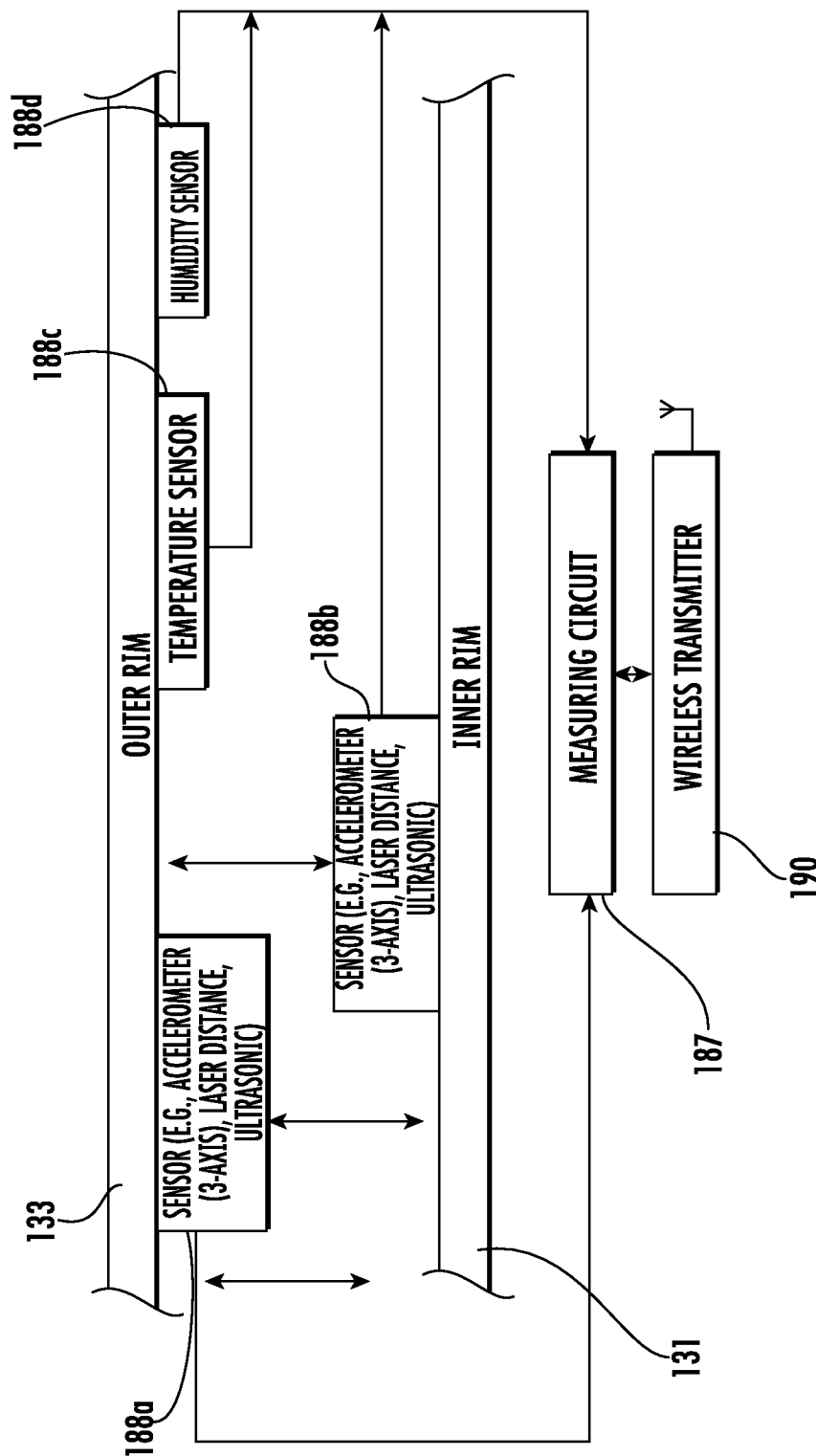
FIG. 25 is a schematic diagram of a portion of a wheel assembly including a sensor for measuring distance between the inner and outer rims in accordance with another embodiment.

Referring now to FIG. 25, in another embodiment, sensors 188a, 188b sense relative movement, such as by sensing a distance between the inner rim 131 and the outer rim 133. More particularly, the sensors 188a, 188b may be in the form of three-axis accelerometers. Of course, the sensors 188a, 188b may be other types of sensors, for example, laser distance sensors, ultrasonic sensors, linear variable differential transformer (LVDT) sensors, and/or other contact or non-contact displacement sensors.

When the sensors 188a, 188b are in the form of three-axis accelerometers, one of the accelerometers is carried by the inner rim 131 defining an inner accelerometer, while another accelerometer is carried by the outer rim 133 defining an outer accelerometer. The inner and outer accelerometers 188a, 188b are aligned by way of their axes so that relative movement between the inner and outer rims 131, 133 as a sensed acceleration can be translated, for example, by way of a distance measuring circuit 187 coupled to the accelerometers 188a, 188b (e.g., integrating each acceleration).

The sensors 188a, 188b may each be different from one another. For example, an ultrasonic sensor may be used with the inner and outer accelerometers 188a, 188b to sense or measure displacement (e.g., tangential to the inner and outer accelerometers). Of course, a laser distance sensor may be used as an alternative to the ultrasonic sensor or in conjunction with the ultrasonic sensor and/or the inner and outer accelerometers 188a, 188b. The measuring circuit 187 may be carried by the wheel assembly, the vehicle, or remote from the vehicle.

A temperature sensor 188c may be carried by the outer rim 133 (e.g., within or on an inner surface of the outer rim) and coupled to the measuring circuit 187 to sense a temperature within the wheel assembly, for example, when a cover or inboard or outboard removable sidewalls are used. A humidity sensor 188d may alternatively or additionally be carried by the outer rim 133 (e.g., within or on an inner surface of the outer rim) and coupled to the measuring circuit 187 to sense humidity within the wheel assembly, for example, when a cover or inboard or outboard removable sidewalls are used. Data representing the humidity, acceleration or distance data (e.g., raw data or processed), and/or temperature may be remotely communicated from the wheel assembly or vehicle via a wireless transmitter 190 coupled to the measuring circuit 187 for downstream processing.

Referring now to FIGS. 26-31, in another embodiment, the wheel assembly 230 includes a rigid inboard cover ring 293 coupled to an inboard side of the outer rim 233, for example, by way of fasteners 207a. The rigid inboard cover ring 293 extends radially inward toward the inner rim 231. More particularly, the rigid inboard cover ring 293 defines a radially and axially extending inboard gap with the inner rim 231. A flexible inboard seal 209a, for example, in the form of an inboard bellows seal, is coupled between the rigid inboard cover ring 293 and the inner rim 231, for example, by way of respective fasteners 208a to couple to the inner rim (e.g., used with a clamping arrangement 212a, such as, for example, metal banding or other material). The flexible inboard seal 209a closes the radially and axially extending inboard gap and permits relative movement between the inner rim 231 and the outer rim 233. Illustratively, the inboard bellows seal 209a has a Z-shaped cross-section. The flexible inboard seal 209a may be a different kind of flexible seal, for example, and may have a different shaped cross-section. The flexible inboard seal 209a may include rubber and/or an elastomeric material. The flexible inboard seal 209a may include other and/or additional materials.

The wheel assembly 230 also includes a rigid outboard cover ring 294 coupled to an outboard side of the outer rim 233, for example by way of fasteners 207b. The rigid outboard cover ring 294 extends radially inward toward the inner rim 231. More particularly, the rigid outboard cover ring 294 defines a radially and axially extending outboard gap with the inner rim 231. A flexible outboard seal 209b, for example, in the form of an outboard bellows seal, is coupled between the rigid outboard cover ring 294 and the inner rim 231, for example, by way of respective fasteners 208b (and respective clamping arrangement 212b, for example). The flexible inboard seal 209b closes the radially and axially extending outboard gap and permits relative movement between the inner rim 231 and the outer rim 233. Illustratively, the outboard bellows seal 209a has a Z-shaped cross-section. The flexible outboard seal 209b may be a different kind of flexible seal, for example, and may have a different shaped cross-section.

Figure 26:
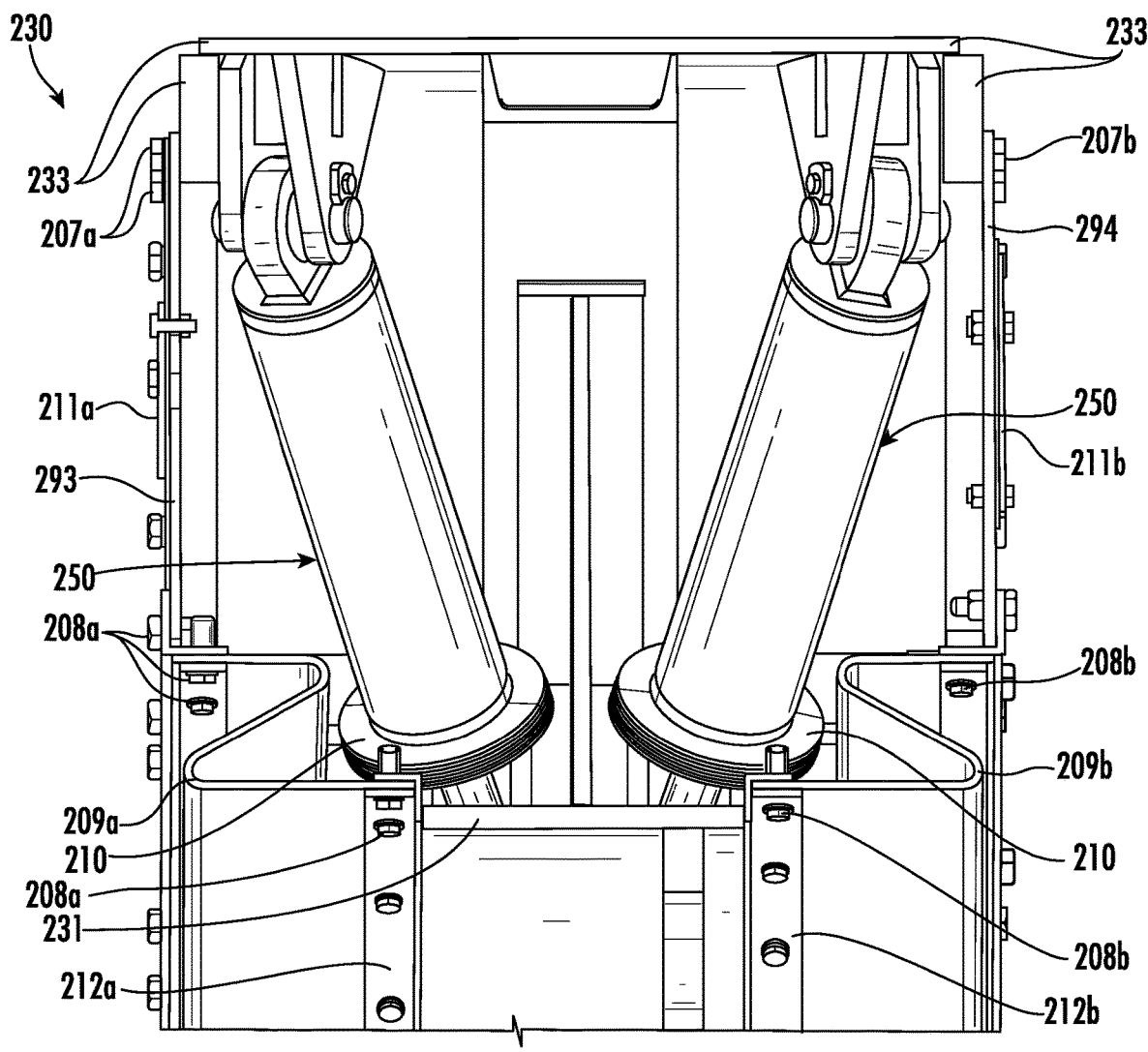
FIG. 26 is a side cut-away view of a portion of a wheel assembly in accordance with another embodiment.
Figure 27:
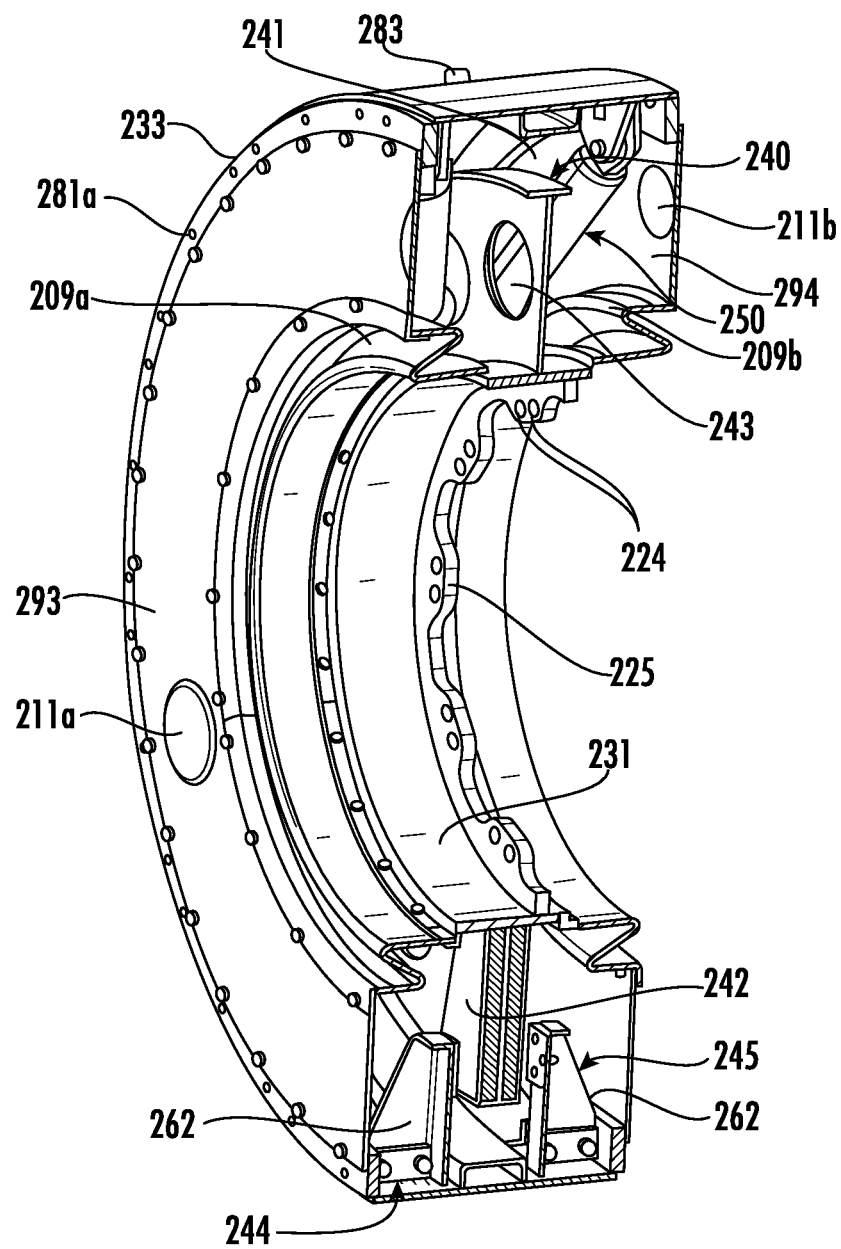
FIG. 27 a perspective cut-away view of the portion of the wheel assembly of FIG. 26.
Figure 28:
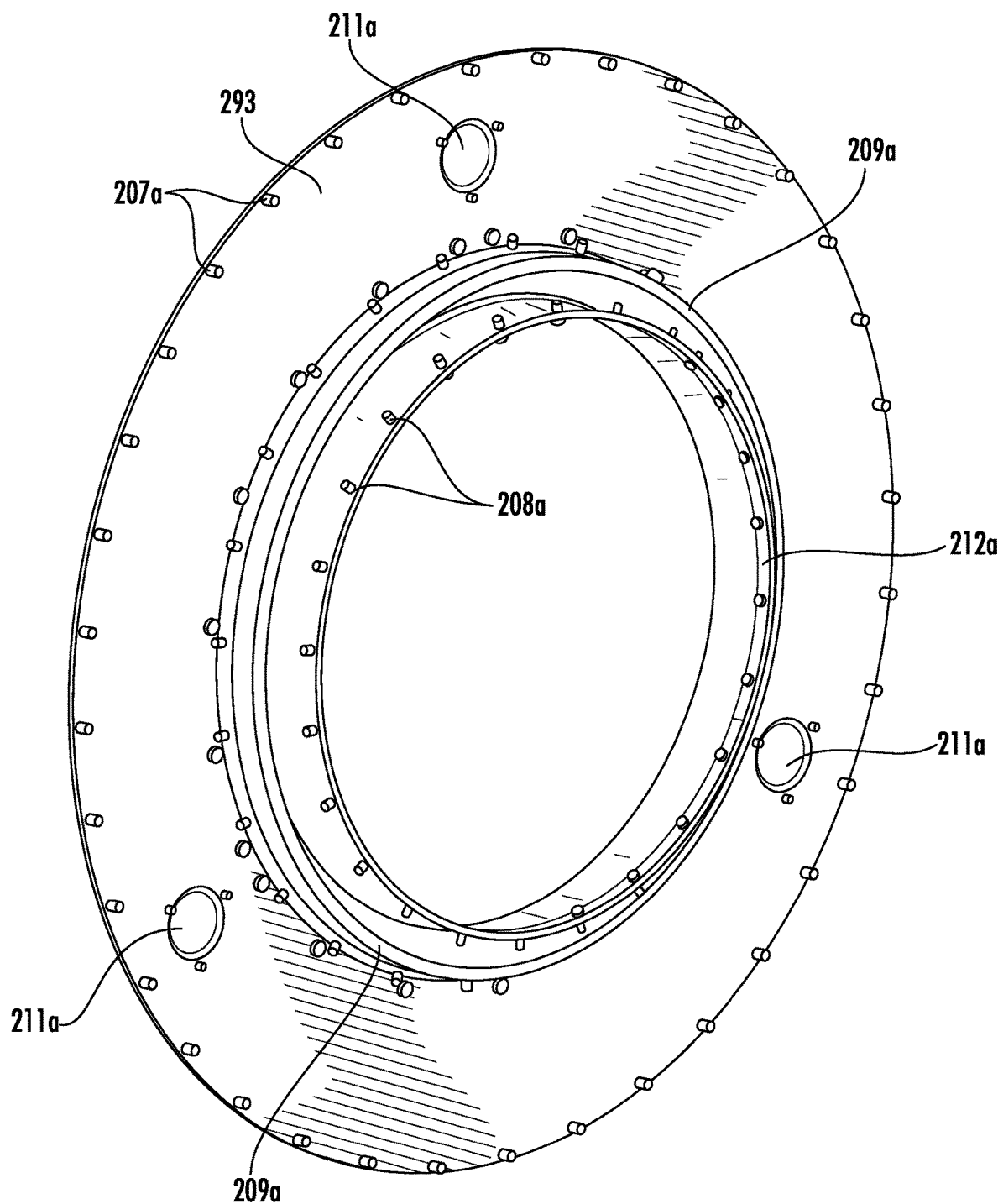
FIG. 28 is a perspective view of a cover ring and flexible seal of FIG. 27.
Figure 29:
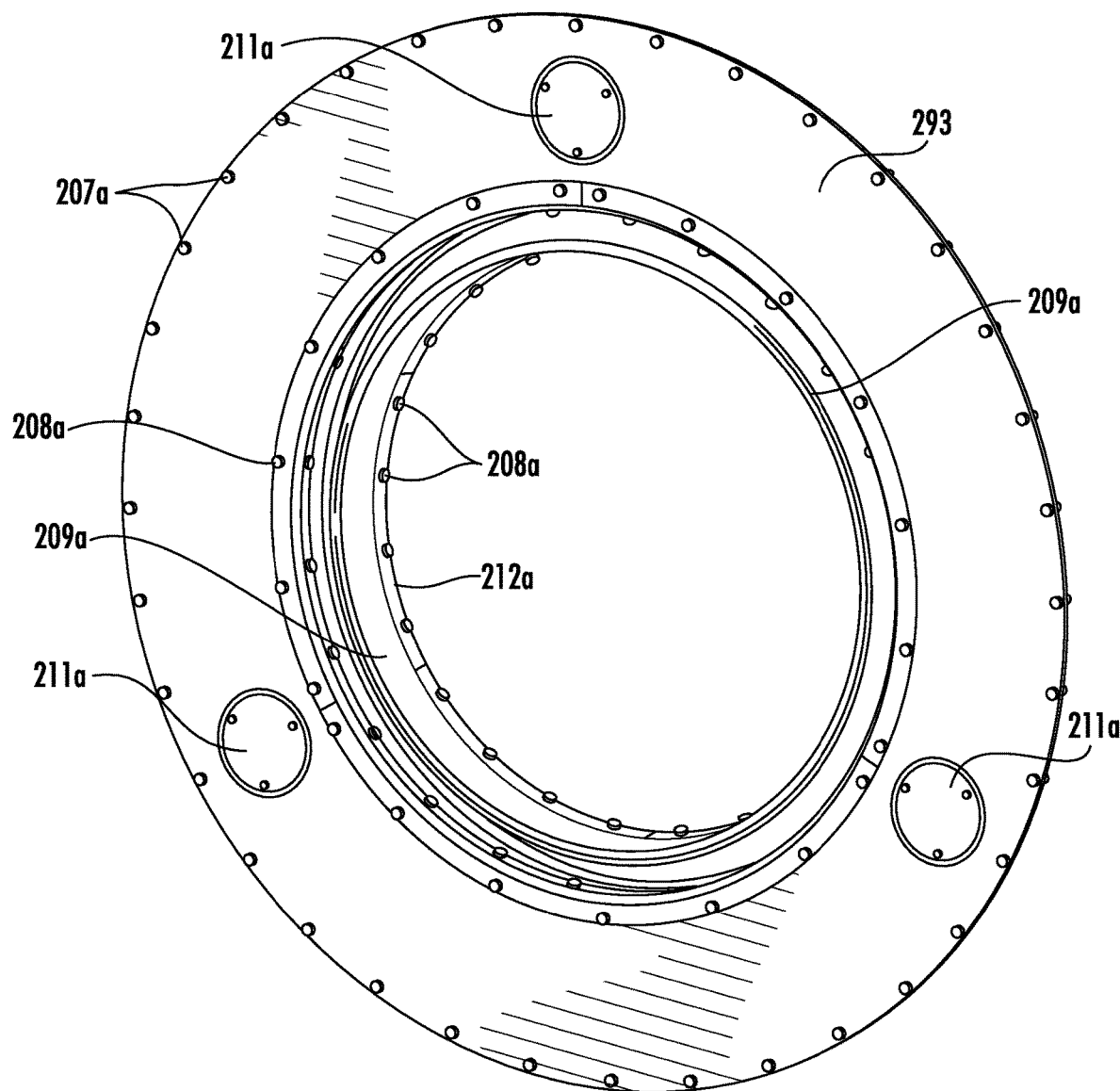
FIG. 29 is another perspective view of the cover ring and flexible seal of FIG. 27.
Figure 30:
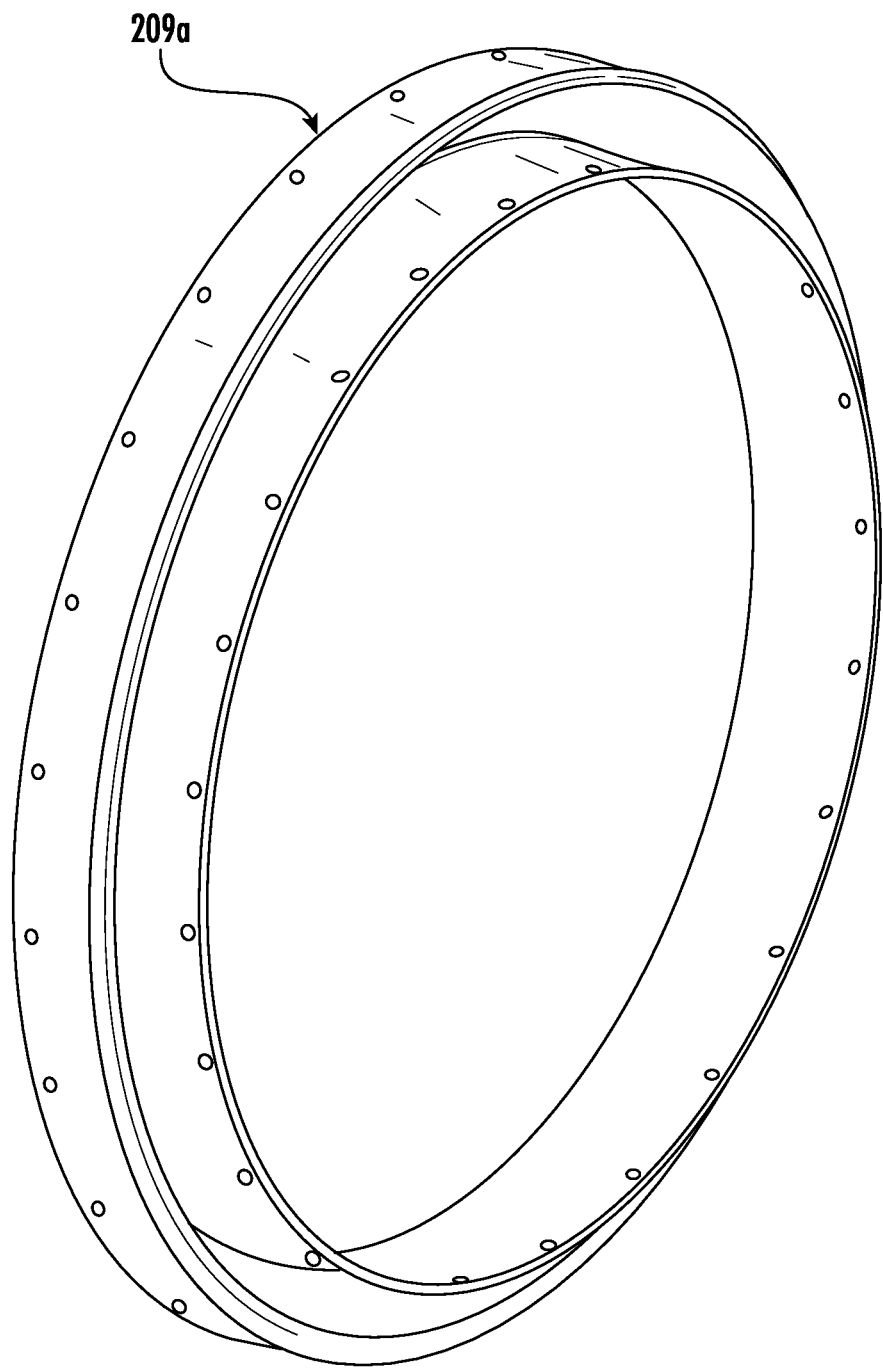
FIG. 30 is a perspective view of the flexible seal of FIG. 27.

Still further, a respective pleated cover 210 (e.g., bellows), is coupled to each of the gas springs 250. In particular, the pleated covers 210 cover the piston so that dust, dirt, and/or debris may be kept from the piston (FIG. 26). A reduced amount of dust, dirt, and/or debris in contact with the piston may increase the operational lifespan of the gas springs 250, as will be appreciated by those skilled in the art.

The flexible outboard seal 209b may include rubber and/or an elastomeric material. The flexible outboard seal 209b may include other and/or additional materials. A rigid outboard cover ring 294 and a flexible outboard seal 209b may not be used in some embodiments. Elements labeled 224, 225, 240, 241, 242, 243, 244, 245, 262, 281a and 283 are similar to respective elements labeled 24, 25, 40, 41, 42, 43, 44, 45, 62, 81a and 83 (i.e. decremented by 200) described above.

Figure 31:
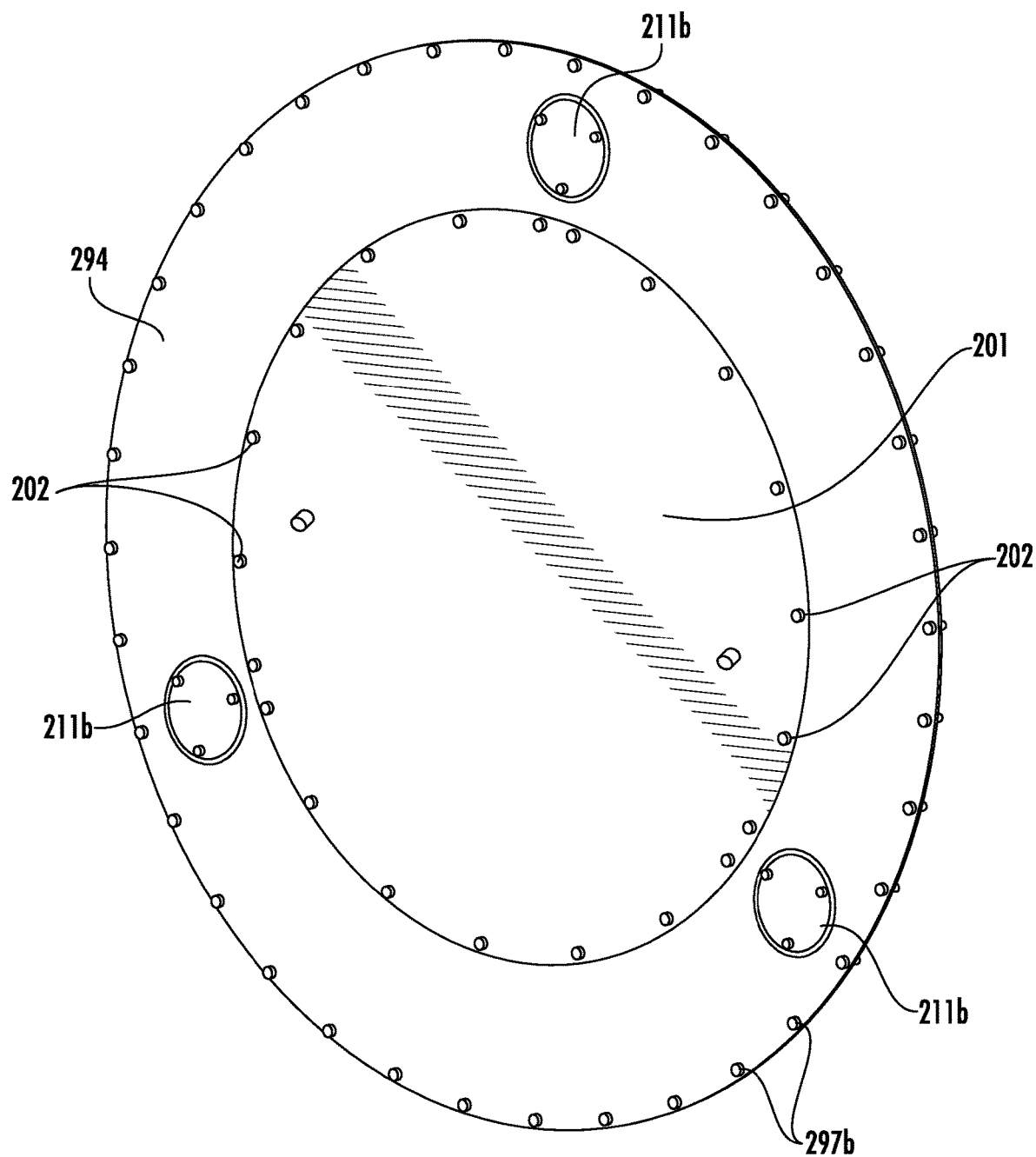
FIG. 31 is a perspective view of another cover ring and flexible seal of FIG. 27.

Referring now particularly to FIG. 31, similar to the embodiments described above with respect to FIGS. 22-24, a rigid removable inset panel or inner panel 201 may be carried within the rigid outboard cover ring 294 (e.g., secured to the wheel assembly by way of fasteners 297*b*) so that when removed, by way of respective fasteners 202, permits access to inner interior of the wheel assembly 230, for example, the inner rim. Access ports or removable covers 211*a* are spaced apart within the rigid outboard cover ring 294. The removable covers 211*a* may be clear acrylic, for example, to permit visual inspection within the wheel assembly without removing the rigid removable inset panel 201 and/or to permit ease of access to sensors, controller, and/or other circuitry, for example, as described above. A similar arrangement including the access ports or removable covers 211*b* may be used as the rigid inboard cover ring 294, for example, as described above (FIGS. 26-27). The access ports 211*a*, 211*b* may be not used in all embodiments.

The embodiments of the wheel assembly 30 described herein may be particularly advantageous with respect to a conventional pneumatic tire, for example, particularly on a relatively large vehicle (e.g., heavy machinery). A conventional pneumatic tire, for example, for heavy machinery has a relatively high cost and, in some environments, may have a relatively short usage life. Moreover, particularly with heavy machinery, a failure of a conventional tire may cause be associated with an increased chance of damage to the heavy machinery. Even still further, a failure of a conventional tire may cause the vehicle 20 to be inoperable or out of service for a relatively long time period, thus resulting in a financial loss and loss of productivity, particularly for certain types of vehicles or heavy machinery that operate around the clock.

The wheel assembly 30 may address these shortcomings of a conventional tire. More particularly, the wheel assembly 30 may have a lower operational cost with increased performance (e.g., by way of the controllable operating response of the gas springs 50). Additionally, the wheel assembly 30 may be field serviceable, meaning that tread members 72 may be replaced in the field. Repairs, for example, in the case of failed gas springs 50, may also be repaired in the field.

A method aspect is directed to a method of making a wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim. The method also includes mounting a plurality of tread assemblies 70 to the outer rim 33. Each tread assembly 70 may be mounted by bonding at least one tread member 72 to a tread member support 71 and positioning a clamping arrangement 73 to removably secure the tread member support to the outer rim 33.

Another method aspect is directed to a method of making wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim 31 to provide a gas suspension for relative movement between the inner rim and the outer rim. The method also includes coupling a disk 40 to the inner rim 31 that defines a closeable gap 41 with adjacent interior portions of the outer rim 33 to define a mechanical stop to limit relative movement between the inner rim and outer rim.

Another method aspect is directed to a method of making a wheel assembly 30 to be coupled to a hub 21 of a vehicle 20. The method includes operatively coupling a plurality of gas springs 50 operatively between an inner rim 31 to be coupled to the hub 21 of a vehicle 20 and an outer rim 33 surrounding the inner rim to provide a gas suspension for relative movement between the inner rim and the outer rim. The method also includes coupling a disk 40 coupled to the inner rim 31 and defining a closeable gap 41 with adjacent interior portions of the outer rim 33. The method may further include positioning a plurality of inboard lateral stops 44 carried by an inboard interior surface of the outer rim 33, and positioning plurality of outboard lateral stops 45 carried by outboard interior surface of the outer rim so that the plurality of inboard lateral stops and plurality of outboard lateral stops cooperate to limit relative lateral movement of the disk 40 and the outer rim.

Another method aspect is directed to a method of making a wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim. At least one gas spring 50 from among the plurality thereof has a controllable operating response. The method also includes coupling a local controller 87 to the at least one gas spring 50 to control the operating response of the at least one gas spring.

Another related method aspect is directed to a method of operating a wheel assembly 30 to be coupled to a hub 21 of a vehicle 20. The wheel assembly 30 includes an inner rim 31 to be coupled to the hub 21 of the vehicle 20, an outer rim 33 surrounding the inner rim, and a plurality of gas springs 50 operatively coupled between the inner rim and the outer rim. At least one gas spring 50 from among the plurality thereof has a controllable operating response. The method includes operating a local controller 87 coupled to the at least one gas spring 50 to control the operating response of the at least one gas spring.

Another method aspect is directed to a method of sensing relative movement, e.g. a distance, between an inner rim 131 of a wheel assembly 30 to be coupled to a hub 21 of a vehicle 20 and an outer rim 133 of the wheel assembly. The inner rim 131 is to be coupled to the hub 21 of a vehicle 20 and the outer rim 133 surrounding the inner rim. The wheel assembly 30 includes a plurality of gas springs 50 operatively coupled between the inner rim 131 and the outer rim 133 and permitting relative movement therebetween. The method includes using at least one sensor 188*a*, 188*b* to sense the relative movement between the inner and outer rims 131, 133 during operation or rolling of the wheel assembly.

Another method aspect is directed to a method of making a wheel assembly 30 to be coupled to a hub 21 of a vehicle 20. The method includes coupling an inner rim 231 to be to the hub 21 of the vehicle 20 and positioning an outer rim 233 surrounding the inner rim. The method also includes operatively coupling a plurality of gas springs 50 between the inner rim 231 and the outer rim 233 to permit relative movement therebetween. The method further includes coupling a rigid inboard cover ring 293 to an inboard side of the outer rim 233 and extending radially inward toward the inner rim 231 and coupling a flexible inboard seal 209*a* between the rigid inboard cover ring and the inner rim.

Figure 32:
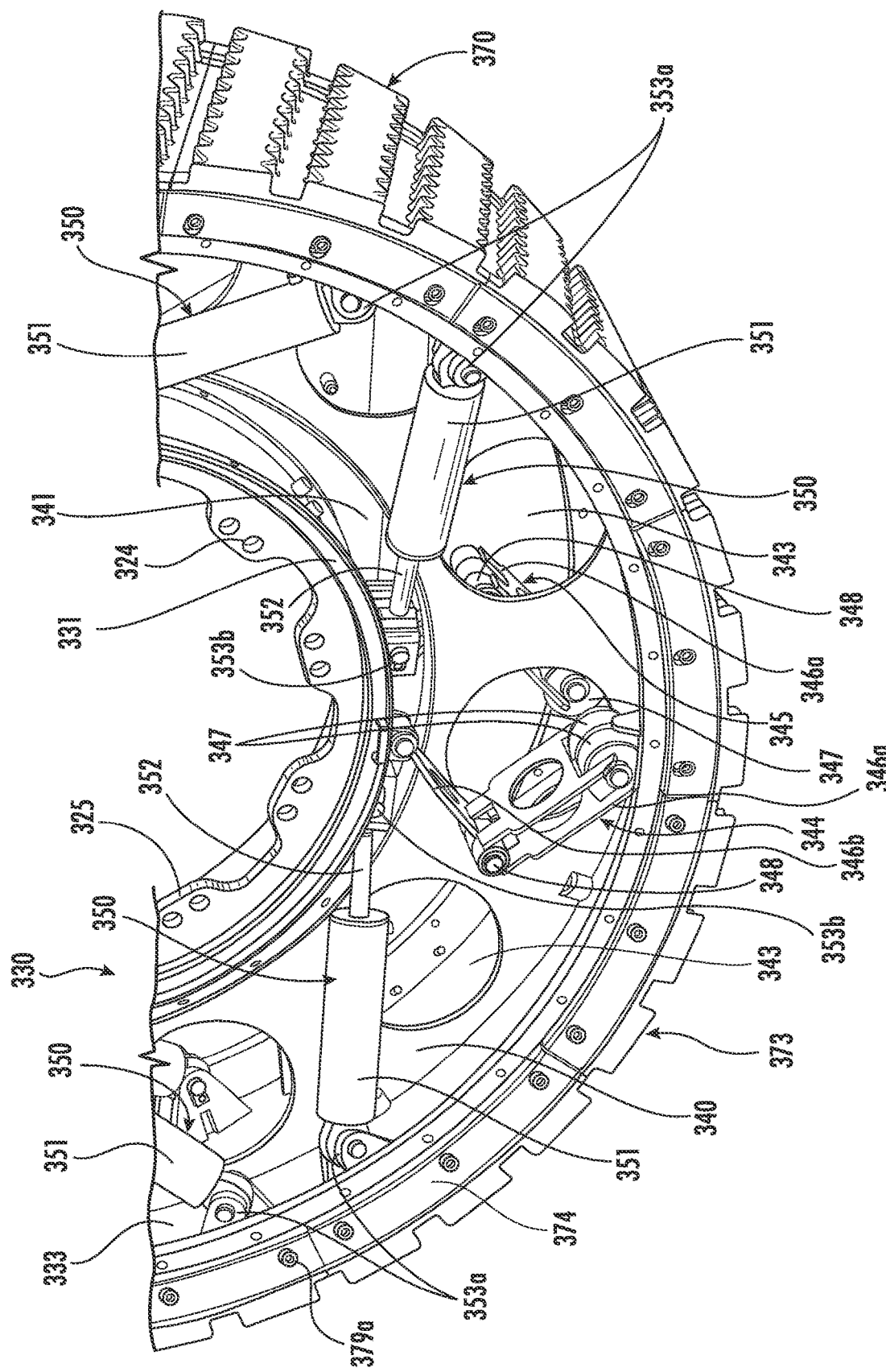
FIG. 32 is a perspective view of a portion of a wheel assembly according to another embodiment.

Referring now to FIG. 32, in another embodiment of the wheel assembly 330, an outer ring 340 or disk is coupled to the outer rim 333. This is in contrast to embodiments described above where the ring or disk 40 is coupled to the inner rim 331. In the present embodiments, the outer ring 340 being coupled to the outer rim 333 defines a closeable gap 341 with adjacent interior portions of the inner rim 331 to define a mechanical stop to limit relative movement between the inner and outer rims. Similarly to the embodiments described above, the outer rim 333 may have a diameter of at least 3.5 feet.

Similarly to the embodiments above, the outer ring 340 also includes weight-reduction openings 343 therein. The weight-reduction openings 343 each illustratively have a generally round or circular shape. The weight-reduction openings 343 may have another shape, such as oblong, hexagonal, and/or contoured for stress reduction, for example.

Gas springs 350 are operatively coupled between the inner rim 331 and the outer rim 333. Each gas spring 350 may be a double-acting gas spring, for example, and include a double-acting gas cylinder 351 and an associated piston 352. Of course, in some embodiments, each gas spring 350 may be a single-acting gas spring. More than one type of gas spring 350 may be used. The gas springs 350 may be air springs and/or nitrogen springs, for example. The gas springs 350 may include other gasses as well.

Illustratively, the gas springs 350 are arranged in pairs on opposite sides of the outer ring 340. More particularly, the gas springs 350 diverge outwardly from the inner rim 331 to the outer rim 333. A respective attachment bracket 353 for each gas spring 350 is coupled to the inner rim 331. Each attachment bracket 353 may include a generally U-shaped or V-shaped base bracket that receives an end of the piston 352 therein (e.g., between the arm of the U- or V-shaped bracket). A fastener fastens the end of the piston 352 of the gas spring 350 to the base bracket 353. A similar attachment bracket 353 is coupled to the outer rim 333 adjacent inboard and outboard surfaces. Accordingly, the gas springs 350 are pivotably coupled between the inner and outer rims 331, 333.

Similar to the embodiments described above, as will be appreciated by those skilled in the art, the gas springs 350 provide a gas suspension for relative movement between the inner rim 331 and the outer rim 333. The gas springs 350 have an operating stroke the permits the outer ring 340 to define a mechanical stop. In other words, the gas springs 350 maintain the outer rim 333 spaced apart from the inner rim 331. However, if pressure on any gas spring 350 causes the gas spring to reach its limit under load or the gas spring fails, the outer ring 340 may act as a mechanical stop to limit relative movement between the inner and outer rims 331, 333. In other words, the outer ring 340 and gas springs 350 may be considered as providing a run-flat capability. Since the gas springs 350 are similar to the gas springs described with respect to the embodiments above, further details of the gas springs need not be described.

Figure 33:
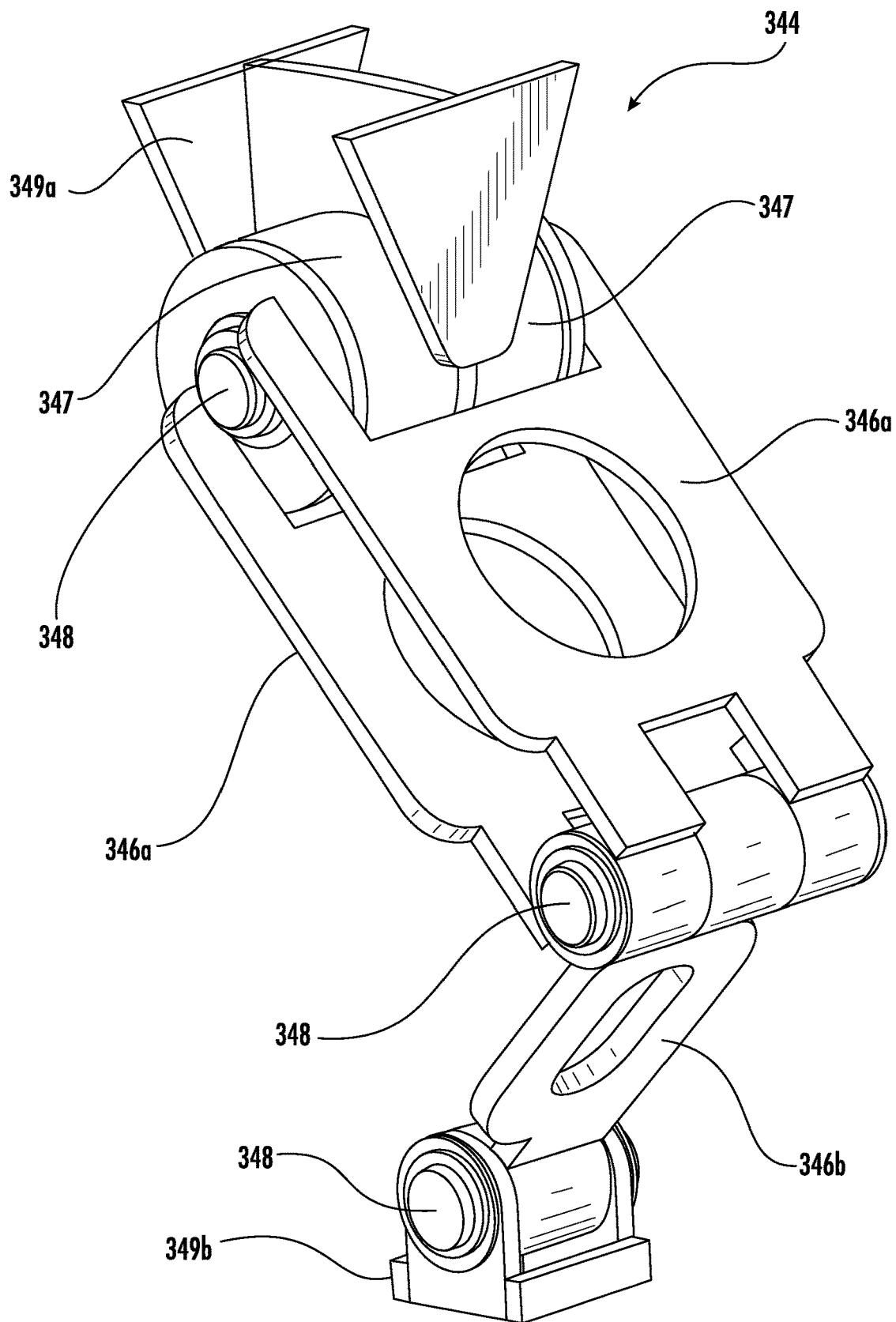
FIG. 33 is a perspective view of an inboard lateral stop of the wheel assembly of FIG. 32.

Referring additionally to FIG. 33, the wheel assembly 330 also includes inboard lateral stops 344 coupled between an inboard side of the outer rim 333 and an inboard side of the inner rim 331. More particularly, the inboard lateral stops 344 are illustratively in the form of hinge retainers or scissor hinges. Each inboard lateral stop 344 includes inboard hinge brackets 346a, 346b and inboard elastomeric bodies 347, for example, urethane bodies, carried by the hinge bracket adjacent the outer rim 333. More particularly, the inboard elastomeric bodies 347 couple to an outer lateral stop mounting bracket 349a that is coupled to the outer rim 333. The inboard hinge brackets 346a, 346b are coupled by way of a hinge pin 348. In some embodiments, an outer lateral stop mounting bracket 349a may not be used as the inboard elastomeric bodies 347 may couple, for example, directly, to the outer ring 340, for example, by way of a hinge pin 348. The hinge bracket 346b is coupled to the inner rim 331 by way of an inner lateral stop mounting bracket 349b coupled to the inner rim by a hinge pin 348 coupled to the inner lateral stop mounting bracket. In some embodiments, the hinge bracket 346b may couple to the inner rim 331 without an inner lateral stop mounting bracket 349b, for example, directly to the inner rim by way of a hinge pin 348.

The wheel assembly 330 also includes outboard lateral stops 345 coupled between an outboard side of the outer rim 333 and an outboard side of the inner rim 331. More particularly, the outboard lateral stops 345 are illustratively in the form of hinge retainers or scissor hinges that are similar to the inboard lateral stops 344. That is, each outboard lateral stop 345 includes outboard hinge brackets 346a, 346b and outboard elastomeric bodies 347, for example, urethane bodies, carried by the hinge bracket adjacent the outer rim 333. More particularly, the outboard elastomeric bodies 347 couple to an outer lateral stop mounting bracket 349a that is coupled to the outer rim 333. The hinge brackets 346a, 346b are coupled by way of a hinge pin 348. In some embodiments, an outer lateral stop mounting bracket 349a may not be used as the outboard elastomeric bodies 347 may couple, for example, directly, to the outer ring 340, for example, by way of a hinge pin 348. The hinge bracket 346b is coupled to the inner rim 331 by way of an inner lateral stop mounting bracket 349b coupled to the inner rim by a hinge pin 348 coupled to the inner lateral stop mounting bracket. In some embodiments, the hinge bracket 346b may couple to the inner rim 331 without an inner lateral stop mounting bracket 349b, for example, directly to the inner rim by way of a hinge pin 348.

Those skilled in the art will appreciate that the inboard and outboard lateral stops 344, 345, similarly to the lateral stops described with respect to the embodiments above, limit relative movement between the outer rim 333 (and thus the outer ring 340) and the inner rim 331. In other words, turning, for example, of the vehicle may cause lateral movement of the outer ring 340 relative to the inner rim 331. The inboard and outboard lateral stops 344, 345 may limit the amount of lateral movement of the outer ring 340 relative to the inner rim 331 to thereby maintain structural integrity of the wheel assembly 330. Of course, the inboard and outboard lateral stops 344, 345 may include other and/or additional components or elements that cooperate to limit relative lateral movement of the outer ring 340 and the outer inner rim 331.

Other elements illustrated, such as, for example, fastener receiving passageways 324 within inwardly extending flange ring 325, the tread assemblies 370, and the clamping arrangement 373 including the inboard clamping members 374 and fasteners 379a, are similar to corresponding elements described with respect to the embodiments described above. Accordingly, these elements as they relate to the present embodiments need no further discussion.

A method aspect is directed to method of making a wheel assembly 330 to be coupled to a hub of a vehicle. The method includes operatively coupling a plurality of gas springs 350 between an inner rim 331 to be coupled to the hub of the vehicle and an outer rim 333 surrounding the hub to provide a gas suspension for relative movement between the inner rim and the outer rim. The method may also include coupling an outer ring 340 to the outer rim 333 that defines a closeable gap 341 with adjacent interior portions of the inner rim to define a mechanical stop to limit relative movement between the inner rim and outer rim.

Figure 34:
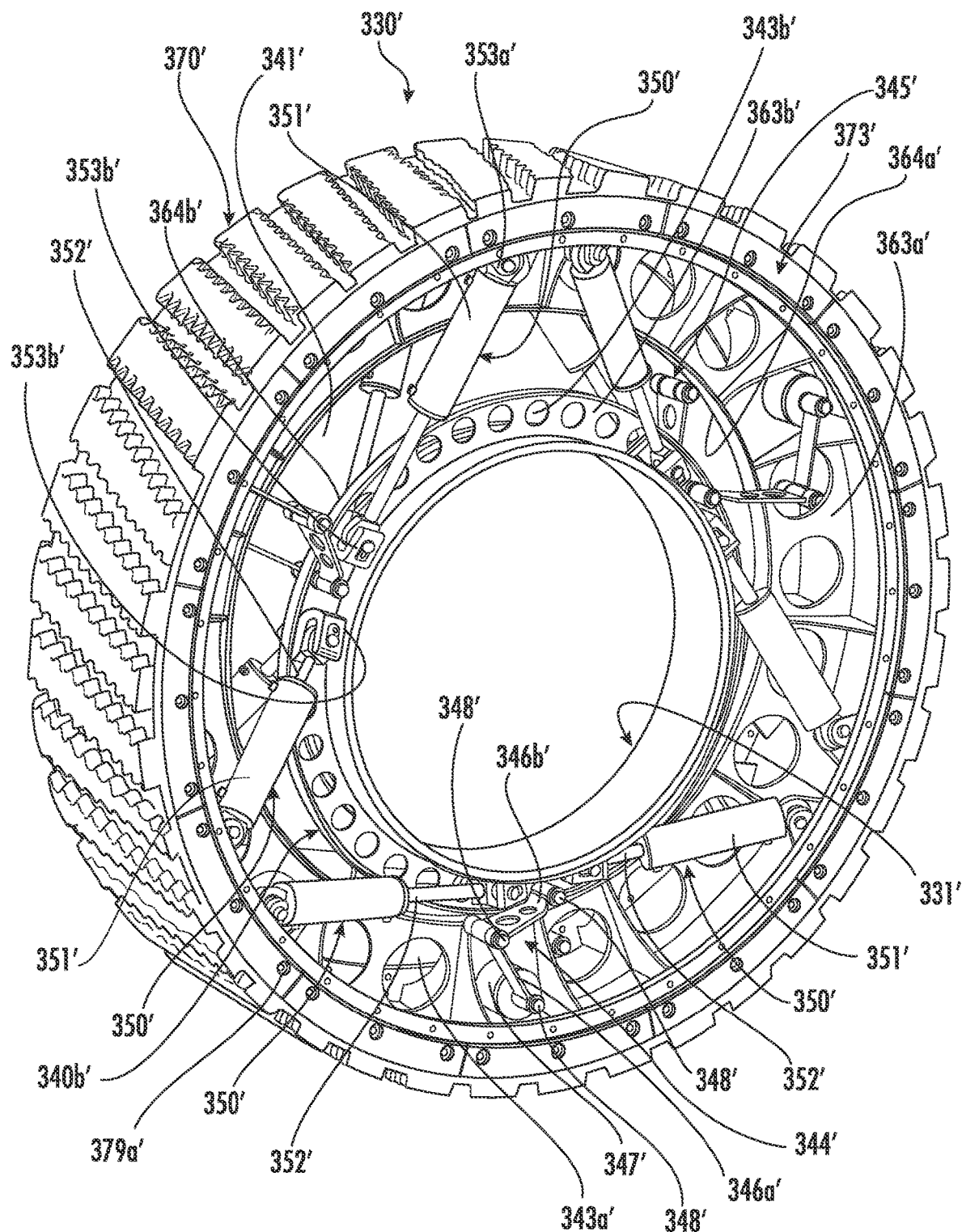
FIG. 34 is a perspective view of a wheel assembly according to another embodiment.
Figure 35:
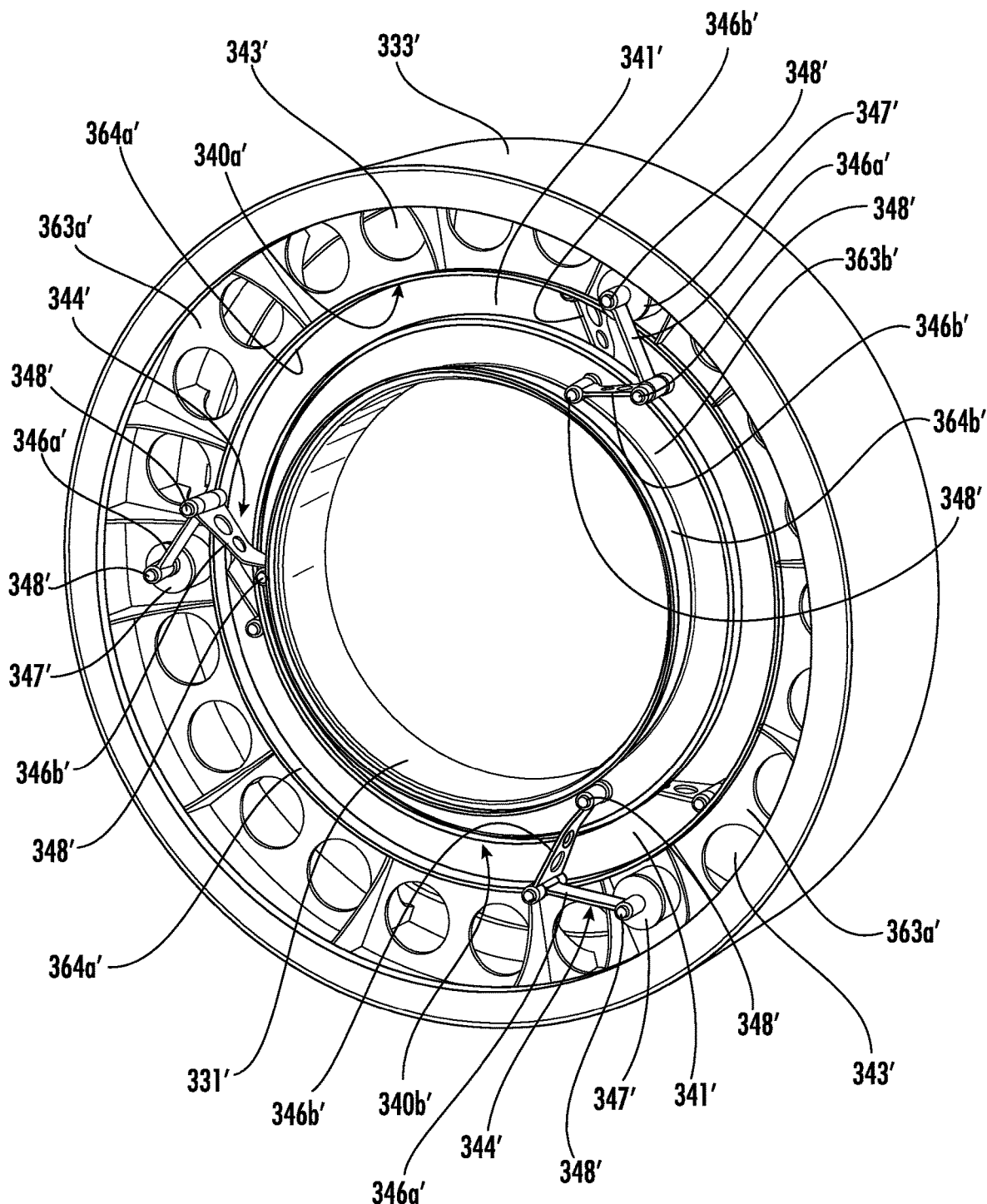
FIG. 35 is a perspective view of a portion of the wheel assembly of FIG. 34 and without weight-reduction openings in the inner ring.
Figure 36:
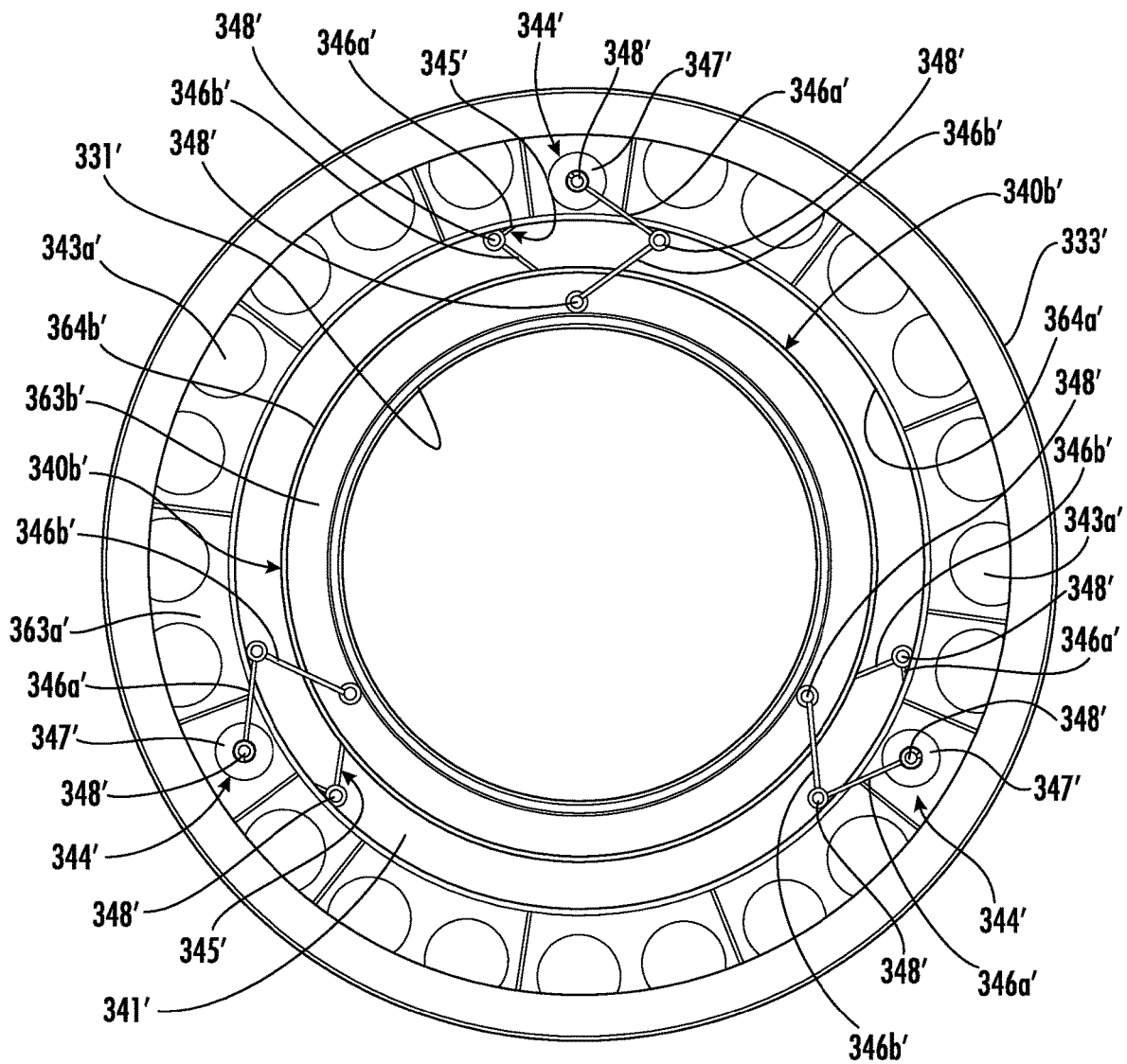
FIG. 36 is a side view of the portion of the wheel assembly of FIG. 35.

Referring now to FIGS. 34-35, in another embodiment of the wheel assembly 330', an outer ring 340a' is coupled to the outer rim 333' and an inner ring 340b' is coupled to the inner rim 331'. The inner ring 340b' defines a closeable gap 341' with adjacent portions of the outer ring 340a' to define a mechanical stop to limit relative movement between the inner and outer rims 331', 333'. Similarly to the embodiments described above, the outer rim 333' may have a diameter of at least 3.5 feet.

The outer ring 340a' has an outer ring body 363a' and an outer ring edge cap 364a' carried by an inner edge of the outer ring body. The inner ring 340b' also includes an inner ring body 363b' and an inner ring edge cap 364b' carried by an outer edge of the inner ring body. The inner and outer ring edge caps 364a', 364b' provide an increased surface area mechanical stop to limit the relative movement between the inner and outer rims 331', 333'.

Similarly to the embodiments above, the outer ring 340a' also includes weight-reduction openings 343a' therein. The inner ring 340b' also includes weight-reduction openings 343b' therein. The weight-reduction openings 343a', 343b' each illustratively have a generally round or circular shape. The weight-reduction openings 343a', 343b' may have another shape, such as oblong, hexagonal, and/or contoured for stress reduction, for example.

Gas springs 350' are operatively coupled between the inner rim 331' and the outer rim 333'. Each gas spring 350' may be a double-acting gas spring, for example, and include a double-acting gas cylinder 351' and an associated piston 352'. Of course, in some embodiments, each gas spring 350' may be a single-acting gas spring. More than one type of gas spring 350' may be used. The gas springs 350' may be air springs and/or nitrogen springs, for example. The gas springs 350' may include other gasses as well.

Illustratively, the gas springs 350' are arranged in pairs on opposite sides of the outer ring 340a'. More particularly, the gas springs 350' diverge outwardly from the inner rim 331' to the outer rim 333'. A respective attachment bracket 353' for each gas spring 350' is coupled to the inner ring 340b', and more particularly, the inner ring body 363b'. Each attachment bracket 353' may include a generally U-shaped or V-shaped base bracket that receives an end of the piston 352' therein (e.g., between the arm of the U- or V-shaped bracket). A fastener fastens the end of the piston 352' of the gas spring 350' to the base bracket. A similar attachment bracket 353' is coupled to the outer rim 333' adjacent inboard and outboard surfaces. Accordingly, the gas springs 350' are pivotably coupled between the inner and outer rims 331', 333'.

Similar to the embodiments described above, as will be appreciated by those skilled in the art, the gas springs 350' provide a gas suspension for relative movement between the inner rim 331' and the outer rim 333'. The gas springs 350' have an operating stroke the permits the outer ring 340a' to define a mechanical stop. In other words, the gas springs 350' maintain the outer rim 333' spaced apart from the inner rim 331'. However, if pressure on any gas spring 350' causes the gas spring to reach its limit under load or the gas spring fails, the outer ring 340a' may act as a mechanical stop to limit relative movement between the inner and outer rims 331', 333'. In other words, the outer ring 340a' and gas springs 350' may be considered as providing a run-flat capability. Since the gas springs 350' are similar to the gas springs described with respect to the embodiments above, further details of the gas springs need not be described.

Figure 37:
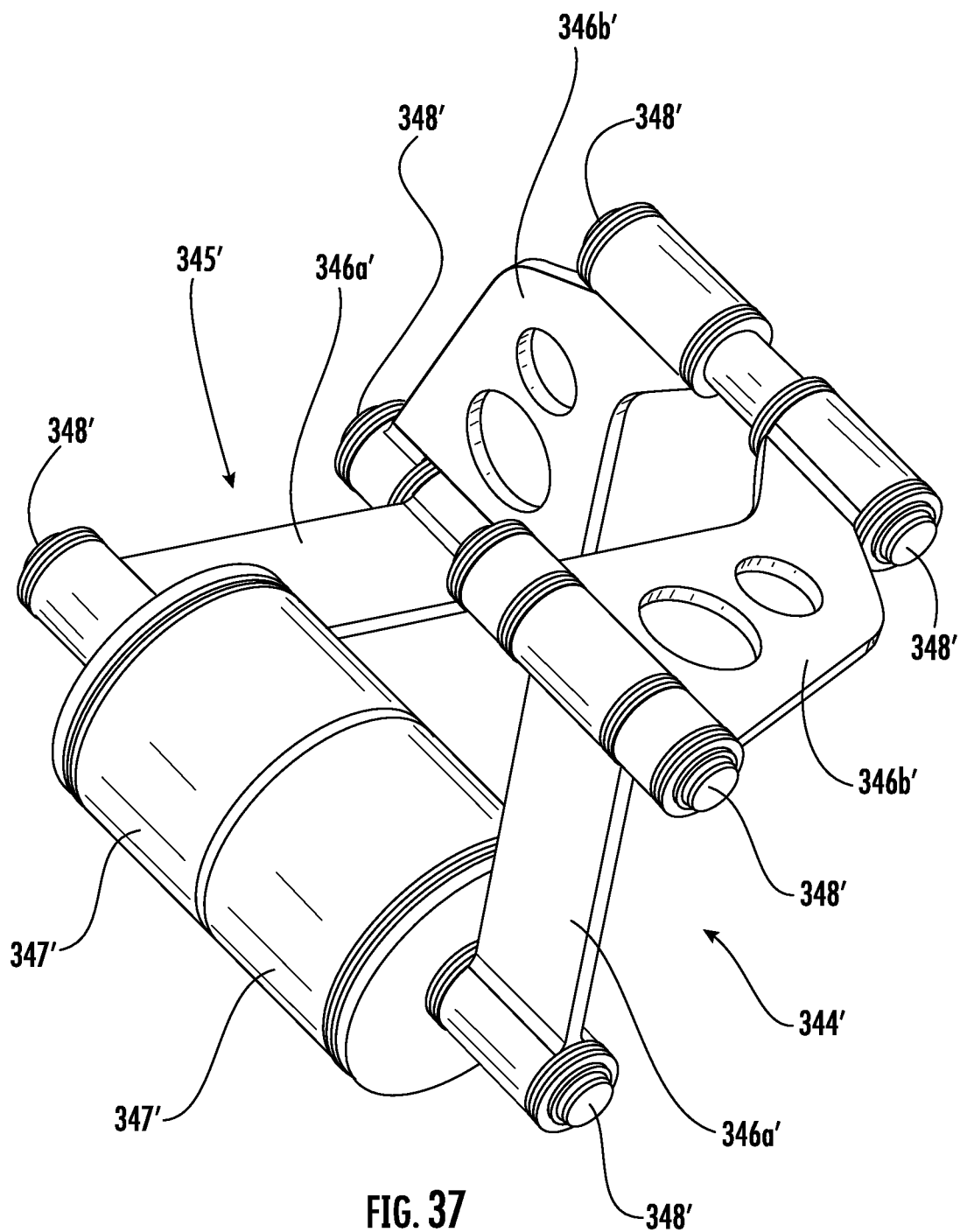
FIG. 37 is a perspective view of inboard and outboard lateral stops of the wheel assembly of FIG. 34.

Referring additionally to FIG. 37, the wheel assembly 330' also includes inboard lateral stops 344' carried between an inboard side of the outer rim 333' and an inboard side of the inner rim 331'. More particularly, the inboard lateral stops 344' are illustratively in the form of hinge retainers or scissor hinges. Each inboard lateral stop 344' includes inboard hinge brackets 346a', 346b' and an inboard elastomeric body 347', for example, a urethane body, carried by the hinge bracket adjacent an inboard side of the outer ring 340a'. The inboard elastomeric body 347' couples to a wall portion of outer ring 340a' by way of a hinge pin 348'. The hinge brackets 346a', 346b' are coupled together by way of a hinge pin 348'. The hinge bracket 346b' is coupled to a wall portion of the inner ring 340b' by way of a hinge pin 348'.

The wheel assembly 330' also includes outboard lateral stops 345' carried between an outboard side of the outer rim 333' and an outboard side of the inner rim 331'. More particularly, the outboard lateral stops 345' are illustratively in the form of hinge retainers or scissor hinges. Each outboard lateral stop 345' includes outboard hinge brackets 346a', 346b' and an outboard elastomeric body 347', for example, a urethane body, carried by the hinge bracket adjacent an outboard side of the outer ring 340a'. The outboard elastomeric body 347' couples to a wall portion of outer ring 340a' opposite a corresponding portion of the inboard lateral stop 344' by way of a hinge pin 348', which may be shared with the hinge pin of the inboard lateral stop. The hinge brackets 346a', 346b' are coupled by way of a hinge pin 348'. The hinge bracket 346b' is coupled to a wall portion of the inner ring 340b' opposite the corresponding portion of the inboard lateral stop 344' by way of a hinge pin 348', which may be shared with the hinge pin of the inboard lateral stop. As will be appreciated by those skilled in the art, the inboard lateral stops 344' are structurally similar to the outboard lateral stops 345', just positioned opposite (i.e., on the inboard side) to the outboard lateral stops.

Those skilled in the art will appreciate that the inboard and outboard lateral stops 344', 345' limit relative movement between the outer ring 340a' and the inner ring 340b'. In other words, turning, for example, of the vehicle may cause lateral movement of the outer ring 340a' relative to the inner ring 340b'. The inboard and outboard lateral stops 344', 345' may limit the amount of lateral movement of the outer ring 340a' relative to the inner ring 340b' to thereby maintain structural integrity of the wheel assembly 330'. Of course, the inboard and outboard lateral stops 344', 345' may include other and/or additional components or elements that cooperate to limit relative lateral movement between the outer ring 340a' and the outer inner rim 331'.

Other elements illustrated, such as, for example, the tread assemblies 370' and the clamping arrangement 373' including the inboard clamping members 374' and fasteners 379a', are similar to corresponding elements described with respect to the embodiments described above. Accordingly, these elements as they relate to the present embodiments need no further discussion.

A method aspect is directed to a method of making a wheel assembly 330' to be coupled to a hub of a vehicle. The method includes operatively coupling a plurality of gas springs 350' between an inner rim 331' to be coupled to the hub of the vehicle and an outer rim 333' surrounding the hub to provide a gas suspension for relative movement between the inner rim and the outer rim. The method also includes coupling an outer ring 340a' to the outer rim 333' and coupling an inner ring 340b' to the inner rim 331' that defines a closeable gap 341' with adjacent interior portions of the outer ring to define a mechanical stop to limit relative movement between the inner rim and outer rim.

Figure 38:
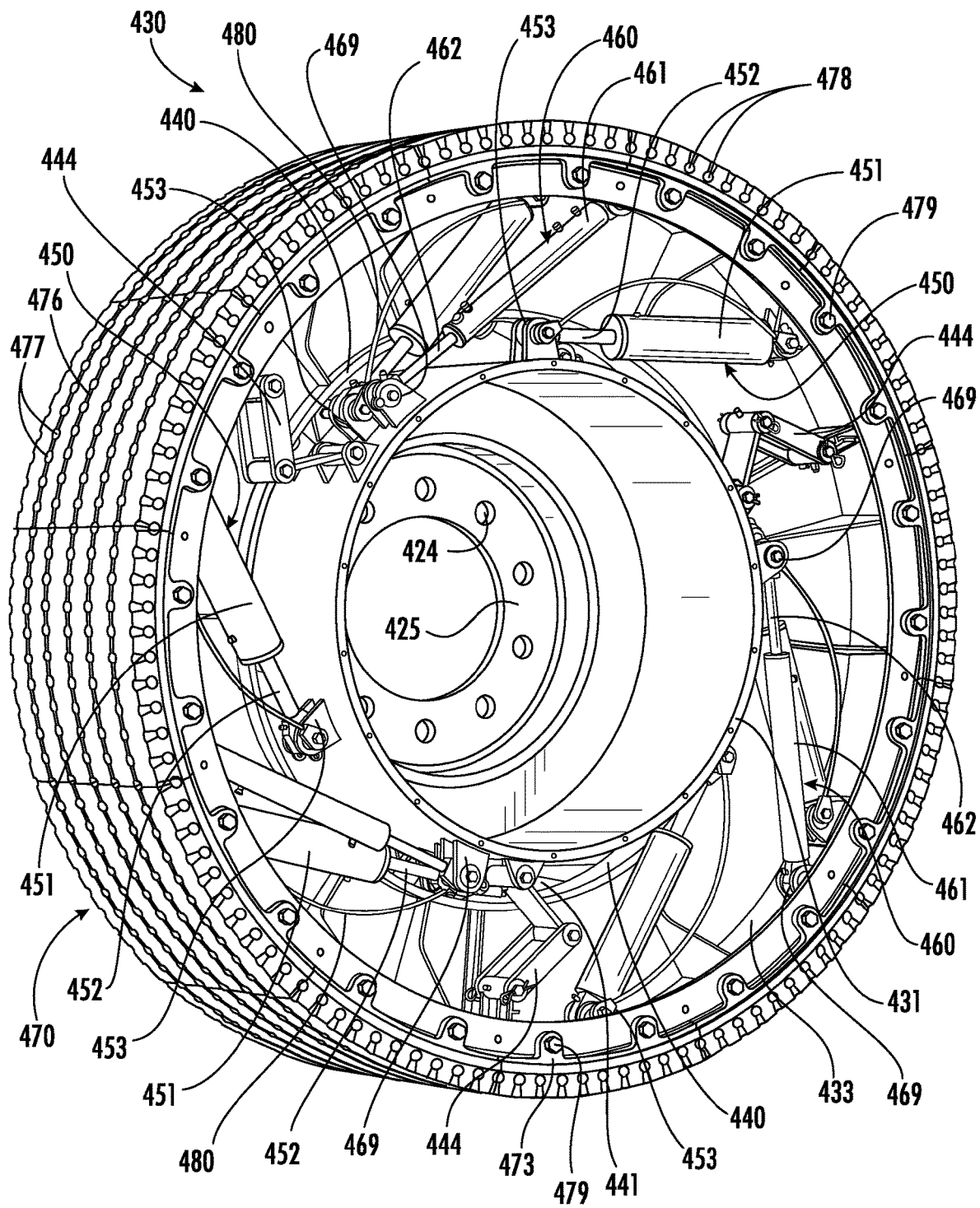
FIG. 38 is a perspective view of a portion of a wheel assembly in accordance with an embodiment.
Figure 39:
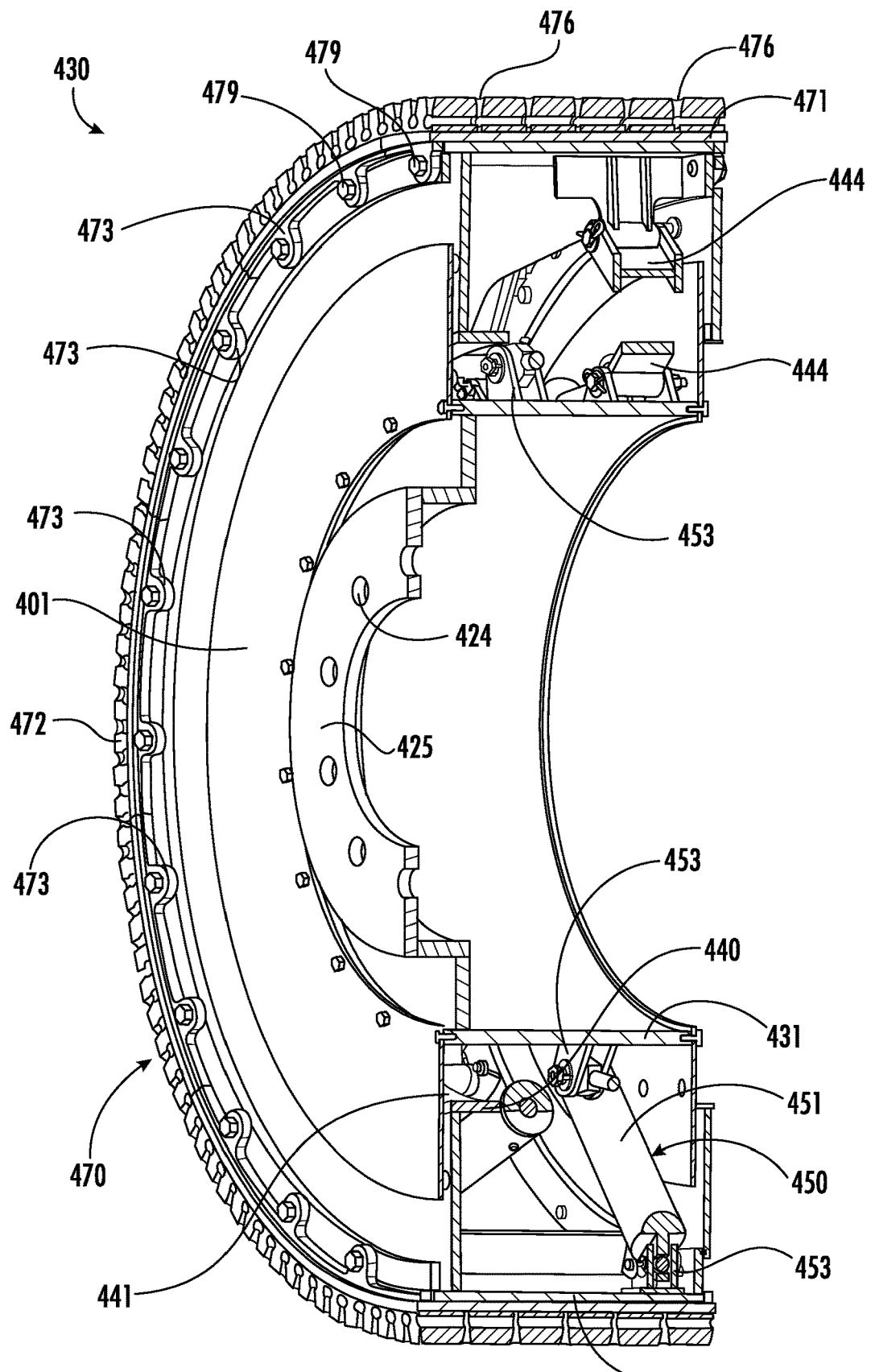
FIG. 39 is a perspective view of a portion of a wheel assembly in accordance with an embodiment.

Referring now to FIGS. 38-39, in another embodiment of the wheel assembly 430, an outer ring 440 or disk is coupled to the outer rim 433 adjacent an inboard side of the outer rim. The outer ring 440 being coupled to an inboard side of the outer rim 433 defines a closable gap 441 with adjacent interior portions of an inboard side of the inner rim 431 to define a mechanical stop to limit relative movement between the inner and outer rims. Similarly to the embodiments described above, the outer rim 433 may have a diameter of at least 3.5 feet.

Gas springs 450 are operatively coupled between the inner rim 431 and the outer rim 433. Each gas spring 450 may be a double-acting gas spring, for example, and include a double-acting gas cylinder 451 and an associated piston 452. Of course, in some embodiments, each gas spring 450 may be a single-acting gas spring. More than one type of gas spring 450 may be used. The gas springs 450 may be air springs and/or nitrogen springs, for example. The gas springs 450 may include other gasses as well.

Illustratively, the gas springs 450 are arranged on an outboard side of the outer ring 440. As will be appreciated by those skilled in the art, the position of the gas springs 450 on an outboard side of the outer ring 440 and the position of the outer ring adjacent in inboard side of the inner and outer rims 431, 433 may advantageously permit relatively easy access to serviceable parts, such as, for example, the gas springs, hydraulic dampers 460, and lateral stops 444. In other words, the outer ring 440 may not inhibit or block access to the serviceable parts, when for example, an outboard cover of the wheel assembly 430 is removed for service.

A respective attachment bracket 453 for each gas spring 450 is coupled to the inner rim 431. Each attachment bracket 453 may include a generally U-shaped or V-shaped base bracket that receives an end of the piston 452 therein (e.g., between the arm of the U- or V-shaped bracket). A fastener fastens the end of the piston 452 of the gas spring 450 to the attachment bracket 453. A similar attachment bracket 453 is coupled to the outer rim 433. Accordingly, the gas springs 450 are pivotably coupled between the inner and outer rims 431, 433.

Similar to the embodiments described above, as will be appreciated by those skilled in the art, the gas springs 450 provide a gas suspension for relative movement between the inner rim 431 and the outer rim 433. The gas springs 450 have an operating stroke the permits the outer ring 440 to define a mechanical stop. In other words, the gas springs 450 maintain the outer rim 433 spaced apart from the inner rim 431. However, if pressure on any gas spring 450 causes the gas spring to reach its limit under load or the gas spring fails, the outer ring 440 may act as a mechanical stop to limit relative movement between the inner and outer rims 431, 433. In other words, the outer ring 440 and gas springs 450 may be considered as providing a run-flat capability. Since the gas springs 450 are similar to the gas springs described with respect to the embodiments above, further details of the gas springs need not be described.

The wheel assembly 430 includes lateral stops 444 coupled between the inner and outer rims 431, 433 to limit relative lateral movement between the inner and outer rims. The lateral stops 444 are illustratively coupled adjacent an inboard side of the outer rim 433 and an inboard side of the inner rim 431. The lateral stops 444 are illustratively in the form of hinge retainers or scissor hinges. The lateral stops 444 may be similar to the lateral stops described above and include elastomeric bodies. Of course, the lateral stops 444 may include other components and/or may be coupled alternatively or additionally adjacent an outboard side of the inner and outer rims 431, 433.

Hydraulic dampers 460 are illustratively operatively coupled between the inner and outer rims 431, 433. The hydraulic dampers 460 may be in the form of oil dampers, for example. Of course, all or some of the dampers may include other, additional, or different fluids therein. Each hydraulic damper 460 includes a double-acting hydraulic cylinder 461 and an associated piston 462.

A respective hydraulic damper 460 is coupled adjacent a corresponding gas spring 450. In other words, each hydraulic damper 460 is aligned side-by-side (e.g., at about the same angle between the gas spring and the inner and outer rims 431, 433 or the coupling location) with a corresponding gas spring 450. Thus, for a wheel assembly 430 that includes six (6) gas springs 450, there would be six (6) hydraulic dampers 460. Similarly to the gas springs 450, respective mounting brackets 469 couple each hydraulic damper 460 to the inner and outer rims 431, 433, respectively.

As will be appreciated by those skilled in the art, the hydraulic dampers 460 may dampen or reduce vibrations and movements caused by traversing the ground or by movement of the wheel assembly 430 over the ground. Moreover, as double-acting hydraulic dampers 460, each hydraulic damper advantageously dampens on both extension and compression.

Cable ties 480 are coupled to opposing ends of the gas springs 450. More particularly, each cable tie or safety cable 480 is coupled to a corresponding mounting bracket 453 of each gas spring 450. When a given gas spring's 450 operating stroke is retracted (i.e., the piston 452 is retracted within the cylinder 451), the corresponding safety cable 480 has slack. However, if a given gas spring 450 exceeds its operating stroke limitations (i.e., the piston 452 extends outwardly from the cylinder 451 beyond operational limits), for example, if the gas spring malfunctions, the safety cable 480 would become taught and may thus prevent the gas piston from separating from the cylinder as during a failure.

A method aspect is directed to a method of making a wheel assembly 430 to be coupled to a hub of a vehicle. The method includes operatively coupling a plurality of gas springs 450 between an inner rim 431 to be coupled to the hub of the vehicle and an outer rim 433 surrounding the hub to provide a gas suspension for relative movement between the inner rim and the outer rim. The method also includes coupling an outer ring 440 adjacent an inboard side of the outer rim 433, the outer ring defining a closeable gap 441 with adjacent interior portions of an inboard side of the inner rim 431 to define a mechanical stop to limit relative movement between the inner rim and outer rim. The plurality of gas springs 450 are operatively coupled on an outboard side of the outer ring 440.

Figure 40:
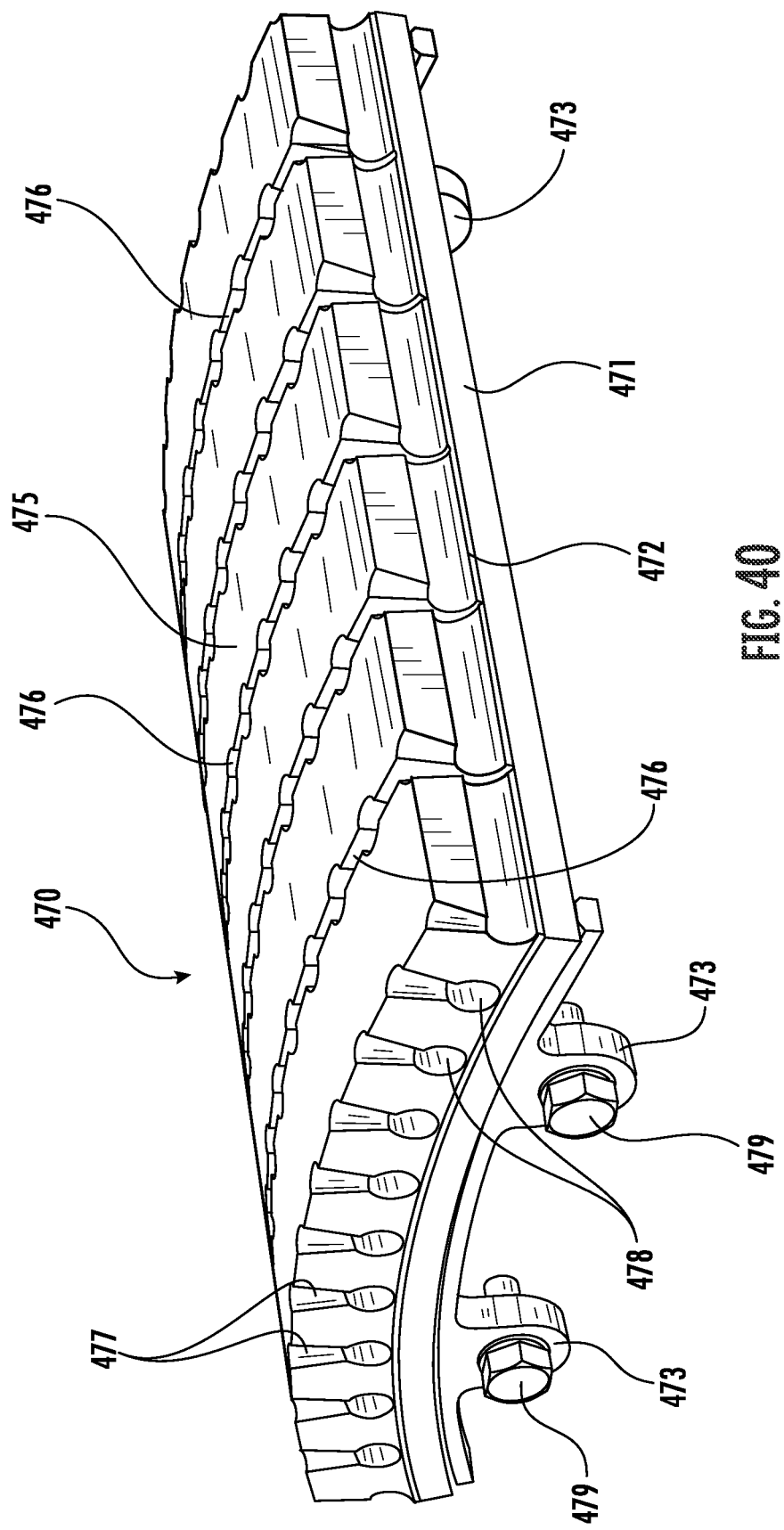
FIG. 40 is a perspective view of a tread body in accordance with an embodiment.
Figure 41:
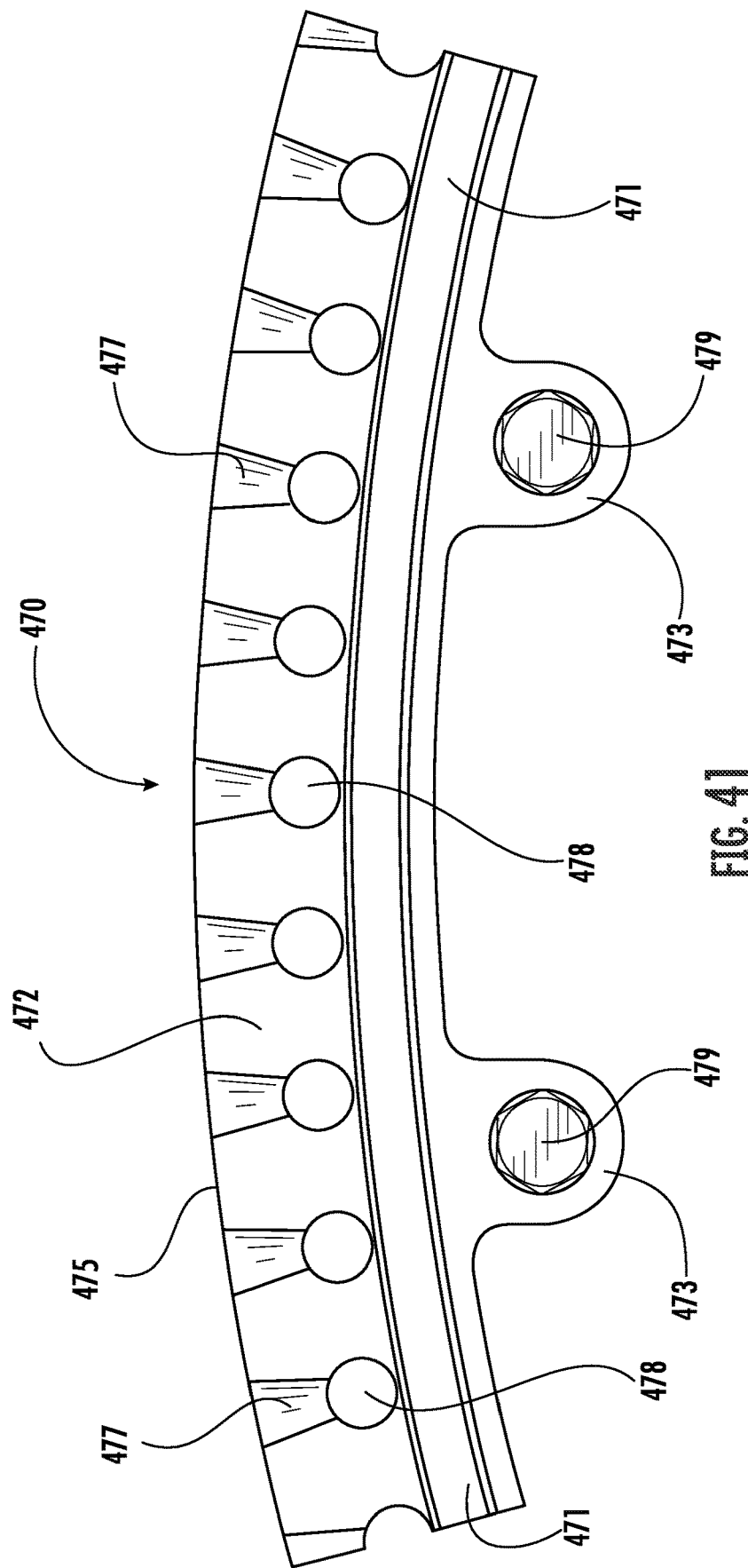
FIG. 41 is a side view of the tread body in FIG. 40.

Referring now additionally to FIGS. 40-41, the wheel assembly 430 includes a tread assembly 470 that includes a tread body 472 and a clamping arrangement 473. The tread body 472 is carried by the outer rim 433 and has an outer contact surface 475, an inboard side, and an outboard side. The tread body 472 may include rubber, for example. Of course, the tread body 472 may include other and/or additional materials. The tread body 472 also has a first plurality of embedded passageways 478 below the outer contact surface 475 and extending between the inboard and outboard sides. More particularly, the first plurality of embedded passageways 478, which illustratively have a circular shape, open outwardly to the inboard and outboard sides. In other words, the first plurality of embedded passageways 478 may conceptually be considered tunnels within the tread body 472 that extend between the inboard and outboard sides.

The tread body 472 also includes a second plurality of circumferential grooves 476 extending downward from the outer contact surface 475 and intersecting the first plurality of embedded passageways 478. The second plurality of circumferential grooves 476 may have a v-shape with the wider opening of v-shape being in the outer contact surface 475. Illustratively, there are five circumferential grooves 476, but those skilled in the art will appreciate there may be any number of circumferential grooves, for example, based upon the type of contact surface and usage application.

The tread body 472 also includes a third plurality of frustoconical opening features 477 extending inwardly from the outer contact surface 475. While frustoconical opening features 477 are illustrated, the opening features may have another shape, for example, cylindrical. The third plurality of frustoconical opening features 477 are illustratively aligned along the corresponding ones of the second plurality of circumferential grooves 476. In some embodiments, the third plurality of frustoconical opening features 477 may not be aligned with the second plurality of circumferential grooves 476. For example, the third plurality of frustoconical opening features 477 may be spaced about the outer contact surface 475, and/or may extend downwardly from the outer contact surface to intersect the first plurality of embedded passageways 478.

The tread assembly 470 may also include a tread body support 471. The tread body support 471 may be in the form of a metal plate (e.g., an arcuate metal plate) that couples to an outer circumference of the outer rim 433. The tread body 472 may be coupled or bonded, for example, glued, fastened, etc., to the tread body support 471.

A clamping arrangement or clamping member 473 removably secures the tread body 472 to the outer rim. The clamping arrangement 473 couples to the inboard and outboard sides of the outer rim 433, respectively, by way of fasteners 479, for example, threaded fasteners to facilitate removal and replacement, for example, when the tread body 472 wears or it is desirable to replace the tread body. The threaded fasteners 479 may extend through openings in the clamping arrangement 473 and engage corresponding threaded openings in the outer rim 433. Other types of clamping arrangements or members, for example, such as those described above with respect to other embodiments, may be used. Those skilled in the art will appreciate that while a single tread body support 471, the tread body 472, and clamping arrangement 473 have been described herein, there may be more than one tread body support, tread body, and clamping arrangement coupled in end-to-end relation around the outer rim 433, for example, as illustrated.

A method aspect is directed to a method of making a wheel assembly 430 to be coupled to a hub of a vehicle. The method may include operatively coupling a plurality of gas springs 450 between an inner rim 431 to be coupled to the hub and an outer rim 433 surrounding the hub to provide a gas suspension permitting relative movement between the inner rim and the outer rim. The method may further include coupling a tread body 472 to be carried by the outer rim 433 and having an outer contact surface 475, an inboard side, and an outboard side. The tread body 472 may also have a first plurality of embedded passageways 478 below the outer contact surface 475 and extending between the inboard and outboard sides, and a second plurality of circumferential grooves 476 extending downward from the outer contact surface and intersecting the first plurality of embedded passageways.

Other elements illustrated, such as, for example, fastener receiving passageways 424 within inwardly extending flange ring 425, the clamping arrangement 473, and the sidewall covers and cover assemblies 401 are similar to corresponding elements described with respect to the embodiments described above. Further details of sidewall cover assemblies 401 are described in U.S. patent application Ser. No. 16/886,065 the entire contents of which are hereby incorporated by reference. Accordingly, these elements as they relate to the present embodiments need no further discussion.

Figure 42:
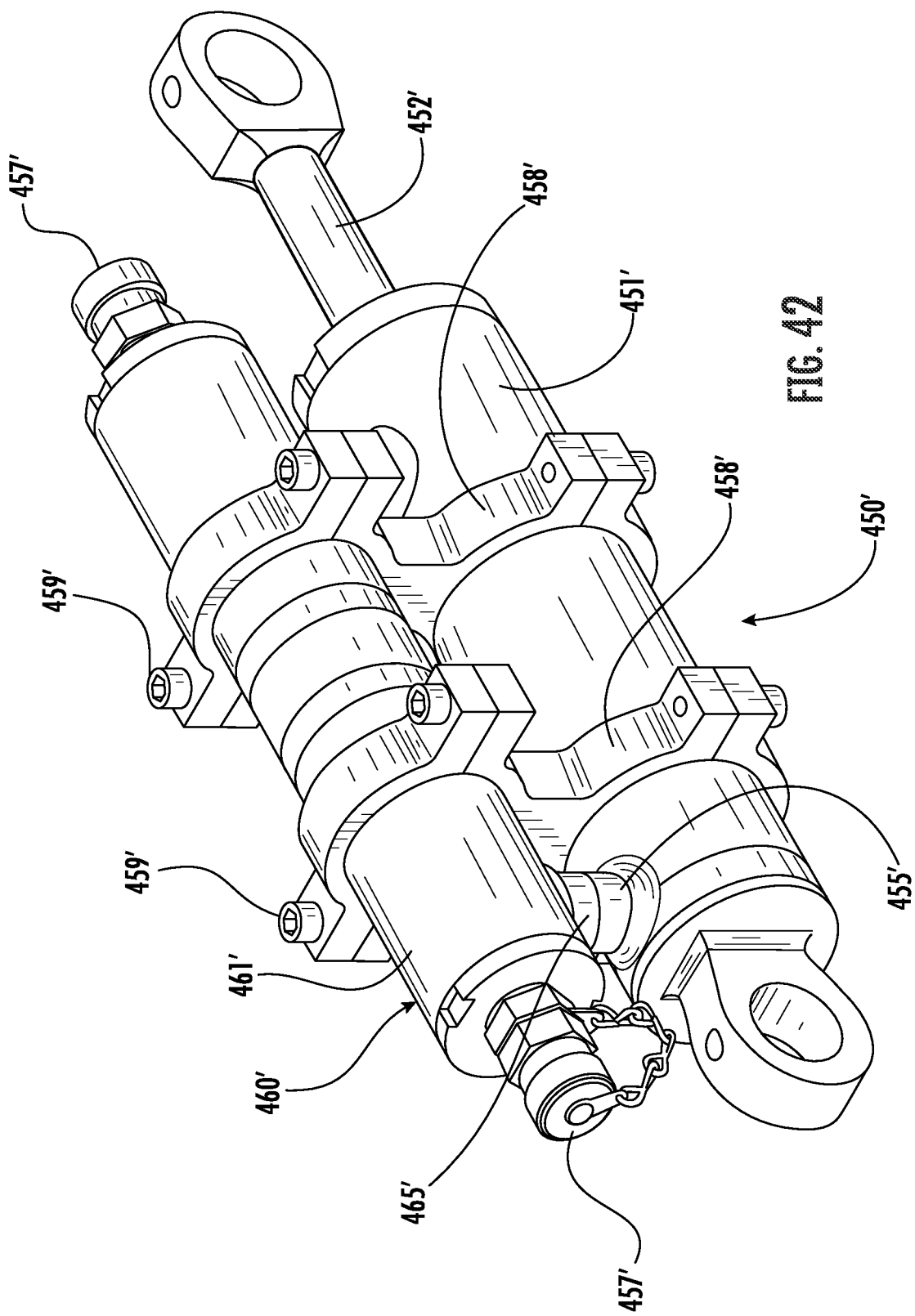
FIG. 42 is a perspective view of a gas spring and hydraulic damper in accordance with an embodiment.
Figure 43:
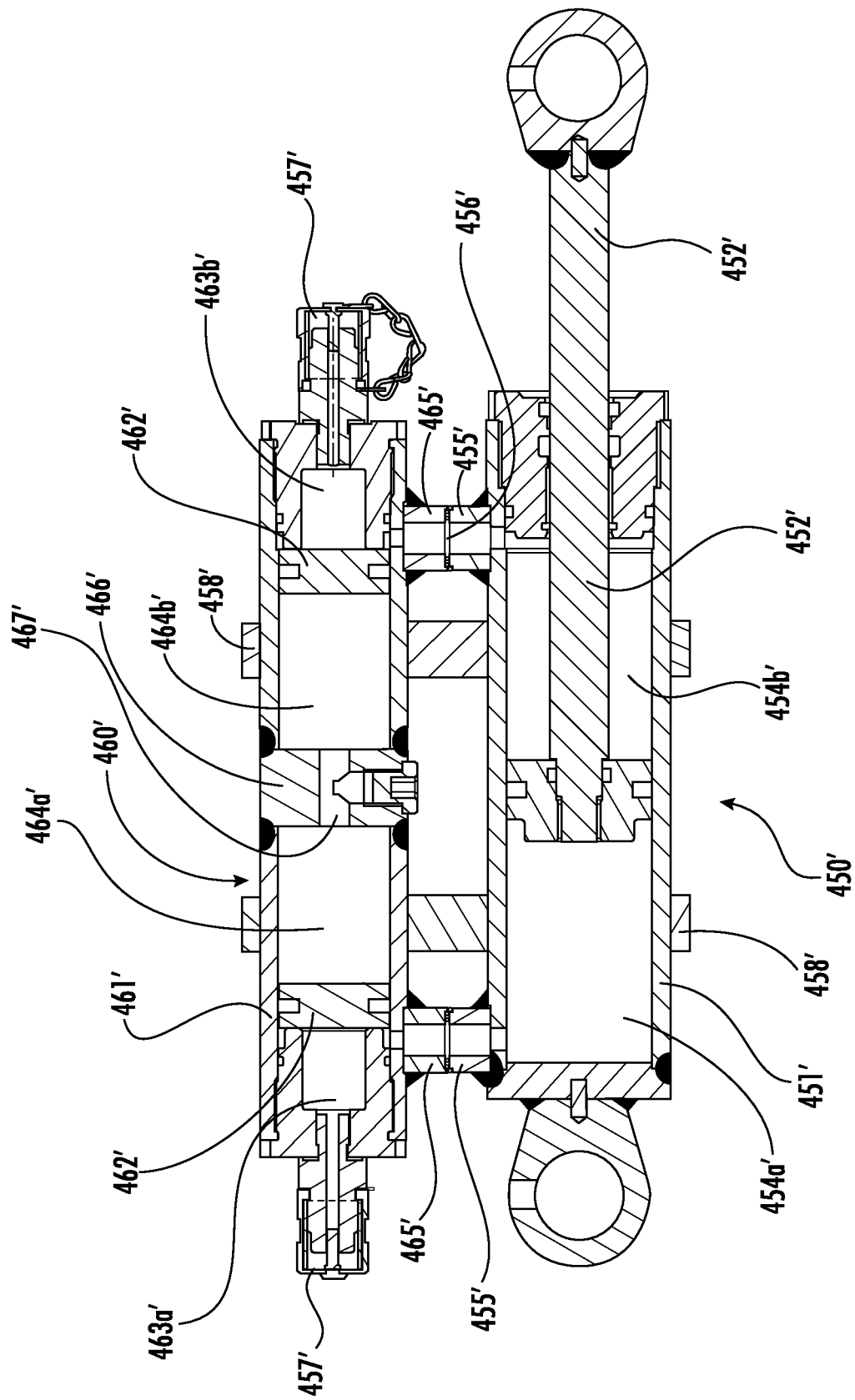
FIG. 43 is a schematic cross-sectional view of the gas spring and hydraulic damper of FIG. 42.

Referring now additionally to FIGS. 42-43 in another embodiment, the gas springs 450' each have a cylinder body 451' and an associated piston 452' movable within the cylinder body. The piston 452' divides the cylinder body 451' into first and second gas chambers 454a', 454b'.

A respective hydraulic damper 460' is mounted on each gas spring 450' and operatively coupled between the first and second gas chambers 454a', 454b'. Each hydraulic damper 460' includes a damper cylinder body 461', and first and second pistons 462' movable within the damper cylinder body. The first and second pistons 462' of each hydraulic damper 460' define first and second damper gas chambers 463a', 463b' and first and second hydraulic fluid chambers 464a', 464b'.

The first and second damper gas chambers 463a', 463b' are coupled to respective ones of the first and second gas chambers 454a', 454b' of the gas springs 450', for example, by way of respective conduits 455', 465'. More particularly, a gas spring conduit 455' and a hydraulic damper conduit 465' may be aligned and mateably coupled when the hydraulic damper 460' is mounted to the gas spring 450'. A seal 456', for example, a sealing washer, may be between or at an interface between the gas spring conduit 455' and a hydraulic damper conduit 465'. Of course, other mating arrangements to permit gas communication between the first and second gas chambers 454a', 454b' and the first and second damper gas chambers 463a', 463b'. The hydraulic damper 460' illustratively has ports 457' at opposing ends.

A chamber wall 466' divides the damper cylinder body 461' into the first and second hydraulic fluid chambers 464a', 464b'. The chamber wall 466' illustratively has an orifice 467' therein permitting hydraulic fluid to pass between the first and second hydraulic fluid chambers 464a', 464b'.

Cylinder clamps 458' illustratively mount the respective hydraulic damper 460' to a corresponding gas spring 450' in a piggy-back configuration. Each cylinder clamp 458' has a figure eight shape. Each cylinder clamp 458' may conceptually be in the form of a double pipe clamp that permits the gas spring 450' and hydraulic damper 460' to be slidably received within the respective openings and tightened into place using respective fasteners 459'. While a cylinder clamp 458' is illustrated, those skilled in the art will appreciate that other and/or additional types of cylinder clamps may be used.

A method aspect is directed to a method of making a wheel assembly 430 to be coupled to a hub of a vehicle. The method may include operatively coupling a plurality of gas springs 450' between an inner rim 431 to be coupled to the hub of the vehicle and an outer rim 433 surrounding the hub to provide a gas suspension for relative movement between the inner rim and the outer rim. Each of the plurality of gas springs 450' may include a cylinder body 451' and an associated piston 452' moveable therein and dividing the cylinder body into first and second gas chambers 454a', 454b'. The method may also include mounting a respective hydraulic damper 460' on each gas spring 450' and operatively coupled between the first and second gas chambers 454a', 454b'.

Figure 44:
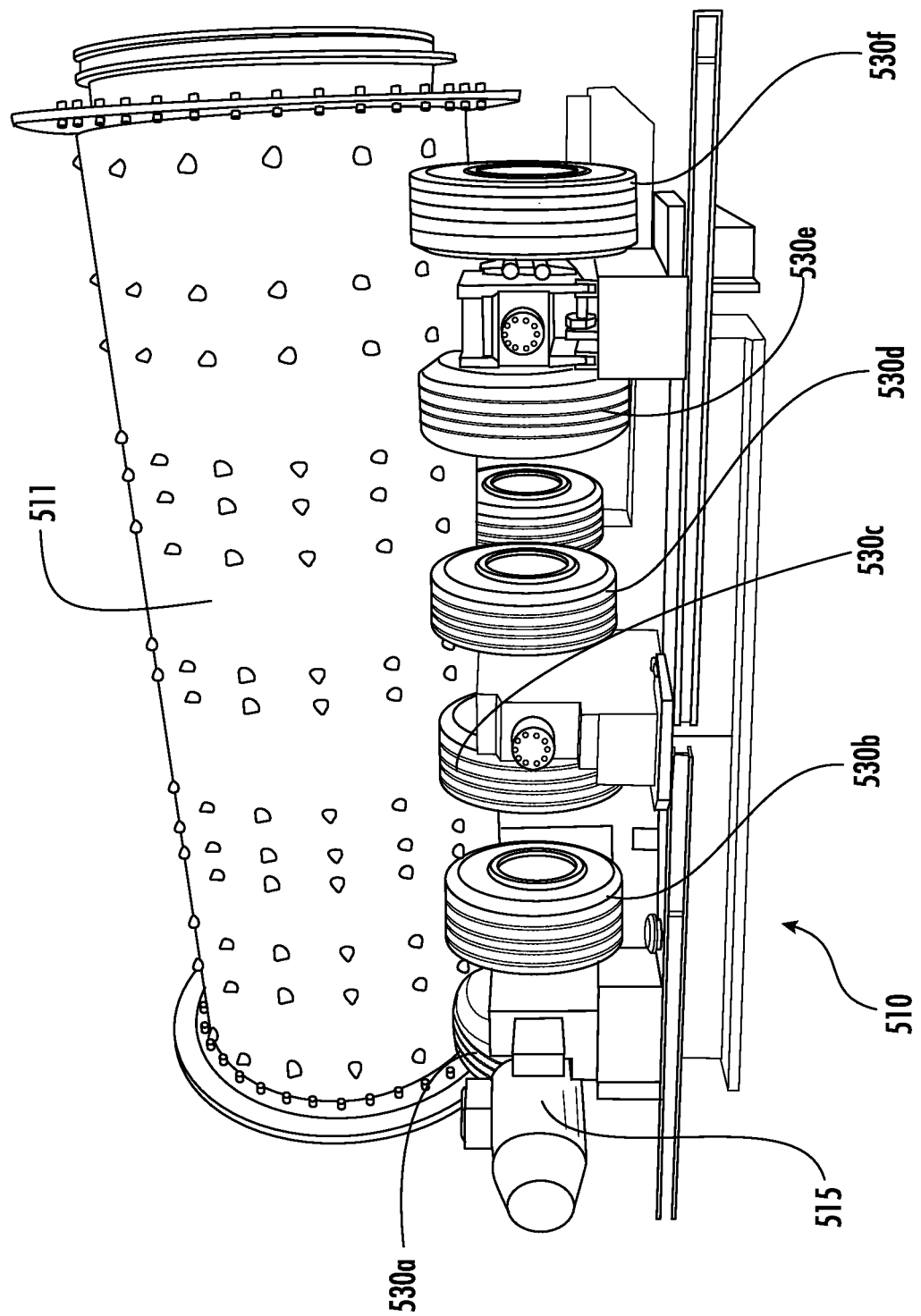
FIG. 44 is a schematic diagram of a mine material processing apparatus in accordance with an embodiment.
Figure 45:
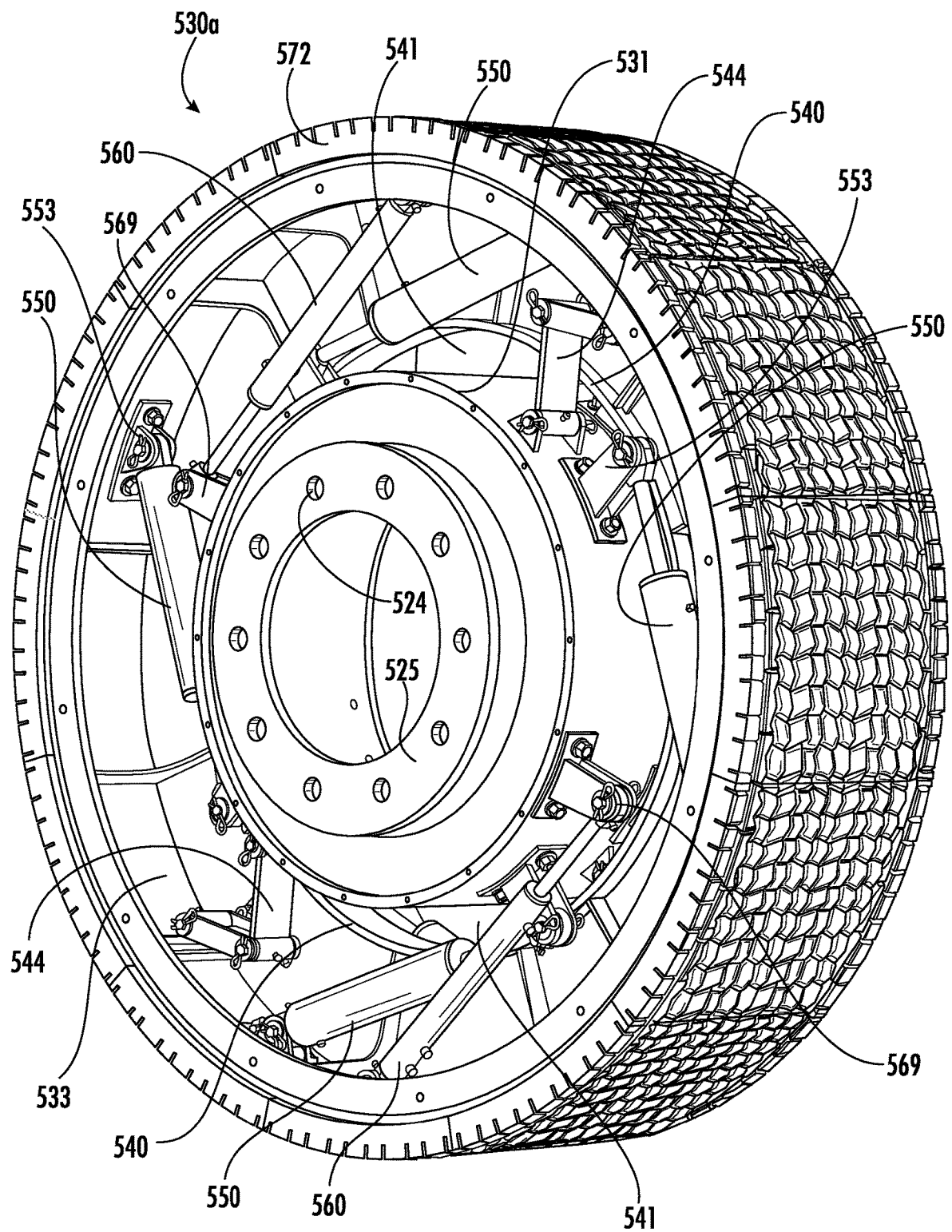
FIG. 45 is a perspective view of a wheel assembly of the mine material processing apparatus of FIG. 44.

Referring now to FIGS. 44-45, in another embodiment, a mine material processing apparatus 510 includes a rotatable drum 511 to process mine material. Wheel assemblies 530a-

530f, for example, as described herein, are illustratively configured for rotation of the rotatable drum 511.

Similar to other wheel assemblies, each wheel assembly 530a-530f includes an inner rim 531, an outer rim 533 surrounding the inner rim, and gas springs 550 operatively coupled between the inner and outer rims. An outer ring 540 is coupled to the outer rim 533 and, as described in embodiments above, defines a closable gap 541 with adjacent portions of the inner rim 531 to define a mechanical stop to limit movement between the inner and outer rims. Other elements of the wheel assembly 530a illustrated but not specifically described, such as, for example, the dampers 560, the tread body 572, the lateral stops 544, the gas spring and damper mounting brackets 553, 569, and the fastener receiving passageways 524 within inwardly extending flange ring 525, for example, are similar to those described above.

A drive motor 515 is coupled to the inner rim 531 of wheel assemblies 530a, 530b. More particularly, the drive motor 515 may be coupled to the wheel assemblies via the fastener receiving passageways 524 within inwardly extending flange ring 525. The drive motor 515 may include an electric motor coupled to a drivetrain, for example. In some embodiments, the drive motor 515 may directly drive the wheel assembly 530a-530f. Other wheel assemblies 530c-530f may be considered idle wheel assemblies and may not be driven, but rather are permitted to rotate freely or independently of a drive motor 515. In some embodiments, a respective drive motor 515 may be coupled to the inner rim 531 of each wheel assembly 530a-530f.

Figure 46:
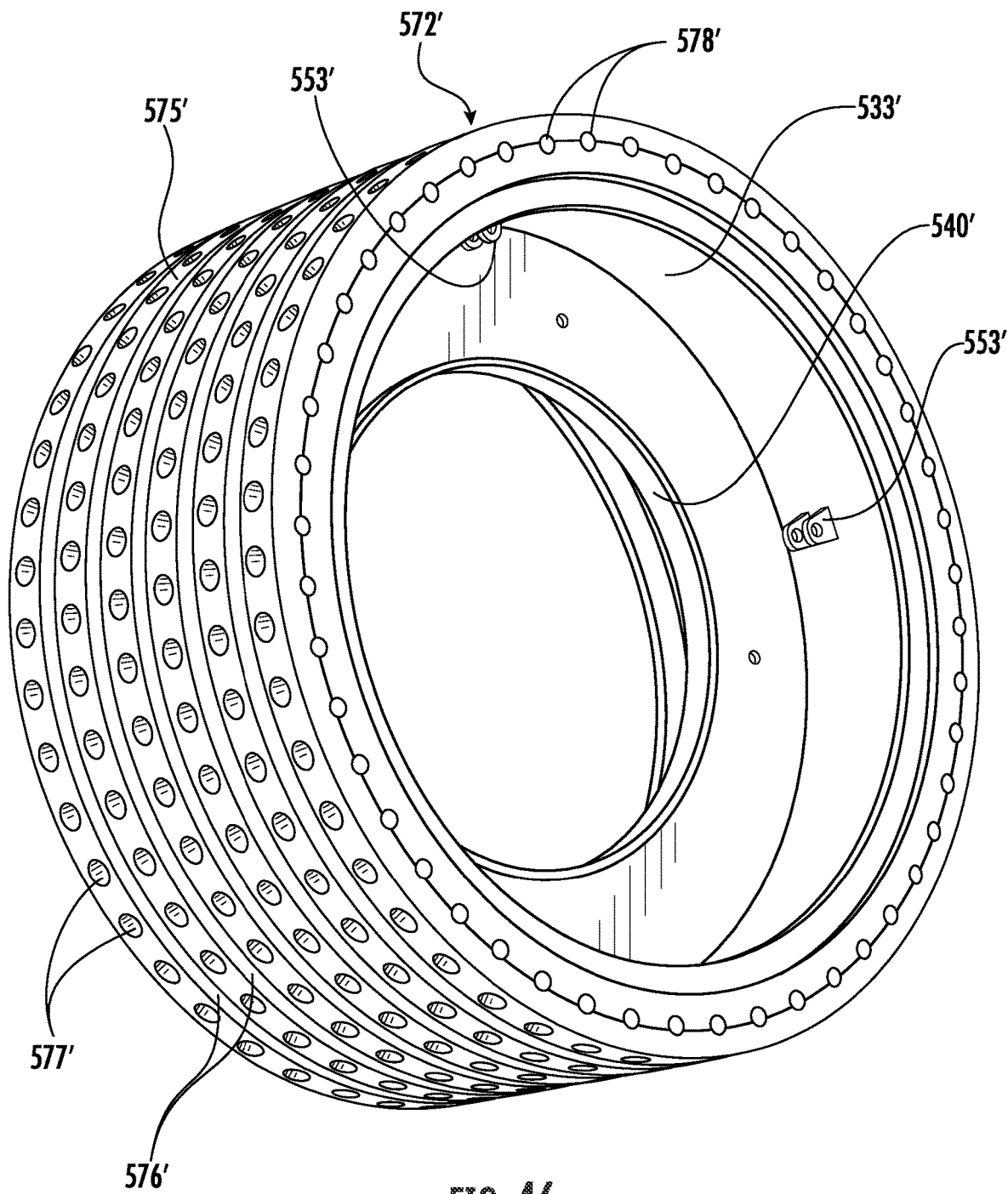
FIG. 46 is a perspective view of a portion of a wheel assembly for use with a mine material processing apparatus in accordance with another embodiment.
Figure 47:
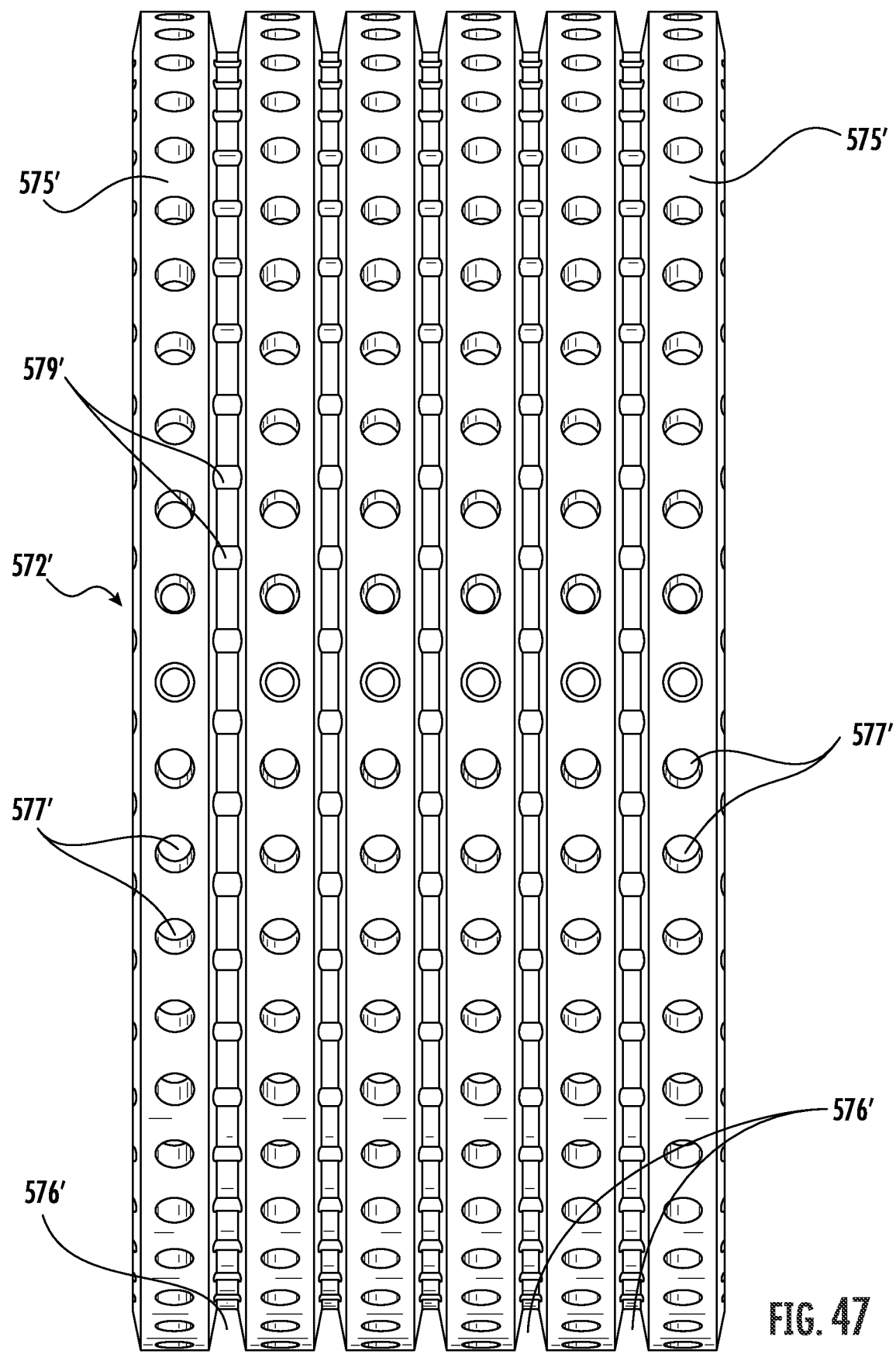
FIG. 47 is a front view of a portion of a wheel assembly of FIG. 46.
Figure 48:
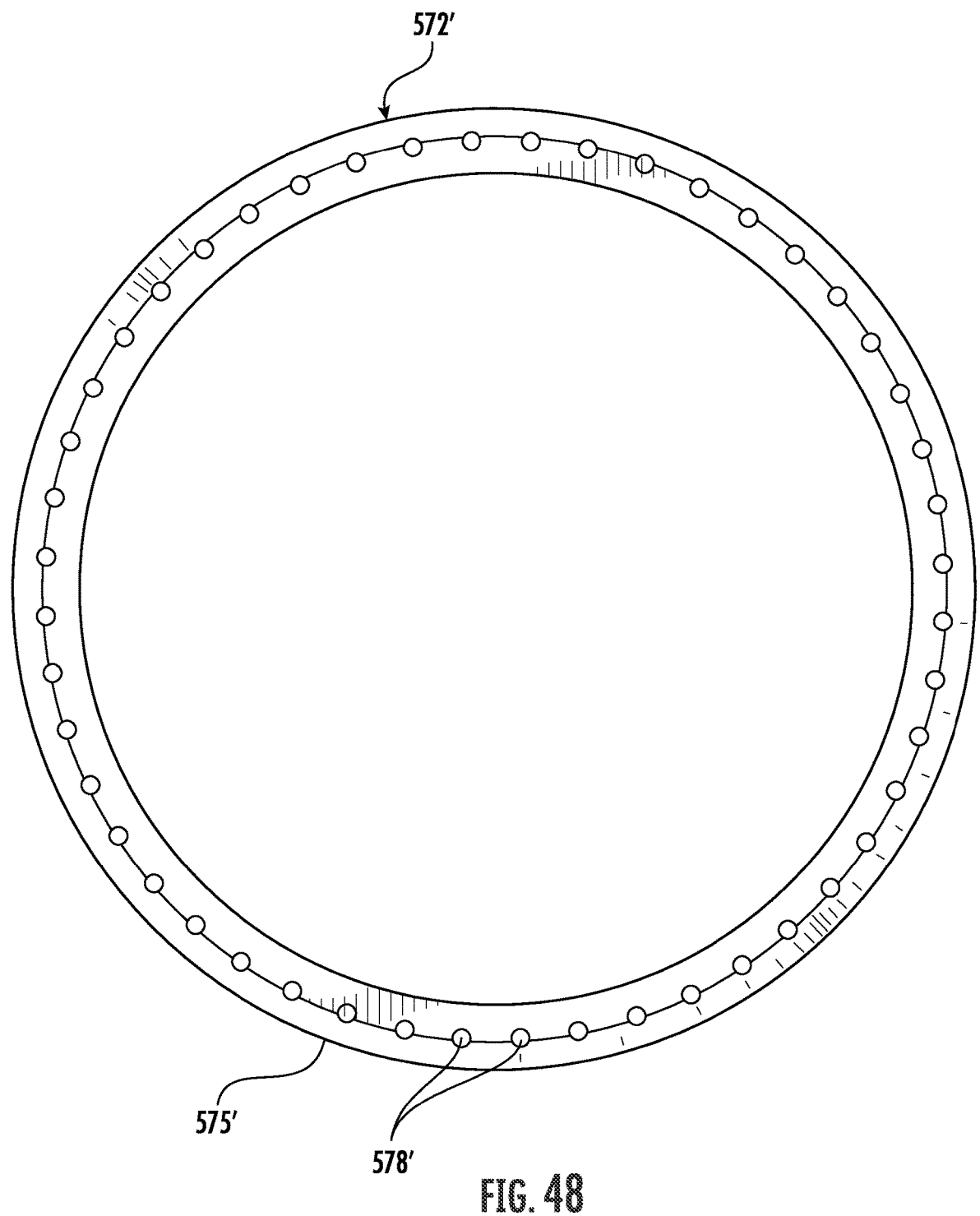
FIG. 48 is a side view of the tread member of the wheel assembly of FIG. 46.

Referring now to FIGS. 46-48, in another embodiment, a tread body 572', for example, a rubber tread body, is carried by the outer rim 533'. The tread body 572' has an outer contact surface 575', an inboard side, and an outboard side. Embedded passageways 578' are below the outer contact surface 575' and extend between the inboard and outboard sides. The embedded passageways 578' are illustratively circular. Of course, the embedded passageways 578' may be another shape.

Circumferential grooves 576', for example, having a U-shape, extend downward from outer contact surface 575' to expose the embedded passageways 578' at intersections 579' thereof. Opening features 577' extend inwardly from the outer contact surface 575'. The opening features 577' are illustratively round or have a circular shape. The opening features 577' may have another shape.

As will be appreciated by those skilled in the art, the tread body 572' illustratively has a circular shape to permit changing of tread body by slidably removing the tread body from outer rim 533'. Replacement of the tread body 572' is performed by sliding the tread body over the outer rim 533'. In some embodiments, the tread body 572' may not be bonded to the outer rim 533', since as use in a mine material processing apparatus (i.e., to rotate the rotatable drum), forces that typically occur on vehicle, for example, from relatively hard braking, may be reduced. Elements illustrated but not specifically described, such as, for example, the outer ring 540' and the gas spring mounting brackets 553', are similar to those described above.

Figure 49:
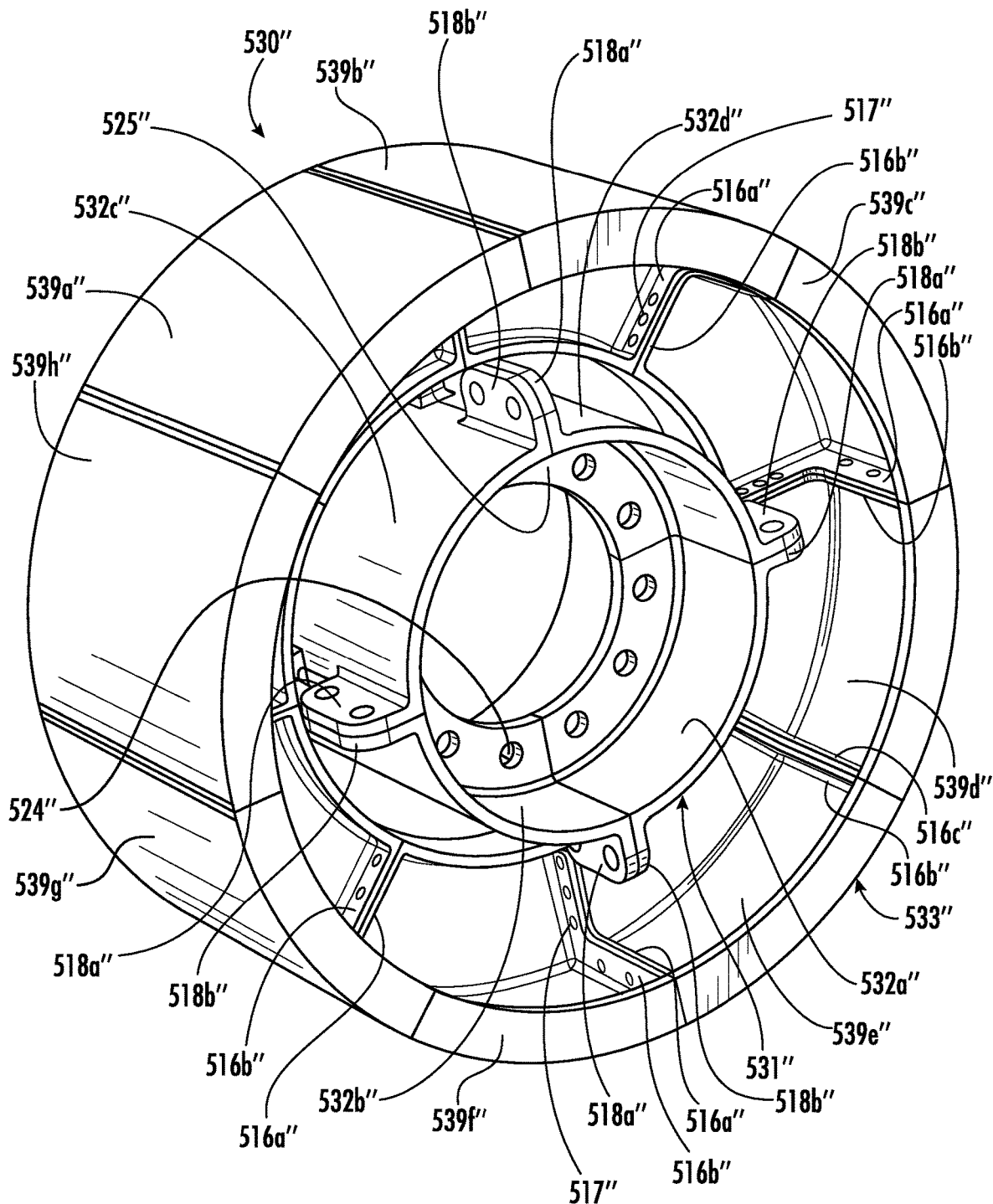
FIG. 49 is a perspective view of a portion of a wheel assembly for use with a mine material processing apparatus in accordance with another embodiment.

Referring now to FIG. 49, in another embodiment of a wheel assembly 530" for mine material processing, each wheel assembly may be segmented, for example. More particularly, the inner rim 531" may include arcuate inner rim segments 532a"-532d" coupled together, for example, in end-to-end relation, to define a circular inner rim.

Each arcuate inner rim segment 532a"-532d" has end flanges 518a", 518b" at opposing ends. More particularly, a respective inner flange 518a", 518b" is at each end of an arcuate inner rim segment 532a"-532d" for coupling adjacent ones of the arcuate inner rim assemblies in end-to-end relation. Each inner flange 518a", 518b" has openings or inner flange fastener receiving passageways therein to receive inner flange fasteners therethrough when aligned with an adjacent end flange.

The wheel assembly 530" also includes an outer rim 533" having a circular shape. Similar to the circular inner rim 531" the circular outer rim 533" is segmented, or defined by coupled together arcuate outer rim segments 539a"-539h". While eight arcuate outer rim segments 539a"-539h" are illustrated, it will be appreciated by those skilled in the art that there may be any number of arcuate outer rim segments, for example, and, as illustrated, the number of arcuate outer rim segments need not match the number of arcuate inner rim segments 532a"-532d".

Each arcuate outer rim segment 539a"-539h" also has end flanges 516a", 516b" at opposing ends. More particularly, a respective outer flange 516a", 516b" is at each end of the arcuate outer rim segment 539a"-539h" for coupling adjacent ones of the arcuate outer rim segments. Each outer flange 516a", 516b" has openings or outer flange fastener receiving passageways 517" therein to receive outer flange fasteners therethrough when aligned with an adjacent outer flange. Elements illustrated, but not specifically described, for example, fastener receiving passageways 524" within inwardly extending flange ring 525", and further details of a segmented wheel assembly, are described in U.S. patent application Ser. No. 16/865,231, the entire on contents of which are herein incorporated by reference.

A method aspect is directed to a method of processing mine material. The method includes operating a plurality of wheel assemblies 520a-520f to rotate a rotatable drum 511 to process the mine material. Each wheel assembly 520a-520f includes an inner rim 531, an outer rim 533 surrounding the inner rim, and a plurality of gas springs 550 operatively coupled between the inner rim and the outer rim.

Another method aspect is directed to a method of making an apparatus 510 for processing mine material. The method includes arranging a plurality of wheel assemblies 520a-520f for rotation of a rotatable drum 511 to process the mine material. Each wheel assembly 520a-520f includes an inner rim 531, an outer rim 533 surrounding the inner rim, and a plurality of gas springs 550 operatively coupled between the inner rim and the outer rim.

Figure 50:
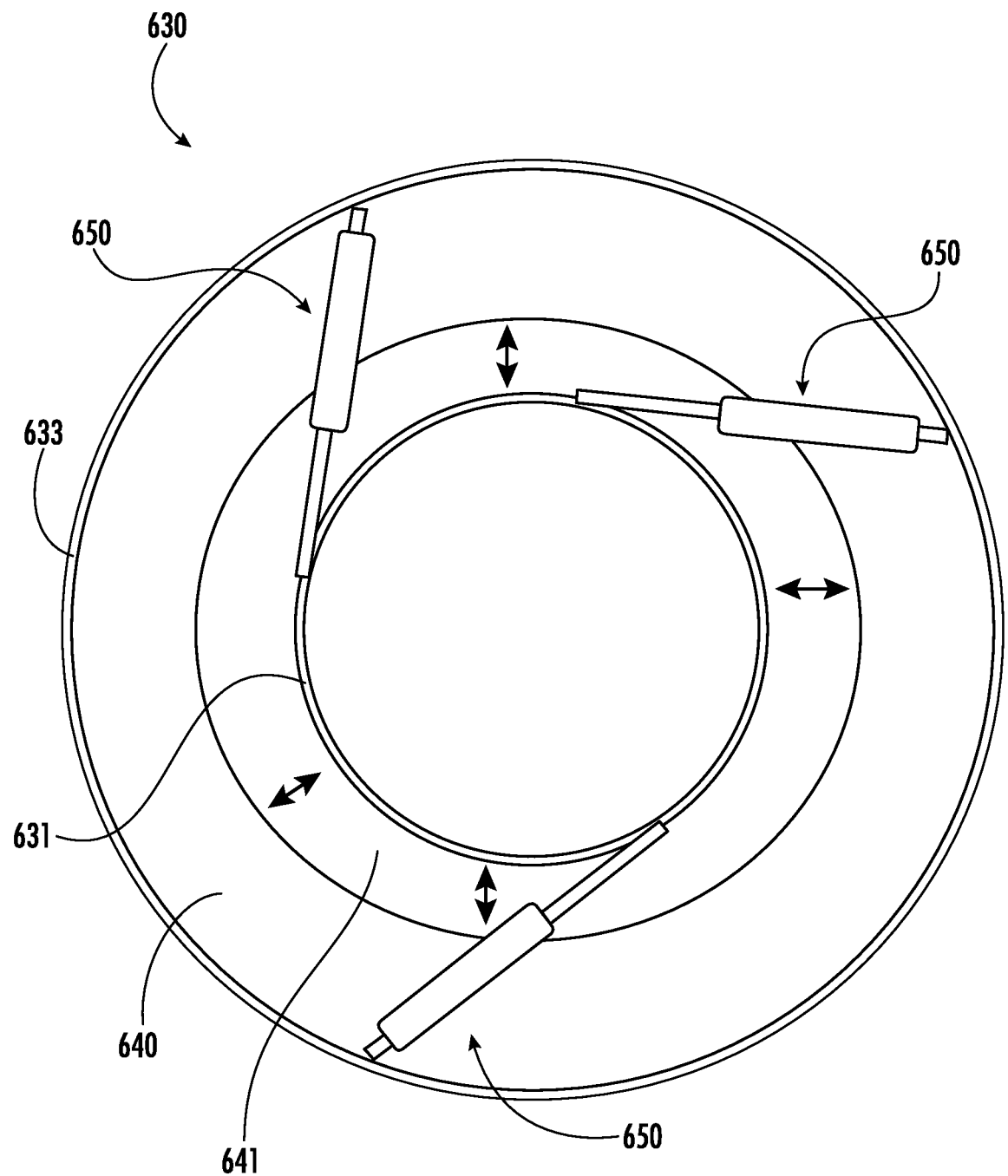
FIG. 50 is a schematic diagram of a wheel assembly in accordance with another embodiment.
Figure 51:
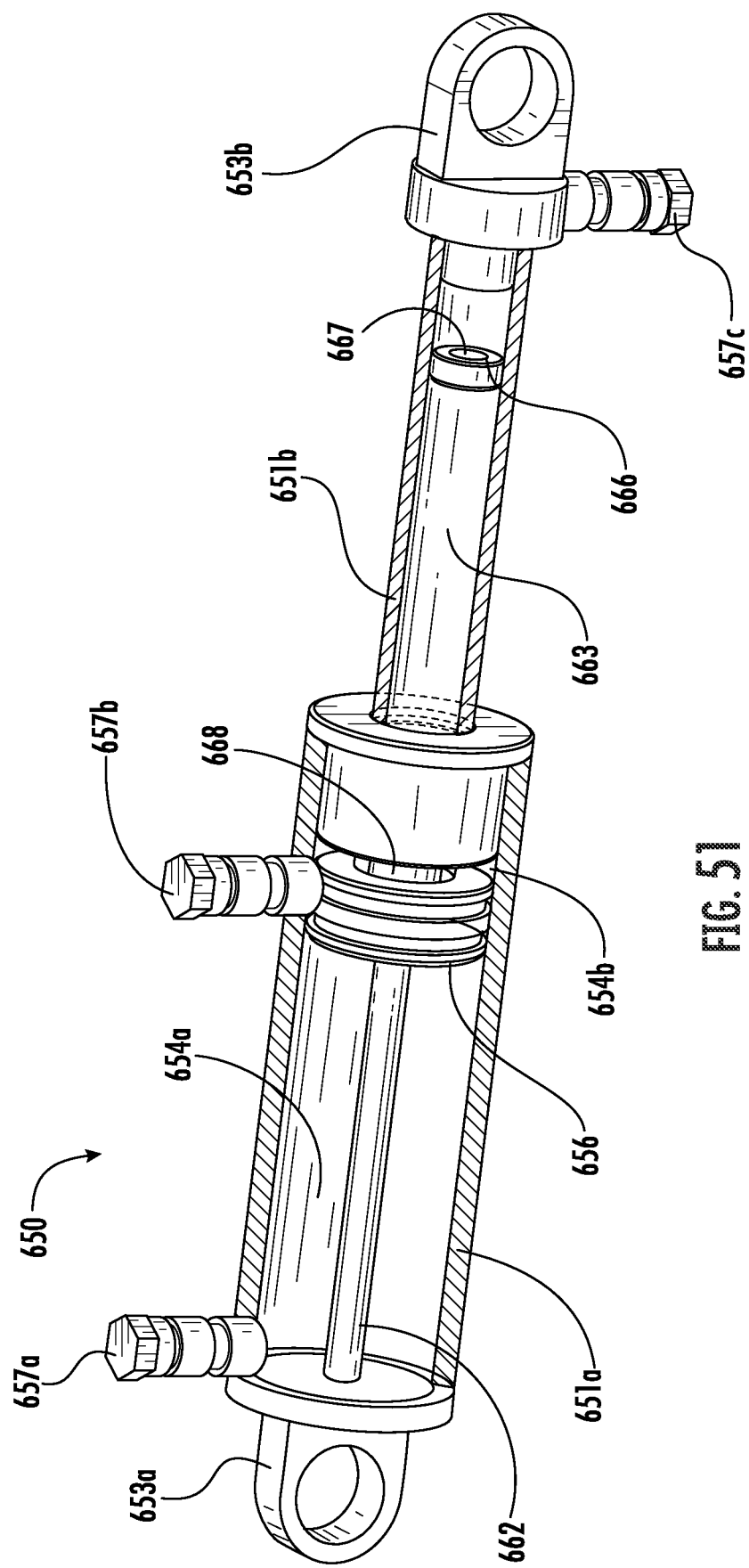
FIG. 51 is a partial cut-away view of the gas spring with associated integral hydraulic damper of FIG. 50.
Figure 52:
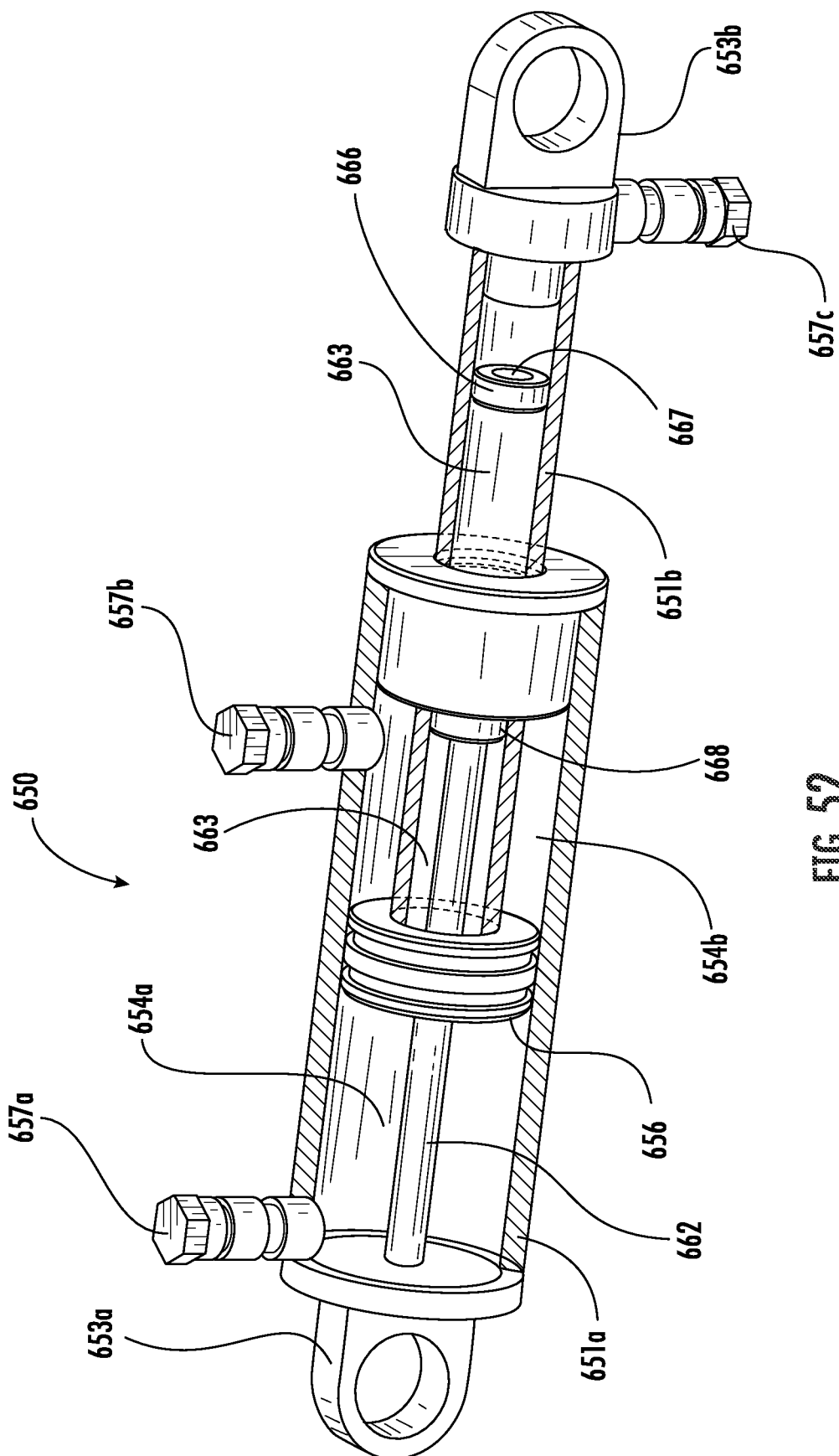
FIG. 52 is another partial cut-away view of the gas spring with associated integral hydraulic damper of FIG. 50.
Figure 53:
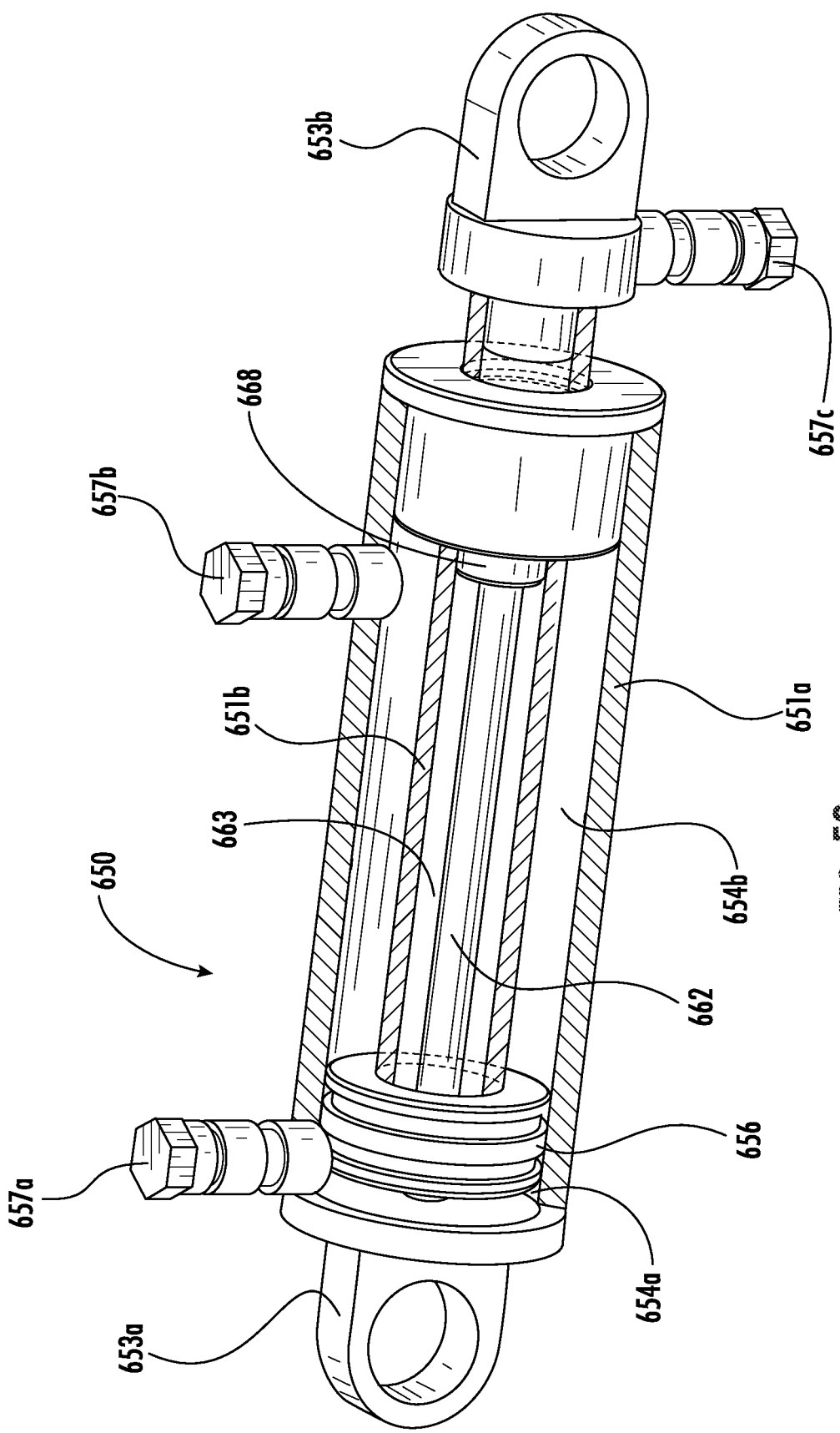
FIG. 53 is another partial cut-away view of the gas spring with associated integral hydraulic damper of FIG. 50.
Figure 54:
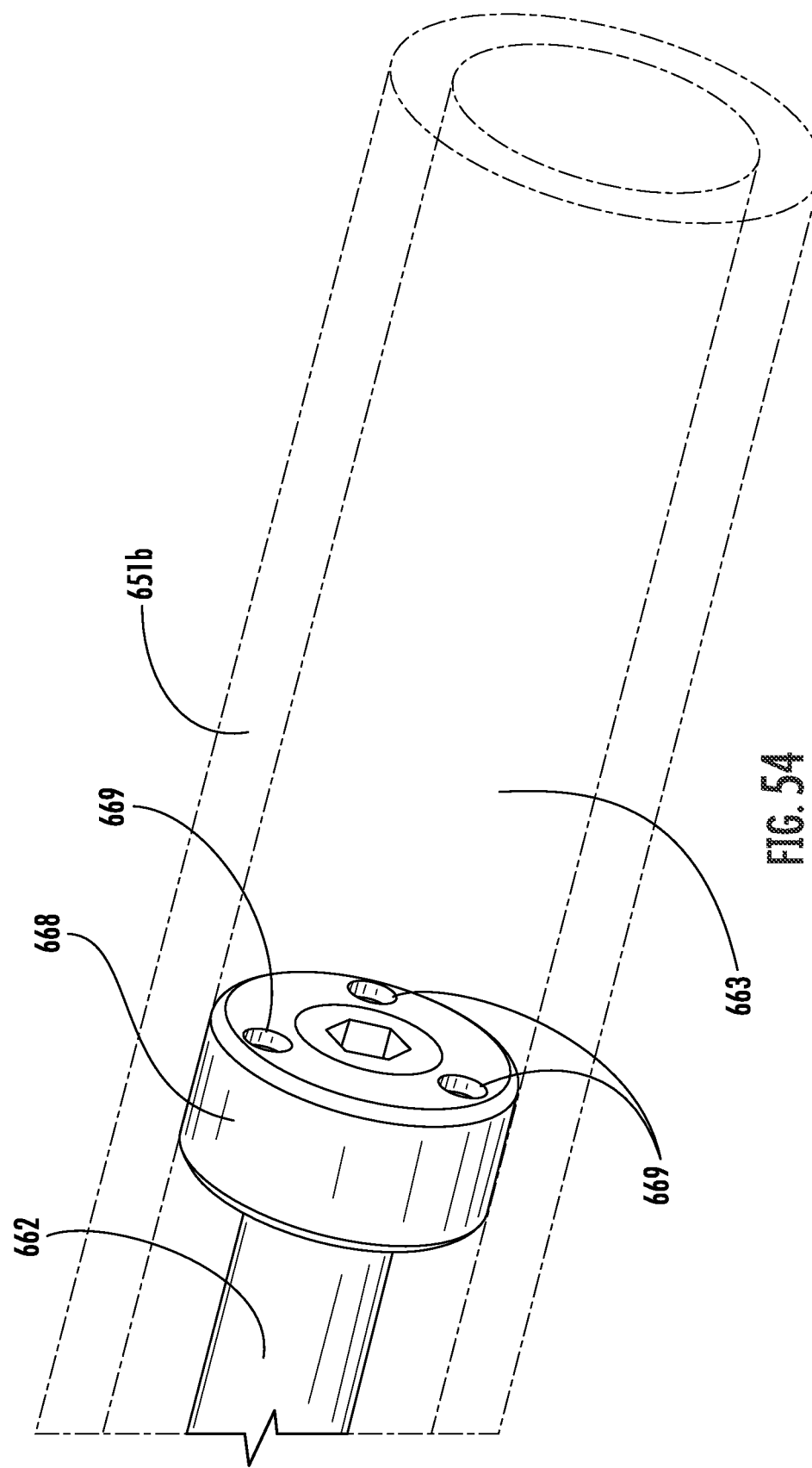
FIG. 54 is an enlarged partial cut-away view of a portion of the gas spring with associated integral hydraulic damper of FIG. 50.

Referring now to FIG. 50, in another embodiment, a wheel assembly 630 illustratively includes an inner rim 631 to be coupled to a hub of a vehicle. An outer rim 633 surrounds the hub, and more particularly, the inner rim 631. An outer ring 640 or disk is coupled to the outer rim 633 adjacent an inboard side of the outer rim. The outer ring 640 being coupled to an inboard side of the outer rim 633 defines a closable gap 641 with adjacent interior portions of an inboard side of the inner rim 631 to define a mechanical stop to limit relative movement between the inner and outer rims.

Gas springs with associated integral hydraulic dampers 650 are operatively coupled between the inner rim 631 and the outer rim 633 to provide a suspension for relative movement between the inner and outer rims. The gas springs with associated integral hydraulic dampers 650, similar to embodiments of the gas springs described above, have an operating stroke the permits the outer ring 640 to define a mechanical stop. As will be appreciated by those skilled in the art, the gas springs with associated integral hydraulic dampers 650 function similarly to the gas springs and hydraulic dampers described to provide the suspension and provide damping.

Referring now to FIGS. 51-54, further details of the gas springs with associated integral hydraulic dampers 650 will now be described. Each gas spring with associated integral hydraulic damper 650 includes a first cylinder body 651a and a second cylinder body 651b. The second cylinder body 651b is slidable within the first cylinder body 651a. In other words, the second cylinder body 651b may conceptually be considered a piston movable within with the first cylinder body 651a.

A first seal 656 is carried by an end of the of second cylinder body 651b. The first seal 656 defines first and second gas chambers 654a, 654b within the first cylinder body 651a. A shaft 662 is coupled to an end of the first cylinder body 651 and extends within the first cylinder body and into the second cylinder body 651b. The shaft 662 defines a hydraulic fluid chamber 663 within the second cylinder body 651b. Each gas spring with associated integral hydraulic damper 650 also includes an enlarged orifice body 668 coupled to the shaft 662 to define a hydraulic damper with the second cylinder body 651b. The enlarged orifice body 668 has orifices 669 therein to permit the flow of hydraulic fluid therethrough. While three orifices 669 are illustrated, there may be any number of orifices.

A flow restrictor 666 is carried within the second cylinder body 651b. The flow restrictor 666 illustratively includes an orifice 667 therein to permit hydraulic fluid to pass therethrough.

Gas ports 657a, 657b are respectively coupled to the first and second gas chambers 654a, 654b of each gas spring with associated integral hydraulic damper 650. A hydraulic fluid port 657c is coupled to the second cylinder body 651b. While two gas ports and one hydraulic fluid port is illustrated, those skilled in the art will appreciate that there may be more any number of gas and hydraulic fluid ports 657a-657c.

Each gas spring with associated integral hydraulic damper 650 also includes first and second mounting brackets 653a, 653b coupled to the first and second cylinder bodies 651a, 651b, respectively. The first and second mounting brackets 653a, 653b, similar to the mounting brackets described above, are for mounting the gas springs with associated integral hydraulic dampers 650 between the inner and outer rims 631, 633.

Those skilled in the art will appreciate that the gas springs with associated integral hydraulic dampers 650 may advantageously provide a gas suspension and a damper function while saving space within the wheel assembly (i.e., between the inner and outer rims 631, 633). More particularly, the gas springs with associated integral hydraulic dampers 650 provide this functionality by way of a Kelvin coupling mechanism, as will be appreciated by those skilled in the art.

Figure 55:
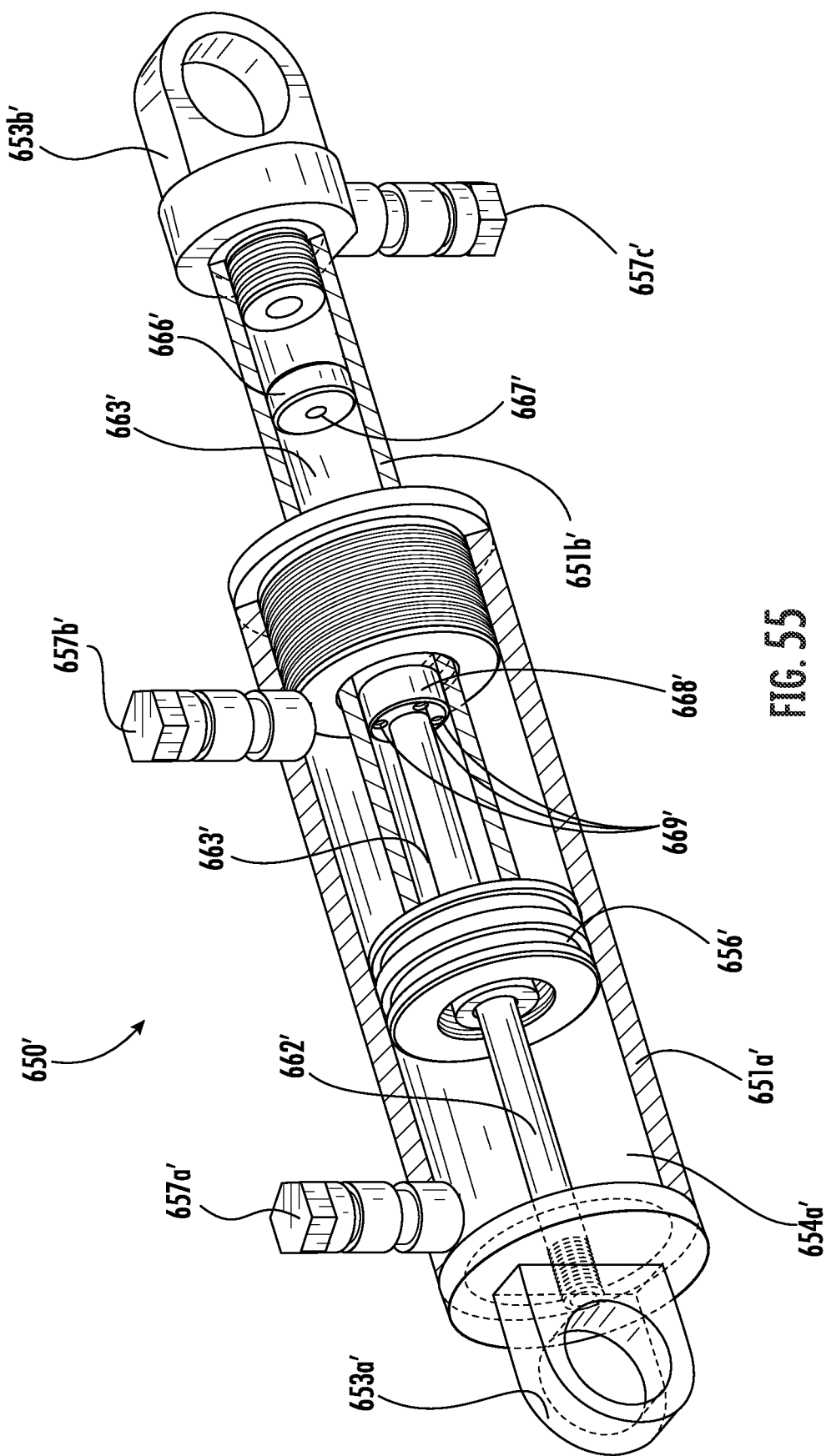
FIG. 55 is a partial cut-away view of a gas spring with associated integral hydraulic damper in accordance with another embodiment.

Referring briefly to FIG. 55, in another embodiment, the shaft 662', the first seal 656', an end of the first cylinder body 651a', and the end of the second cylinder body 651b' opposite the first seal may be threaded. By provided threads on the shaft 662', the first seal 656', and the ends of the first and second cylinder bodies 651a', 651b', the gas springs with associated integral hydraulic dampers 650' may be adjusted for a desired response with respect to the spring and damper. A volume compensator (e.g., in the form of a reservoir and diaphragm, not illustrated) may be spring loaded, in which case, a charge post may not be desirable. Other elements illustrated but specifically not described, for example, the first cylinder body 651a', the enlarged orifice body 668' and associated orifices 669', the first and second gas chambers 654a', 654b', the second cylinder wall 666' and associated orifice 667', the hydraulic fluid chamber 663', the ports 657a'-657c', and the first and second mounting brackets 653a', 653b' are similar to those described above.

A method aspect is directed to method of making a wheel assembly 630 to be coupled to a hub of a vehicle. The method includes operatively coupling a plurality of gas springs with associated integral hydraulic dampers 650 between an inner rim 631 to be coupled to the hub of the vehicle and an outer rim 633 surrounding the hub to provide a suspension for relative movement between the inner rim and the outer rim. Each of the plurality of gas springs and associated integral hydraulic dampers 650 includes a first cylinder body 651a and a second cylinder body 651b slidable therein, a first seal 656 carried by an end of the second cylinder body defining first and second gas chambers within the first cylinder body, and a shaft 662 extending within the first cylinder body and into the second cylinder defining a hydraulic fluid chamber. Each of the gas springs with associated integral hydraulic dampers 650 also includes an enlarged orifice body 668 coupled to the shaft 662 defining a hydraulic damper with the second cylinder body 651b.

Figure 56:
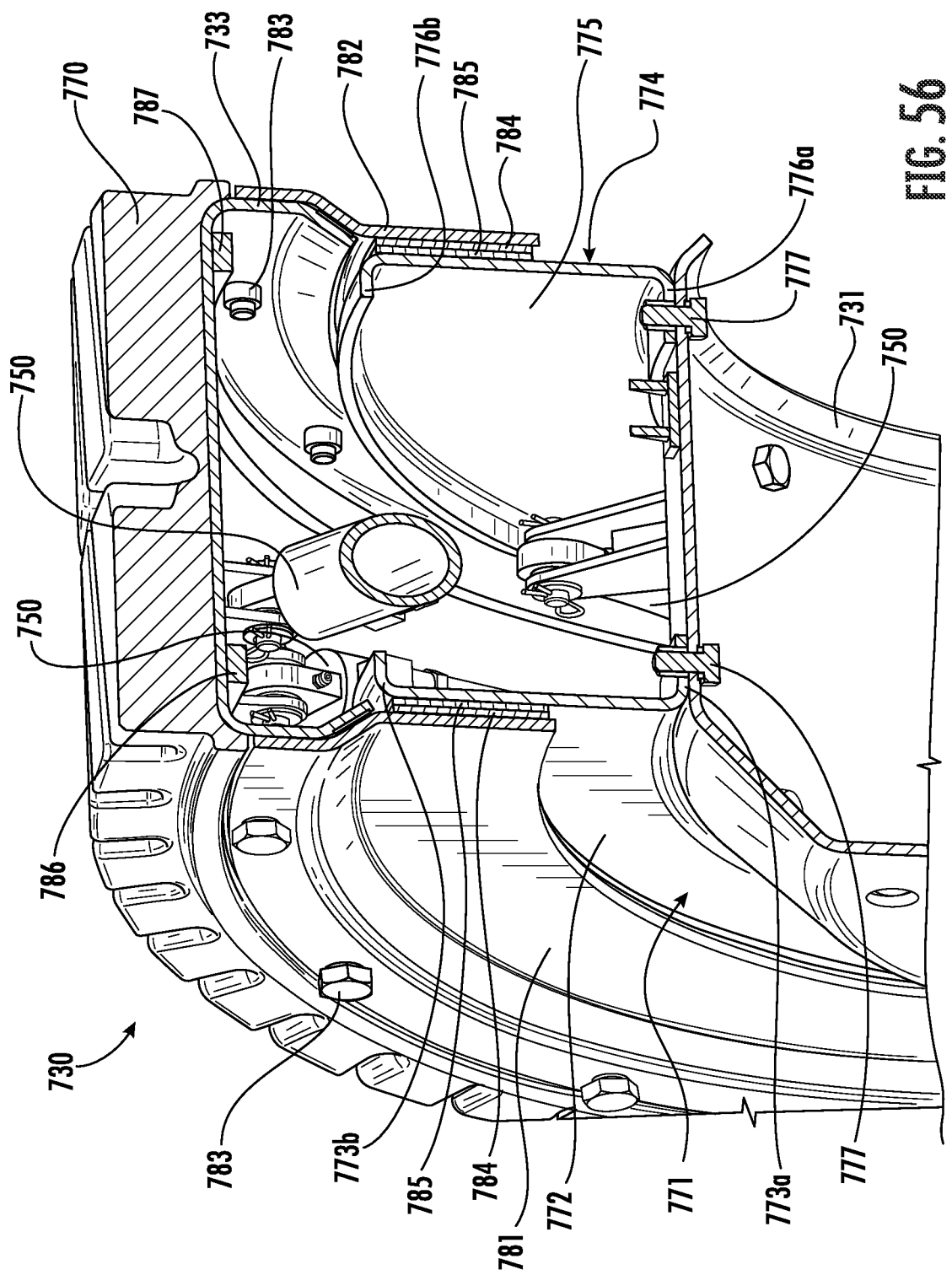
FIG. 56 is a cut-away view of a portion of a wheel assembly in accordance with another embodiment.

Referring now to FIG. 56, in another embodiment, a wheel assembly 730 illustratively includes an inner rim 731 to be coupled to a hub of a vehicle. An outer rim 733 surrounds the hub, and more particularly, the inner rim 731. A tread 770 is carried by the outer rim.

Gas springs 750 are operatively coupled between the inner rim 731 and the outer rim 733 to provide a suspension for relative movement between the inner and outer rims. As will be appreciated by those skilled in the art, the gas springs 750 may include elements described herein to implement the damping, and/or additional dampers (not shown) coupled between the inner and outer rims 731, 733 may be used to provide damping.

An inboard flange 771 extends radially outward from an inboard side of the inner rim 731 to define an inboard mechanical stop. The inboard flange 771 includes a flange body 772 and flange lips 773a, 773b extending outwardly from the flange body. The radially inner flange lip 773a is coupled to the inner rim by way of fasteners 777.

An outboard flange 774 extends radially outward from an outboard side of the inner rim 731 to define an outboard mechanical stop. Similar to the inboard flange 772, the outboard flange 774 includes a flange body 775 and flange lips 776a, 776b extending outwardly from the flange body. The radially inner flange lip 776a is coupled to the inner rim 731 by way of fasteners 777.

Inboard and outboard sidewalls 781, 782 extend radially inward from the outer rim 733. The inboard and outboard sidewalls 781, 782 are removably coupled to the inboard and outboard sides of the outer rim 733 with fasteners 783, for example. Of course, the inboard and outboard sidewalls 781, 782 may be coupled to the outer rim 733 using other and/or coupling techniques. The inboard and/or outboard sidewalls 781, 782 may be removed to provide access to the gas springs 750 and other hardware that may be positioned between the inner and outer rims 731, 733.

The inboard and outboard sidewalls 781, 782 define an overlap area with the inboard and outboard flanges 771, 774, respectively. An elastomeric body 784 is in each overlap area. A fabric (e.g., felt-like) or other material body 785 may also be coupled to the elastomeric body 784 in the overlap area. The elastomeric bodies 784 and fabric bodies 785 may be in sliding contact with either of the flanges 771, 774 or sidewalls 781, 782. The elastomeric bodies 784 and the fabric bodies 785 may provide a seal to help keep contaminants from the space between the inner and outer rims 731, 733 while allowing the relative movement therebetween. The sidewalls 781, 782, for example, with the elastomeric and fabric bodies 784, 785 may provide between 2% and 4% damping, for example, in the lateral direction.

Inboard and outboard elastomeric rings 786, 787 are illustratively carried by an interior surface of the outer rim 733. The inboard and outboard elastomeric rings 786, 787 are aligned with the inboard and outboard flanges 771, 774 respectively. During operation, as will be appreciated by those skilled in the art, as the wheel assembly 730 moves during motion of the vehicle, the gas springs 750 permit relative movement between the inner and outer rims 731, 733 up to the mechanical stops. During operation of the mechanical stops, the elastomeric rings 786, 787 contact the radially outward ones of the inner and outer flange lips 773*b*, 776*b*. The elastomeric rings 786, 787 may permit up to 20,000 lbs of load for example.

The wheel assembly 730 may advantageously provide, for vehicles driven by combustion engines, increased fuel efficiency by providing less roadway resistance. For electric driven vehicles, the decreased roadway resistance may equate to a longer range on a given battery charge, for example. Additionally, the inboard and outboard mechanical stops may operate as a "run-flat" feature, so that a vehicle may not have to carry a spare tire, thus reducing vehicle weight and increasing operating efficiency.

Figure 57:
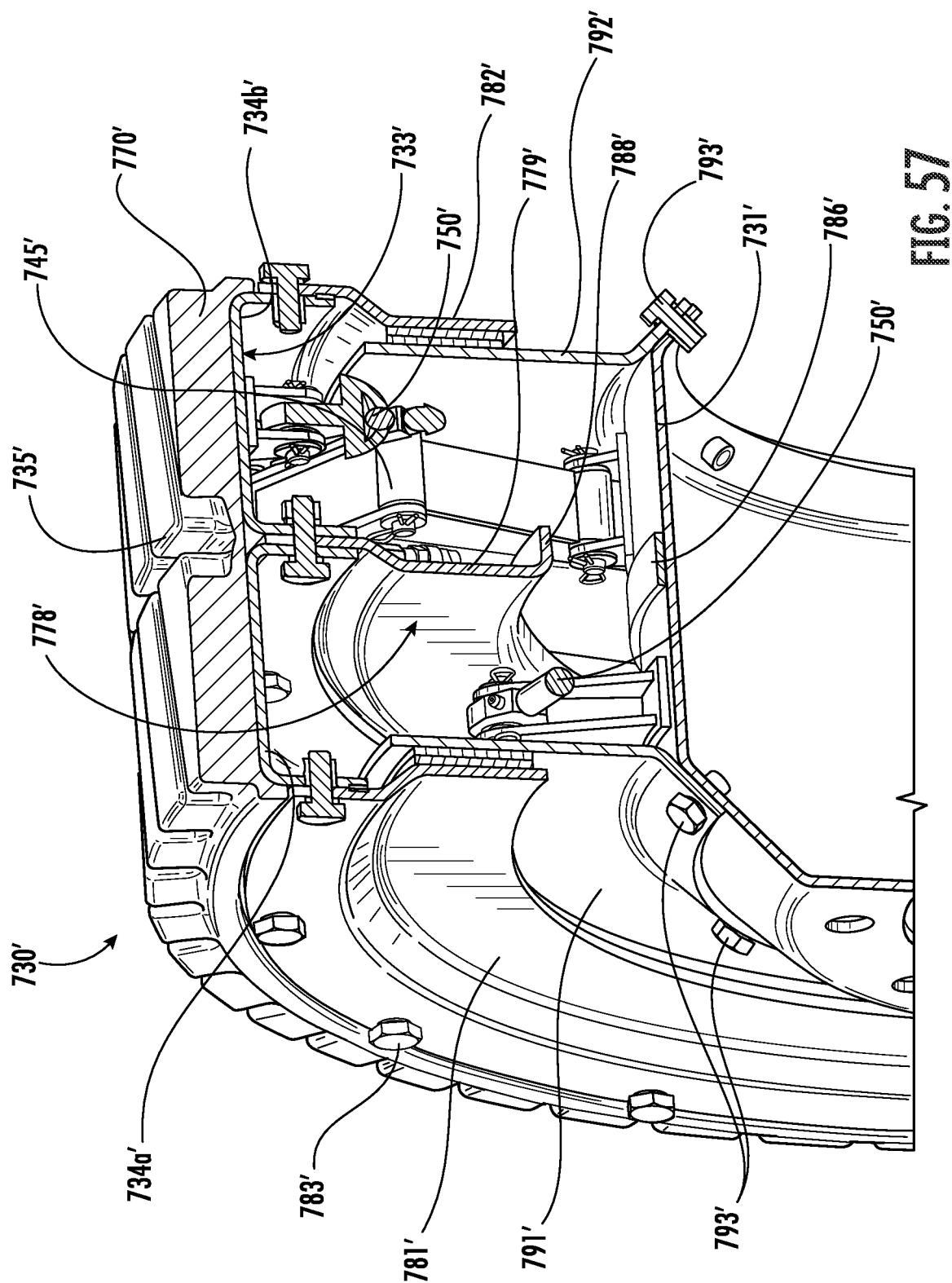
FIG. 57 is a cut-away view of a portion of a wheel assembly in accordance with another embodiment.

Referring now to FIG. 57, in another embodiment rather than inboard and outboard flanges, a medial flange 778' extends radially from a middle of the outer rim 733'. The medial flange 778' includes a flange body 779' and a flange lip 788' extending from the flange body and outwardly toward an outer side of the wheel assembly 730'. The outer rim 733' may include inboard and outboard rim segments 734*a*', 734*b*', for example, each having a U-shape and coupled together by fasteners 735'. The medial flange 778' may be coupled between the inboard and outboard rim segments 734*a*', 734*b*' by way of the fasteners 735'. In other words, the medial flange 778' is sandwiched between adjacent arms of the U-shaped inner and outer rim segments 734*a*', 734*b*'. The flange lip 788' defines a mechanical stop with inner rim 731', and more particularly, the elastomeric ring 786' aligned with the flange lip.

Inner and outer inner rim sidewalls 791', 792' coupled to the inboard and outboard sides of the inner rim 731', for example, by fasteners 793' replace the inboard and outboard flanges and define the overlap areas with the inboard and outboard sidewalls 781', 782'. Lateral stops 745', illustratively in the form of hinge retainers, are coupled between the inner and outer rims 731', 733' and limit relative lateral movement between the inner and outer rim, for example, as described above. Elements such as the tread 770', fasteners 783', elastomeric body 784', fabric body 785', and the gas springs 750' are similar to those described above.

Figure 58:
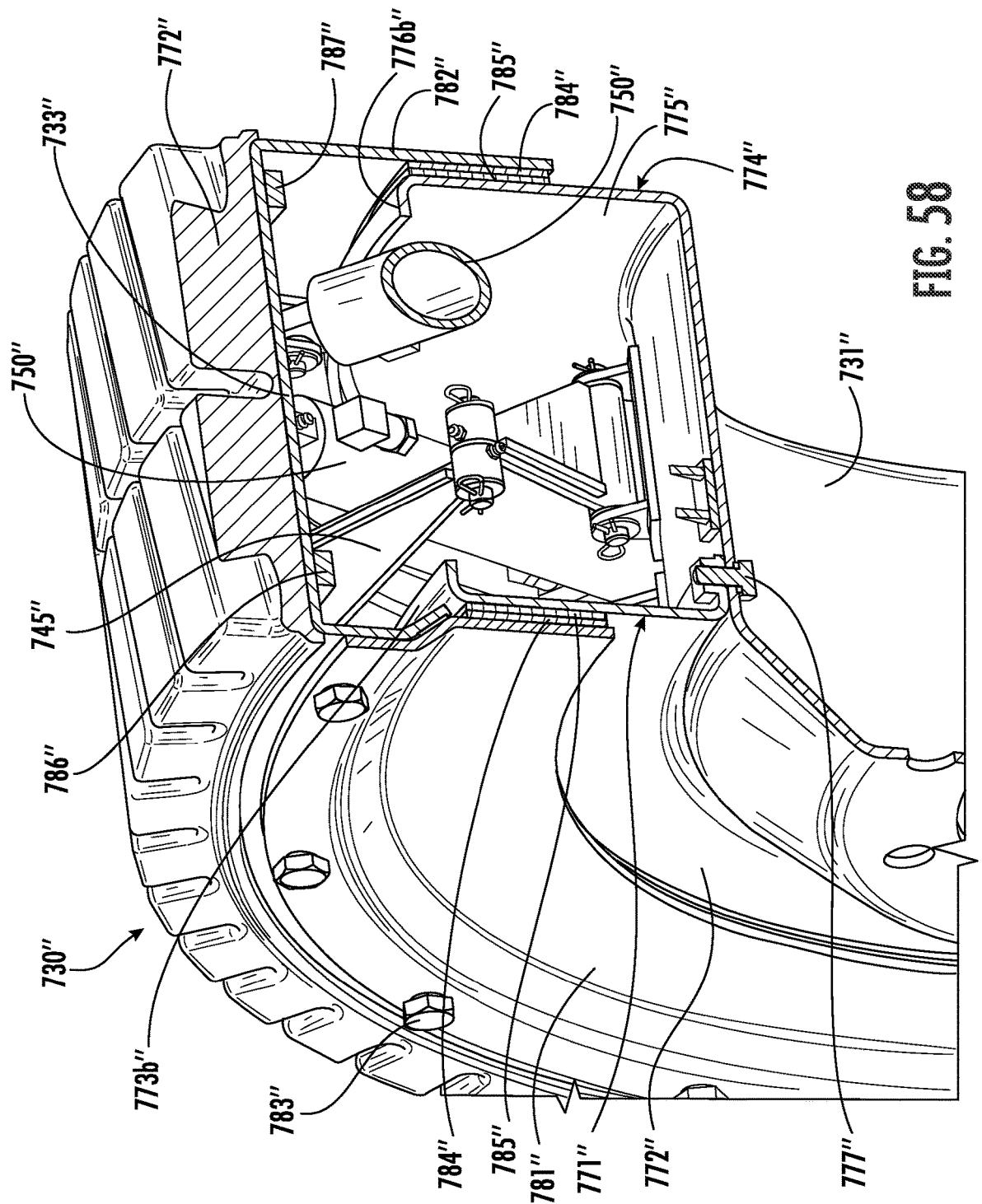
FIG. 58 is a cut-away view of a portion of a wheel assembly in accordance with another embodiment.
Figure 59:
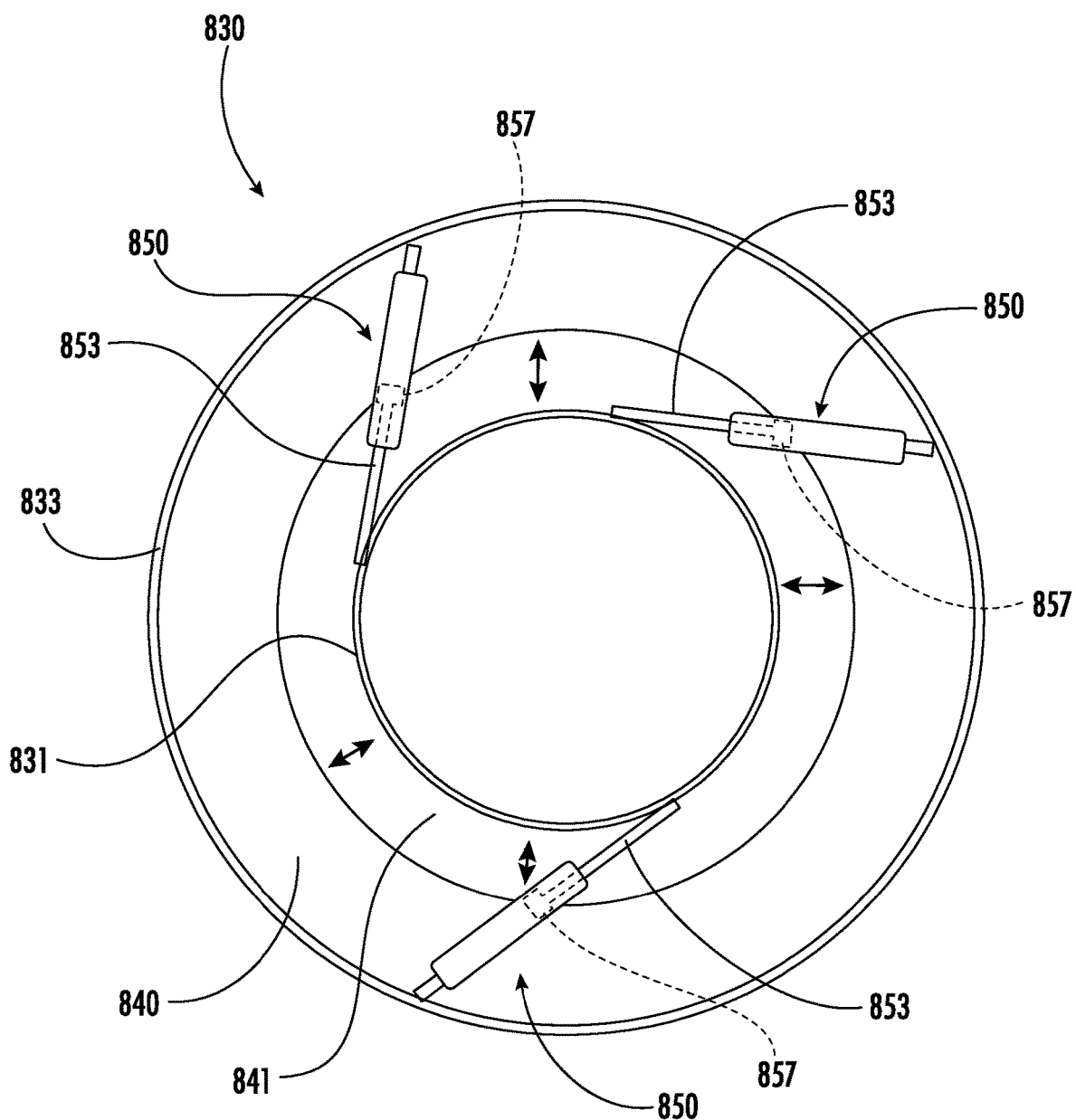
FIG. 59 is a schematic diagram of a wheel assembly in accordance with another embodiment.
Figure 60:
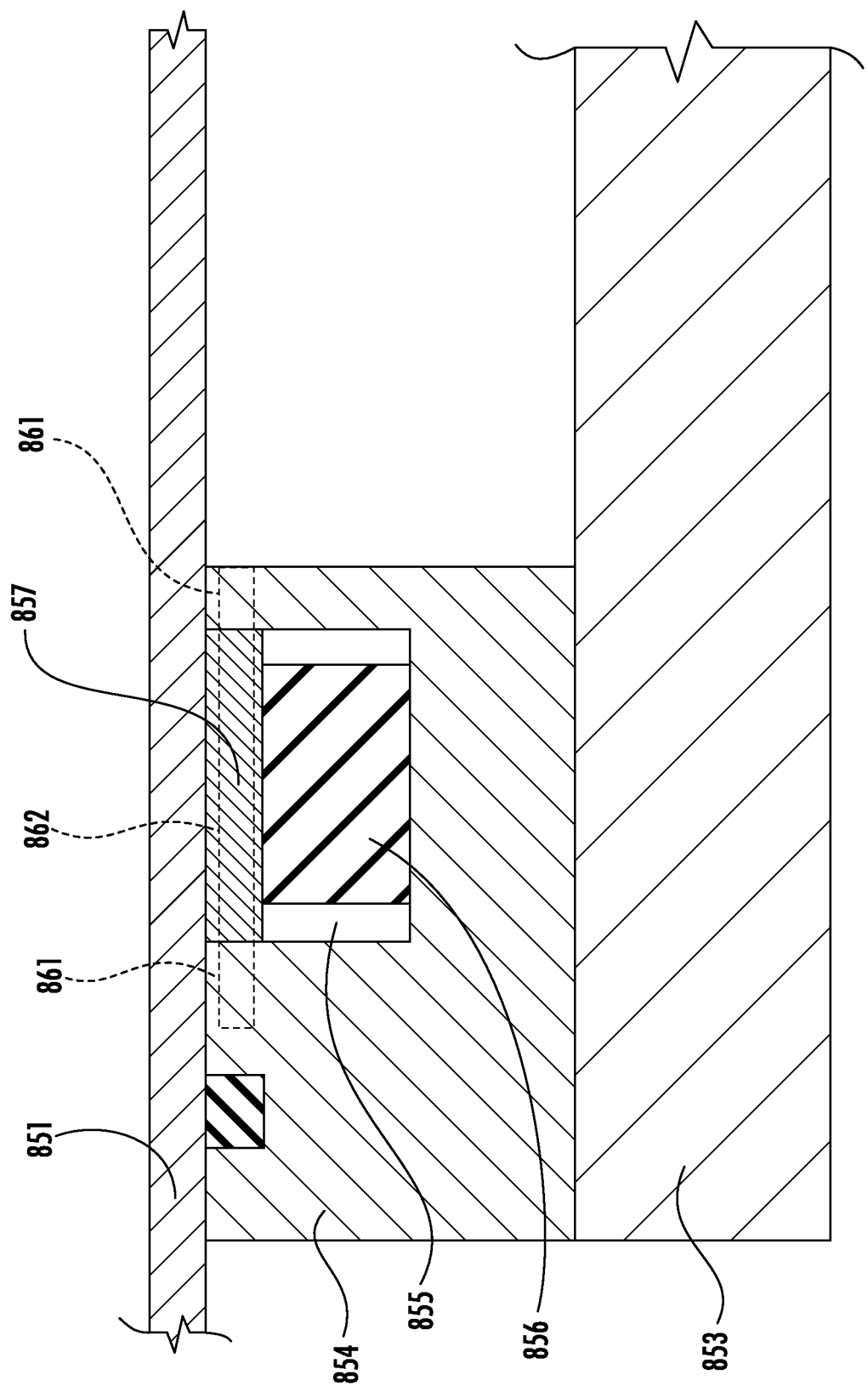
FIG. 60 is a schematic cross-sectional view of a portion of a gas spring of FIG. 59.
Figure 61:
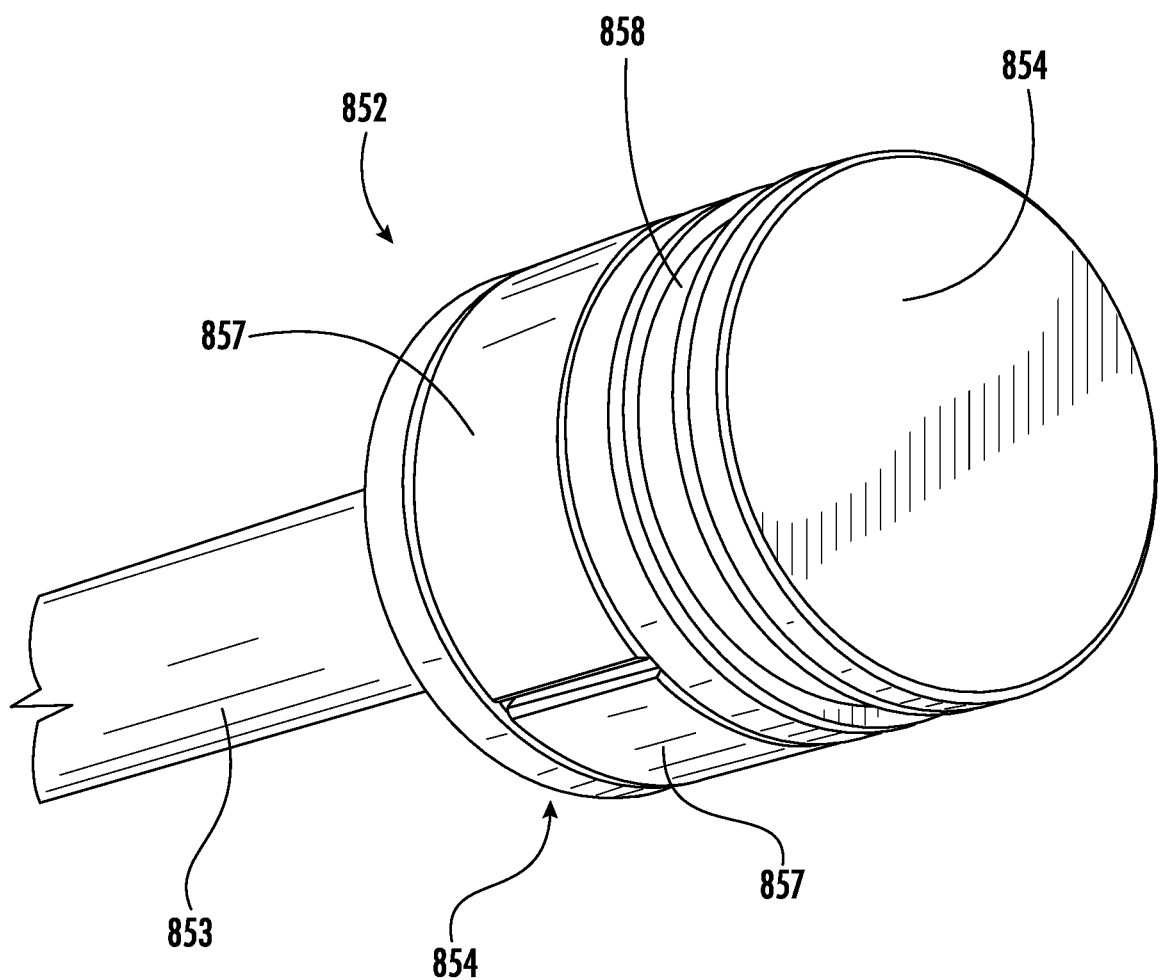
FIG. 61 is perspective view of a portion of a piston of the gas spring of FIG. 59.
Figure 62:
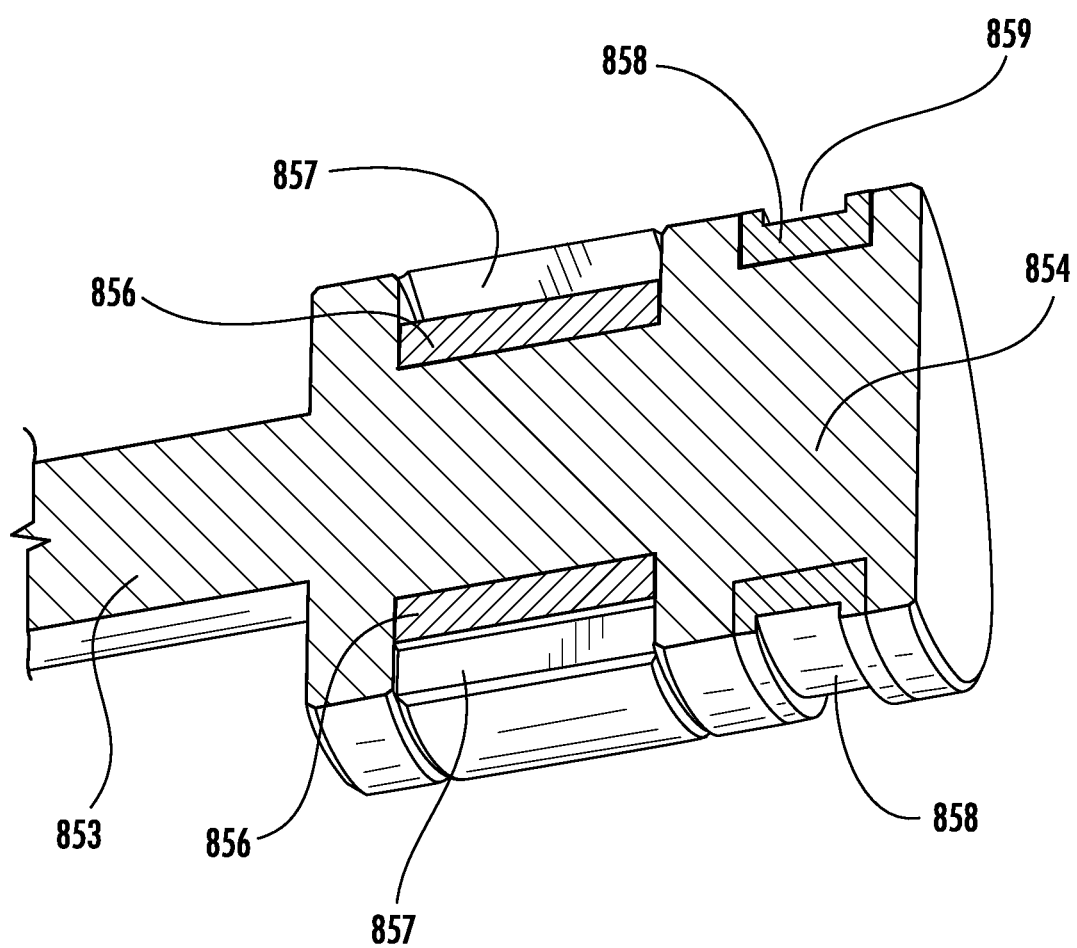
FIG. 62 is a schematic cut-away view of a portion of the piston of the gas spring of FIG. 59.
Figure 63:
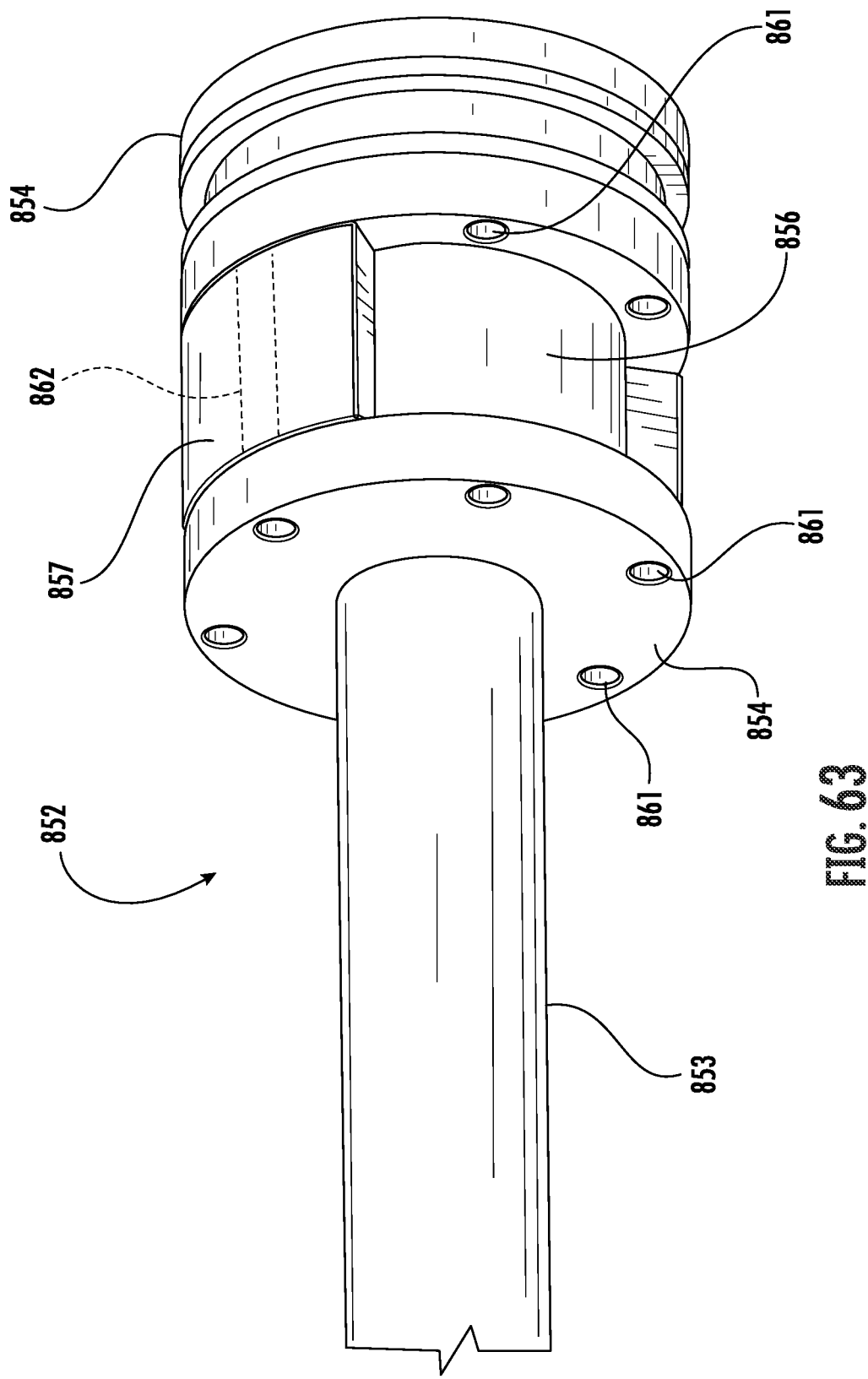
FIG. 63 is a perspective view of another portion of the piston of the gas spring of FIG. 59.

Referring now to FIG. 58, in another embodiment, the inner rim 731" and the outboard flange 774" are integrally formed as a monolithic unit. The outer rim 733" and the outer sidewall 782" are also integrally formed as a monolithic unit. Of course, the inner rim 731" and the inboard flange 771", and the outer rim 733" and the inboard sidewall 781" may be integrally formed as monolithic unit. This way, access to the inside of the wheel assembly 730" may be provided by one of the inboard and outboard sides of the wheel assembly. In some embodiments, both the inboard and outboard sidewalls 781", 782", and outer rim may be integrally formed as a monolithic unit, and/or the inboard and outboard flanges and outer rim may be integrally formed as a monolithic unit. Elements such as the tread 770", fasteners 783", 777", lateral stops 745", elastomeric rings 786", 787", flange bodies 772", 775", flange lips 773*a*", 773*b*" elastomeric and fabric bodies 784", 785", and the gas springs 750" are similar to those described above.

A method aspect is directed to a method of making a wheel assembly 730 to be coupled to a hub of a vehicle. The method includes operatively coupling a plurality of gas springs 750 between an inner rim 731 to be coupled to the hub of the vehicle and an outer rim 733 surrounding the inner rim to provide a gas suspension permitting relative movement between the inner rim and the outer rim. The method also includes positioning an inboard flange 771 to extend radially outward from an inboard side of the inner rim 731 to define an inboard mechanical stop with the outer rim 733. The method also includes positioning an outboard flange 774 spaced from the inboard flange 771 and extending radially outward from an outboard side of the inner rim 731 to define an outboard mechanical stop with the outer rim 733.

Referring now to FIGS. 59-63 in another embodiment, a wheel assembly 830 includes an inner rim 831 to be coupled to the hub of a vehicle. The wheel assembly 830 also includes an outer rim 833 surrounding the inner rim 831. A disk or ring 840 may be between the inner and outer rims 831, 833 to define a closeable gap 841.

The wheel assembly 830 also includes gas springs 850 operatively coupled between the inner and outer rims 831, 833 to provide a gas suspension permitting relative movement between the inner and outer rims. Each gas spring 850 includes a gas cylinder 851 and a piston 852 movable within the gas cylinder. The gas cylinder 851 includes a first metal.

The piston 852 illustratively includes a shaft 853, and a piston head 854 coupled to the shaft. The piston head 854 includes a recess 855 therein, and more particularly, a circumferential recess.

The piston 852 also includes a biasing member 856 within the recess 855. More particularly, the biasing member 856 is in the form of an elastomeric material body that surrounds the shaft 853 and operates as a spring to provide radially outward biasing. While a single biasing member 856 is illustrated, those skilled in the art will appreciate that there may be any number of biasing members, the biasing member may be another material, for example, metallic and/or the biasing member may be in the form of another shape or biasing member type.

The piston 852 also includes damping members 857 adjacent the biasing member 856. The damping members 857 are within the recess between the biasing member 856 and adjacent portions of an inner surface of the gas cylinder 851. The damping members 857 are arranged in side-by-side relation circumferentially around the shaft or, more particularly, around the biasing member 856. The damping members 857 are illustratively in the form of rigid bodies, and each includes a second metal that is softer than the first metal, i.e., the metal of the gas cylinder 851. The second metal may include bronze, for example. There may be any number of damping members 857 including one. The damping members 857 may be spaced apart or abutting. As will be appreciated by those skilled in the art, the biasing member 856 radially biases the damping members 857 outwardly so that the damping members frictionally engage the inner surface of the gas cylinder 851.

The damping members 857 may provide increased damping for the wheel assembly 830. For example, the added damping may be between 4-6%. Those skilled in the art will appreciate that an increased amount of damping provided by the damping members 857 may generate increased heat, while the adjustment to have less damping may be undesirable as it may not attenuate motion sufficiently.

A seal 858 is carried by the piston head 854. The seal 858 is carried in a circumferential recess axially separated from the recess carrying the biasing member 856 and the damping members 857. The seal 858 illustratively has a channel 859 therein to define a U-shape.

The piston head 854 also includes first pin-receiving passageways 861. The damping members 857 have second pin-receiving passageways 862 therein. The second pin-receiving passageways 862 are aligned with the first pin-receiving passageways 861 to accommodate respective retaining pins (not shown) during assembly. As will be appreciated by those skilled in the art, the damping members 857, when biased, extend outwardly to engage the inner surface of the gas cylinder 851. During assembly of the gas springs 850, it may be desirable to retract the damping members 857 so that the piston 852 can be inserted into the gas cylinder 851.

Once seated within the gas cylinder 851, the pins may be pulled or removed from the first and second pin-receiving passageways 861, 862 permitting the damping members 857 to expand radially to contact the inner surface of the gas cylinder 851. The contact with the inner surface of the gas cylinder 851 causes the damping members 857 to expand axially to be retained in the recess.

A related method aspect is directed to a method of making a wheel assembly 830 to be coupled to a hub of a vehicle. The method may include operatively coupling a plurality of gas springs 850 between an inner rim 831 to be coupled to the hub of the vehicle and an outer rim 833 surrounding the inner rim to provide a gas suspension permitting relative movement between the inner rim and the outer rim. Each of the plurality of gas springs 850 may include a gas cylinder 851 having an inner surface, and a piston 852 movable within the gas cylinder. The piston 852 may include a shaft 853, a piston head 854 coupled to the shaft and having a recess 855 therein, at least one biasing member 856 within the recess, and at least one damping member 857 adjacent the at least one biasing member and within the recess to frictionally engage the inner surface of the gas cylinder.

While several embodiments have been described herein, those skilled in the art will appreciate that any one or more elements from any one or more embodiments may be used in conjunction with any one or more elements from any other embodiment or embodiments. Moreover, while reference is made herein to inner and outer, those skilled in the art will appreciate that in many embodiments, elements described with respect to inner may be used as outer and vice versa, and/or those elements described as being inner may be used with elements described as being outer and vice versa.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wheel assembly to be coupled to a hub of a vehicle, the wheel assembly comprising:
    an inner rim to be coupled to the hub of the vehicle;
    an outer rim surrounding the inner rim; and
    a plurality of gas springs operatively coupled between the inner rim and the outer rim to provide a gas suspension permitting relative movement between the inner rim and the outer rim, each of the plurality of gas springs comprising
        a gas cylinder having an inner surface, and
        a piston movable within the gas cylinder and comprising
            a shaft,
            a piston head coupled to the shaft and having first and second axially spaced apart recesses therein,
            at least one biasing member surrounding the shaft within the first recess,
            at least one damping member surrounding the at least one biasing member and within the first recess to frictionally engage the inner surface of the gas cylinder, and
            at least one seal surrounding the shaft within the second recess.

2. The wheel assembly of claim 1 wherein the at least one damping member comprises a plurality of rigid bodies.

3. The wheel assembly of claim 1 wherein the piston head has a plurality of first pin-receiving passageways, and the at least one damping member has a plurality of second pin-receiving passageways aligned with the plurality of first pin-receiving passageways to accommodate respective retaining pins during assembly so that the respective retaining pins retract the at least one damping member from engaging the inner surface of the gas cylinder to permit insertion of the piston into the gas cylinder.

4. The wheel assembly of claim 1 wherein the gas cylinder comprises a first metal; and wherein the at least one damping member comprises a second metal softer than the first metal.

5. The wheel assembly of claim 1 wherein the first and second recesses each comprises a circumferential recess.

6. The wheel assembly of claim 1 comprising a tread carried by the outer rim.

7. A wheel assembly to be coupled to a hub of a vehicle, the wheel assembly comprising:
    an inner rim to be coupled to the hub of the vehicle;
    an outer rim surrounding the inner rim; and
    a plurality of gas springs operatively coupled between the inner rim and the outer rim to provide a gas suspension permitting relative movement between the inner rim and the outer rim, each of the plurality of gas springs comprising
        a gas cylinder having an inner surface, and
        a piston movable within the gas cylinder and comprising
            a shaft,
            a piston head coupled to the shaft and having first and second axially spaced apart recesses therein,
            at least one biasing member surrounding the shaft within the first recess and comprising at least one elastomeric material body surrounding the shaft,
            at least one damping member surrounding the at least one biasing member and within the first recess to frictionally engage the inner surface of the gas cylinder, and
            at least one seal surrounding the shaft within the second recess.

8. The wheel assembly of claim 7 wherein the at least one damping member comprises a plurality of rigid bodies.

9. The wheel assembly of claim 7 wherein the piston head has a plurality of first pin-receiving passageways, and the at least one damping member has a second plurality of pin-receiving passageways aligned with the plurality of first pin-receiving passageways to accommodate respective retaining pins during assembly so that the respective retaining pins retract the at least one damping member from engaging the inner surface of the gas cylinder to permit insertion of the piston into the gas cylinder.

10. The wheel assembly of claim 7 wherein the gas cylinder comprises a first metal; and wherein the at least one damping member comprises a second metal softer than the first metal.

11. The wheel assembly of claim 7 wherein the first and second recesses each comprises a circumferential recess.

12. A method of making a wheel assembly to be coupled to a hub of a vehicle, the method comprising:
operatively coupling a plurality of gas springs between an inner rim to be coupled to the hub of the vehicle and an outer rim surrounding the inner rim to provide a gas suspension permitting relative movement between the inner rim and the outer rim, each of the plurality of gas springs comprising a gas cylinder having an inner surface, and a piston movable within the gas cylinder and comprising a shaft, a piston head coupled to the shaft and having first and second axially spaced apart recesses therein, at least one biasing member surrounding the shaft within the first recess, at least one damping member surrounding the at least one biasing member and within the first recess to frictionally engage the inner surface of the gas cylinder, and at least one seal surrounding the shaft within the second recess.

13. The method of claim 12 wherein the at least one biasing member comprises at least one elastomeric material body surrounding the shaft.

14. The method of claim 12 wherein the at least one damping member comprises a plurality of rigid bodies.

15. The method of claim 12 wherein the piston head has a plurality of first pin-receiving passageways, and the at least one damping member has a second plurality of pin-receiving passageways aligned with the plurality of first pin-receiving passageways to accommodate respective retaining pins during assembly so that the respective retaining pins retract the at least one damping member from engaging the inner surface of the gas cylinder to permit insertion of the piston into the gas cylinder.

16. The method of claim 12 wherein the gas cylinder comprises a first metal; and wherein the at least one damping member comprises a second metal softer than the first metal.

17. The method of claim 12 wherein the first and second recesses each comprises at least one circumferential recess.

* * * * *